US008655765B1

(12) United States Patent
Gastineau et al.

(10) Patent No.: US 8,655,765 B1
(45) Date of Patent: Feb. 18, 2014

(54) METHODS, SYSTEMS AND COMPUTER PROGRAM PRODUCTS FOR AUTOMATED INCORPORATION OF TRADED FUND SHARES IN QUALIFIED RETIREMENT PLANS

(75) Inventors: Gary L. Gastineau, Short Hills, NJ (US); Todd J. Broms, New York, NY (US)

(73) Assignee: Navigate Fund Solutions LLC, Boston, MA (US)

( * ) Notice: Subject to any disclaimer, the term of this patent is extended or adjusted under 35 U.S.C. 154(b) by 891 days.

(21) Appl. No.: 12/056,958

(22) Filed: Mar. 27, 2008

Related U.S. Application Data

(63) Continuation-in-part of application No. 11/714,923, filed on Mar. 7, 2007, now Pat. No. 7,496,531, which is a continuation-in-part of application No. 11/141,243, filed on May 31, 2005, now Pat. No. 7,444,300.

(60) Provisional application No. 60/907,246, filed on Mar. 27, 2007.

(51) Int. Cl.
*G06Q 40/00* (2012.01)
*G06Q 40/04* (2012.01)

(52) U.S. Cl.
CPC .................................. *G06Q 40/04* (2013.01)
USPC ............................................. 705/37; 705/35

(58) Field of Classification Search
CPC ................................................... G06Q 40/04
USPC ............................................................ 705/35
See application file for complete search history.

(56) References Cited

U.S. PATENT DOCUMENTS

| 4,933,842 | A | | 6/1990 | Durbin et al. |
| 5,517,406 | A | | 5/1996 | Harris et al. |
| 5,806,048 | A | * | 9/1998 | Kiron et al. ................. 705/36 R |
| 5,845,266 | A | | 12/1998 | Lupien et al. |
| 5,918,218 | A | | 6/1999 | Harris et al. |
| 5,983,204 | A | | 11/1999 | Debe |
| 6,012,046 | A | | 1/2000 | Lupien et al. |
| 6,029,146 | A | * | 2/2000 | Hawkins et al. ................. 705/35 |
| 6,098,051 | A | | 8/2000 | Lupien et al. |
| 6,236,972 | B1 | | 5/2001 | Shkedy |

(Continued)

OTHER PUBLICATIONS

No Author, FSQ Quarterly Newsletter vol. 1, No. 1, Sep. 2001, http://www.fundserv.com/english/download/fsq_0109.pdf.*

(Continued)

*Primary Examiner* — William Rankins
(74) *Attorney, Agent, or Firm* — Sampson & Associates, P.C.

(57) ABSTRACT

The disclosed methods, systems, and computer program products meet the exchange-traded fund accommodation needs of retirement plan investors and Record Keepers and other market participants with several processes, including using a net asset value-based secondary market trading system for ETF shares, using existing Record Keeper systems to trade, process, and hold retirement account ETF positions in the same manner used for mutual fund transactions and positions, accommodating both dollar amount and share-denominated orders, and crossing offsetting exchange-traded fund trades whenever possible. The disclosed methods, systems, and computer program products provide Record Keepers with access to an automated process managed by one or more ETF service providers that aggregate ETF buy and sell orders to effect transactions in whole and fractional ETF shares at or relative to the fund's net asset value calculated on the day of the transaction or a later day.

54 Claims, 20 Drawing Sheets

(56) References Cited

U.S. PATENT DOCUMENTS

| | | | |
|---|---|---|---|
| 6,418,419 | B1 | 7/2002 | Nieboer et al. |
| 6,505,174 | B1 | 1/2003 | Keiser et al. |
| 6,564,192 | B1 | 5/2003 | Kinney, Jr. et al. |
| 6,615,188 | B1 | 9/2003 | Breen et al. |
| 6,879,964 | B2 | 4/2005 | Sauter et al. |
| 6,941,280 | B1 | 9/2005 | Gastineau et al. |
| 7,006,991 | B2 | 2/2006 | Keiser et al. |
| 7,024,387 | B1 | 4/2006 | Nieboer et al. |
| 7,047,218 | B1 | 5/2006 | Wallman |
| 7,099,838 | B1 | 8/2006 | Gastineau et al. |
| 7,117,176 | B2 | 10/2006 | Wallman |
| 7,444,300 | B1 | 10/2008 | Broms et al. |
| 7,636,682 | B1* | 12/2009 | MacPherson ............... 705/37 |
| 2001/0025266 | A1* | 9/2001 | Gastineau et al. ........... 705/36 |
| 2002/0128947 | A1 | 9/2002 | Sauter et al. |
| 2002/0188535 | A1* | 12/2002 | Chao et al. ............ 705/35 |
| 2002/0194107 | A1 | 12/2002 | Li et al. |
| 2003/0177077 | A1 | 9/2003 | Norman |
| 2003/0177086 | A1 | 9/2003 | Gomber et al. |
| 2003/0177126 | A1 | 9/2003 | Weingard et al. |
| 2003/0216995 | A1* | 11/2003 | DePauw et al. ............ 705/37 |
| 2003/0233302 | A1* | 12/2003 | Weber et al. ............. 705/36 |
| 2004/0044609 | A1 | 3/2004 | Moore |
| 2004/0186803 | A1 | 9/2004 | Weber et al. |
| 2004/0210502 | A1 | 10/2004 | Madhavan et al. |
| 2004/0236636 | A1 | 11/2004 | Lutnick et al. |
| 2004/0243502 | A1 | 12/2004 | Slowik et al. |
| 2005/0149426 | A1 | 7/2005 | Jokisch et al. |
| 2005/0262010 | A1 | 11/2005 | Tull et al. |
| 2006/0026091 | A1 | 2/2006 | Keen et al. |
| 2006/0059078 | A1 | 3/2006 | Courbois et al. |
| 2006/0100955 | A1 | 5/2006 | Baldassini et al. |
| 2006/0167786 | A1 | 7/2006 | Gambir et al. |
| 2007/0027790 | A1 | 2/2007 | Gastineau et al. |

OTHER PUBLICATIONS

Barney, Lee, "Actively Managed ETFs: Coming Soon to an Exchange Near You?", The Street, May 24, 2001, 4 pgs. (http://www.thestreet.com/funds/funds/1440520.html).

"Trading Strategies" Turbo Trade.com, http://www.turbotrade.com/content/view/116/94 (last reviewed Jul. 18, 2008).

Harris, Larry, *Trading and Exchanges: Market Microstructure for Practitioners*, Oxford University Press, 2003 (the whole book).

Gremillion, Lee, *Mutual Fund Industry Handbook : A Comprehensive Guide for Investment Professionals*, John Wiley & Sons, Inc., Hoboken, New Jersey, NICSA 2005, (the whole book).

Engle et al., "Premiums-Discounts and Exchange Traded Funds", The Journal of Derivatives, Summer 2006, pp. 27-45.

Gastineau, Gary L., "Reinventing the Mutual Fund: An Essential Piece of Financial Engineering", ETF Consultants, Feb. 25, 2005, 32 pgs.

Berk, Jonathan B. and Richard C. Green, "Mutual Fund Flows and Performance in Rational Markets," Journal of Political Economy, vol. 112, No. 6, Dec. 2004, 1269-1295 (available at http://www.journals.uchicago.edu/JPE/journal/contents/v112n6.html). An earlier version (Dec. 2002) was published as an NBER working paper (available at http://papers.ssrn.com/sol3.papers.cfm?abstract_id=338881).

Beinstein, Peter, "What's It All About, Alpha?," Institutional Investor, May 2004, 48-52.

Chen, Joseph, Harrison Hong, Ming Huang and Jeffrey Kubik, "Does Fund Size Erode Performance? Liquidity, Organizational Diseconomies and Active Money Management," Working Paper, Sep. 2002 and May 2004 (available at http://www.rcf.usc.edu/~josephsc/files/fundsize.pdf).

Clark, Andrew, "For Benchmark-Beating Funds, Does Fund Size Affect Performance?", Lipper Research Study, Jan. 5, 2004 (available at http://www.research.lipper.wallst.com/researchStudiesOverview.asp).

Edelen, Roger M., Investor Flows and the Assessed Performance of Open-End Mutual Funds, Journal of Financial Economics 53,1999, 439-466.

Gastineau, Gary L., *The Exchange-Traded Funds Manual*, 2002b, John Wiley & Sons.

Gastineau, Gary L., "Protecting Fund Shareholders From Costly Share Trading," Financial Analysts Journal, May/Jun. 2004a, 22-32 (available at http://www.etfconsultants.com/Protecting%/20Fund%20Shareholders%20FAJ.pdf).

Gastineau, Gary L. and Craig J. Lazzara, "Reinventing the Investment Fund" from *The Investment Think Tank: Theory, Strategy, and Practice for Advisers*. Harold Evensky and Deena Katz, editors, Bloomberg Press, 2004, 153-178. Also appeared in Bloomberg Wealth Manager under the title of "Extreme Makeover," Nov. 2004, 57-68.

Greene, Jason T., and Charles W. Hodges, "The Dilution Impact of Daily Fund Flows on Open-End Mutual Funds," *Journal of Financial Economics*, vol. 65, No. 1, Jul. 2002, 131-158.

Johnson, Woodrow T., "Predictable Investment Horizons and Wealth Transfers among Mutual Fund Shareholders," Journal of Finance, Oct. 2004, 1979-2012.

Porter, Michael, "The Future Is Now: The AMEX's Solution to the Active ETF Riddle," Lipper Fund Industry Insight Reports, Dec. 6, 2004, (available at http://www.research.lipper.wallst.com/fundIndustryOverview.asp; $15 payment required to view article).

Porter, Michael, "Gary Gastineau on Why Actively-Managed Exchange-Traded Funds Can Be the Greatest Thing Since Money Market Funds," Lipper Fund Industry Insight Reports, Nov. 30, 2004, (available at http://www.research.lipper.wallst.com/fundIndustryOverview.asp, $15 payment required to view article).

Securities and Exchange Commission, Concept Release Actively-Managed Exchange-Traded Funds, 17 CFR Part 270, Release No. IC-25258; File No. S7-20-011, Nov. 8, 2001 (available at http://www.sec.gov/rules/concept/ic-25258.htm).

Securities and Exchange Commission, Comments on Concept Release Actively-Managed Exchange-Traded Funds, 17 CFR Part 270, Release No. IC-25258; File No. S7-20-011 (available at http://www.sec.gov/rules/concept/s72001.shtml).

Comments of Paul Charbonnet, Investors FastTrack, Baton Rouge, La., Dec. 12, 2002 (available at http://www.sec.gov/rules/concept/s72001/pcharbonnet1.txt).

Comments of Pascal Redding, Jun. 6, 2002 (available at http://www.sec.gov/rules/concepts/s72001/predding1.txt).

Comments of John White, May 4, 2002, (available at http://www.sec.gov/rules/concepts/s72001/white1.txt).

Comments of R. Sheldon Johnson, Managing Director, Morgan Stanley & Co. Incorporated, May 3, 2002 (available at http://www.sec.gov/rules/concept/s72001/johnson1.htm).

Comments of Charles M. Bartlett Jr., May 2, 2002 (available at http://www.sec.gov/rules/concept/s72001/bartlett.txt).

Comments of Michael J. Ryan, Jr., Executive Vice President and General Counsel, The American Stock Exchange, LLC, Mar. 5, 2002 (available at http://www.sec.gov/rules/concept/s72001/ryan1.htm).

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 (available at http://www.sec.gov/rules/concept/s72001/keller1.htm).

Comments of Robert M. Steele, Executive Vice President, Rydex Global Advisors Inc., Jan. 31, 2002 (available at http://www.sec.gov/rules/concept/s72001/steele1.htm).

Comments of Mike Schoren, Jan. 20, 2002 (available at http://www.sec.gov/rules/concept/s72001/schoren1.txt).

Comments of Gary L. Gastineau, Managing Director, Nuveen Investments, Jan. 14, 2002 (available at http://www.sec.gov/rules/concept/s72001/gastineau1.htm).

Comments of Joel Greenberg, Managing Director, Susquehanna International Group, Jan. 14, 2002 (available at http://www.sec.gov/rules/concept/s72001/greenberg1.htm).

Comments of Austin J. Fleites, Principal, State Street Bank and Trust Company, Jan. 14, 2002 (available at http://www.sec.gov/rules/concept/s72001/fleites1.htm).

Comments of Richard F. Morris, Senior Counsel, Barclays Global Investors, Jan. 11, 2002 (available at http://www.sec.gov/rules/concept/s72001/morris1.htm).

(56) References Cited

OTHER PUBLICATIONS

Comments of Ivar Bjornstad, President, Shoreland Partners LLC, Jan. 11, 2002 (available at http://www.sec.gov/rules/concept/s72001/bjornstad1.htm).
Comments of Kriya Inc., Jan. 8, 2002 (available at http://www.sec.gov/rules/concepts72001/goff1.htm).
Comments of Stacy W. Goff, Vice President and Assistant General Counsel, CenturyTel, Inc., Jan. 7, 2002 (available at http://www.sec.qov/rules/concept/s72001/goff.htm).
Stein, Jeremy C., Why Are Most Funds Open-End? Competition and the Limits of Arbitrage, Working Paper, Jan. 2004, Harvard University (available at http://post.economics.harvard.edu/faculty/stein/papers/OpenEndJanO4revision.pdf).
Gastineau et al., "Methods, Systems, and Computer Program Products for Trading Financial Instruments on an Exchange", U.S. Appl. No. 11/714,923, filed Mar. 7, 2007.
Broms et al., "Method and System for Improved Fund Investment and Trading Processes", U.S. Appl. No. 11/141,243, filed May 31, 2005.
Alexander et al., "Does Motivation Matter When Assessing Trade Performance? An Analysis of Mutual Funds", Working Paper, Feb. 28, 2006, 39 pgs.
"Standard & Poor's Depositary Receipts: SPDR Trust, Series 1 Prospectus" American Stock Exchange, http://www.amex.com/etfpros/SPDR.pdf, Jan. 26, 2007, 84 pgs.
Broms et al., "The Development of Improved Exchange-Traded Funds (ETFs) in the United States", The Brookings Institution, Sep. 12, 2006, 24 pgs.
Cremers et al., "How Active is Your Fund Manager? A New Measure that Predicts Performance" PowerPoint Presentation, Aug. 7, 2006, 36 pgs.
Gastineau, Gary L., *Someone Will Make Money on Your Funds—Why Not You? A Better Way to Pick Mutual and Exchange-Traded Funds* John Wiley & Sons, Inc., 2005, Chapter 10, "Reinventing the Mutual Fund: Actively Managed Exchange-Traded Funds", 18 pgs.
Gastineau, Gary L., "Reinventing the Mutual Fund: An Essential Piece of Financial Engineering" ETF Consultants, Working Paper, Feb. 25, 2005, 32 pgs.
Harlow et al., "The Right Answer to the Wrong Question: Identifying Superior Active Portfolio Management" Journal of Investment Management, vol. 4, No. 4, 2006, pp. 1-26.
Lee, Charles M. C., "Market Integration and Price Execution for NYSE-Listed Securities", The Journal of Finance, vol. XLVIII, No. 8, Jul. 1993, pp. 1009-1038.
Thirumalai, Ramabhadran S., "Active vs. Passive ETSs", Indiana University, Working Paper, Aug. 27, 2003, 41 pgs.
"Summary Judgment Ruling in *American Stock Exchange* vs. *Mopex, Inc.*" United States District Court, Southern District of New York 00 Civ. 5943 (SAS), Feb. 4, 2003, 23 pgs.
Wermers et al., "The Investment Value of Mutual Fund Portfolio Disclosure", Working Papers, Oct. 2006, 59 pgs.
Sydney LeBlanc's article Did You Know Them?, published on Wall Street, Oct 1, 2004, p. 1.

\* cited by examiner

FIG. 15A

1500
- Symbol — 1502
- Extension — 1504
- Instructions — 1506
- Transaction Size — 1508
- Price — 1510
- Limit Price — 1512
- SUBMIT — 1514

FIG. 15B

1500
- Symbol: SPY — 1502
- Extension: VW — 1504
- Instructions: BUY — 1506
- Transaction Size: 1000 — 1508
- Price: 100.05 — 1510
- Limit Price: $131.00 — 1512
- SUBMIT — 1514

METHODS, SYSTEMS AND COMPUTER PROGRAM PRODUCTS FOR AUTOMATED INCORPORATION OF TRADED FUND SHARES IN QUALIFIED RETIREMENT PLANS

CROSS REFERENCE TO RELATED APPLICATIONS

The present application claims priority to U.S. Provisional Patent Application No. 60/907,246, filed on Mar. 27, 2007, and is a continuation-in-part of pending U.S. patent application Ser. No. 11/714,923, filed on Mar. 7, 2007, which is a continuation-in-part of pending U.S. patent application Ser. No. 11/141,243, filed on May 31, 2005, the disclosures of which are incorporated herein by reference in their entirety.

BACKGROUND OF THE INVENTION

1. Field of the Invention

The invention relates generally to financial services, and in particular, to the investment of retirement plan assets in fund products and the maintenance of account records for retirement plans and their beneficiaries.

2. Background Art

Qualified retirement plans have long offered investment choices that include mutual fund shares bought and redeemed in transactions with the funds at the net asset value ("NAV") next calculated by the fund after the purchase or sale order is placed. At the end of 2005, the Investment Company Institute reported that the United States mutual fund industry had a record $8.9 trillion in assets under management of which $3.4 trillion was held in retirement accounts, about equally divided between Individual Retirement Accounts ("IRAs") and employer-sponsored defined contribution plans, such as 401 (k), 403(b) and 457 plans ("Retirement Plans").

In 1993, The American Stock Exchange ("AMEX") created the first exchange-traded fund ("ETF") in the United States. This fund, called SPDRs (pronounced "spiders", trading symbol "SPY") or Standard & Poor's Depositary Receipts, offers investors ownership in a unit investment trust holding the stocks in the Standard & Poor's 500 Stock Price Index. Today, investors own over $400 billion worth of shares in more than 350 ETFs, most of them organized as management investment companies with legal structures and governance mechanisms patterned after mutual funds. The portfolios of currently available ETFs are based on indexes. The Securities and Exchange Commission ("SEC") has not yet allowed ETFs to be "actively managed," but the availability of actively managed ETFs is widely anticipated.

Unlike open-end mutual funds and like all publicly traded stocks, ETF shares trade during the day like stocks on a stock exchange, giving investors ownership of a portfolio through a position in a single security, the ability to purchase fund shares on margin and the ability to sell fund shares short. Most employer-sponsored retirement accounts do not buy and sell individual stock positions and margin transactions and short sales are not available to retirement accounts. Consequently, these features of exchange-traded funds do not have immediately obvious value in most retirement accounts. The primary attraction of ETFs to retirement investors comes from another feature of these funds: the ETF share creation and redemption process protects ongoing ETF investors from bearing the cost of other investors' purchases and sales of the ETF's shares. A growing number of investors, investment managers and regulators have come to realize that the in-kind ETF creation and redemption process can protect ongoing exchange-traded fund shareholders from the costs imposed on mutual fund shareholders by market timers and even by ordinary buyers and sellers of mutual fund shares who cause the mutual fund to incur transaction costs to accommodate their purchases and sales. In addition, the exchange-traded fund structure can eliminate the inherent conflict between the interests of taxable shareholders who do not want to pay taxes on capital gains and tax-exempt investors who simply want the highest possible returns without any concern for taxes. Most mutual funds have both taxable and retirement account (tax-exempt) shareholders, making this conflict between shareholder objectives a widespread problem. Another advantage of ETFs over mutual funds is that, other things equal, expenses will be lower in an exchange-traded fund. Most exchange-traded funds do not have 12(b)(1) fees or service fees comparable to those embedded in most no-load mutual funds and they do not carry the sales loads characteristic of load mutual funds. Furthermore, they do not have shareholder accounting at the fund level and do have a few other less important characteristics that generally lead to lower expenses.

In spite of their shareholder protection, tax neutrality and expense advantages, exchange-traded funds have not yet become popular investment choices for retirement plans. While investors in retirement plans have embraced ETFs in many other accounts, a satisfactory process for integrating ETFs into retirement accounts at a cost competitive with mutual funds has not been available.

BRIEF SUMMARY OF THE INVENTION

Accordingly, the present disclosure introduces methods, systems, and computer-program products for automatically incorporating traded fund shares into qualified retirement plans According to various embodiments of the disclosed processes, ETF trades are entered and executed at or relative to a net asset value to be published by the fund, and purchase transactions are matched against sale transactions to enable the system to reduce market impact and net transaction costs. The net asset value-based transactions and their processing would use existing Record Keeper systems and existing securities industry communications and identification systems or simple modifications thereof to accommodate exchange-traded funds carried on Record Keeper accounting platforms. A transaction management system would be supported by fund issuers, their service providers and/or one or more industry utilities that will provide execution, settlement and support for ETF trading and position keeping in retirement accounts.

Further embodiments, features, and advantages of the present inventions, as well as the structure and operation of the various embodiments of the present invention, are described in detail below with reference to the accompanying drawings.

FEATURES OF THE INVENTION

1. Use of an NAV-based secondary market by and to serve Record Keepers and retirement accounts.

2. Use Record Keeper mutual fund systems with few or no modifications. Differences between ETFs and mutual funds will be accommodated by systems development at fund trading and custody service providers for ETFs (Administrators).

3. Handling both dollar-denominated and share-denominated orders in a trading match and offset system on a larger scale and with necessary attention to market impact not anticipated in prior systems for dollar and share order combinations where market impact was negligible.

4. Trade and risk management by Administrators to minimize differences between execution price and NAV and to minimize all parties' net trading gain or loss.

5. Use by other financial intermediaries for other kinds of accounts, including SMAs and IRAs that typically invest dollar amounts and need fractional share accommodation.

6. Integration for handling both mutual funds and ETFs on the same platform.

7. Retroactive error correction from U.S. patent application Ser. No. 11/714,921, filed Mar. 7, 2007, and U.S. patent application Ser. No. 11/714,923, filed Mar. 7, 2007.

8. Cross orders to maximum extent possible. Rules for crossing. Price all transactions at net price discovered in NAV-based market after addition or subtraction of fees.

9. Accommodate dollar-denominated trades with order match and fractional shares.

10. Embedding Administrator fee/cost allocations in net prices. Separately disclosing and billing embedded costs.

11. Use of Fund/SERV for communications in connection with ETF transactions and positions, including order entry, order management and crediting distributions by funds to Record Keeper accounts.

12. Reporting and clearing trades, ETF position keeping by Record Keepers and Administrators.

13. Use by various parties of NAV-based secondary market trading process and market data.

14. Preserve shareholder protection with secondary market trading.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIGS. 15A and 15B illustrate an exemplary computer interface through which an order for a financial instrument may be entered onto an exchange or an ECN in accordance with an embodiment of the present invention.

DETAILED DESCRIPTION OF THE INVENTION

Figure 1:
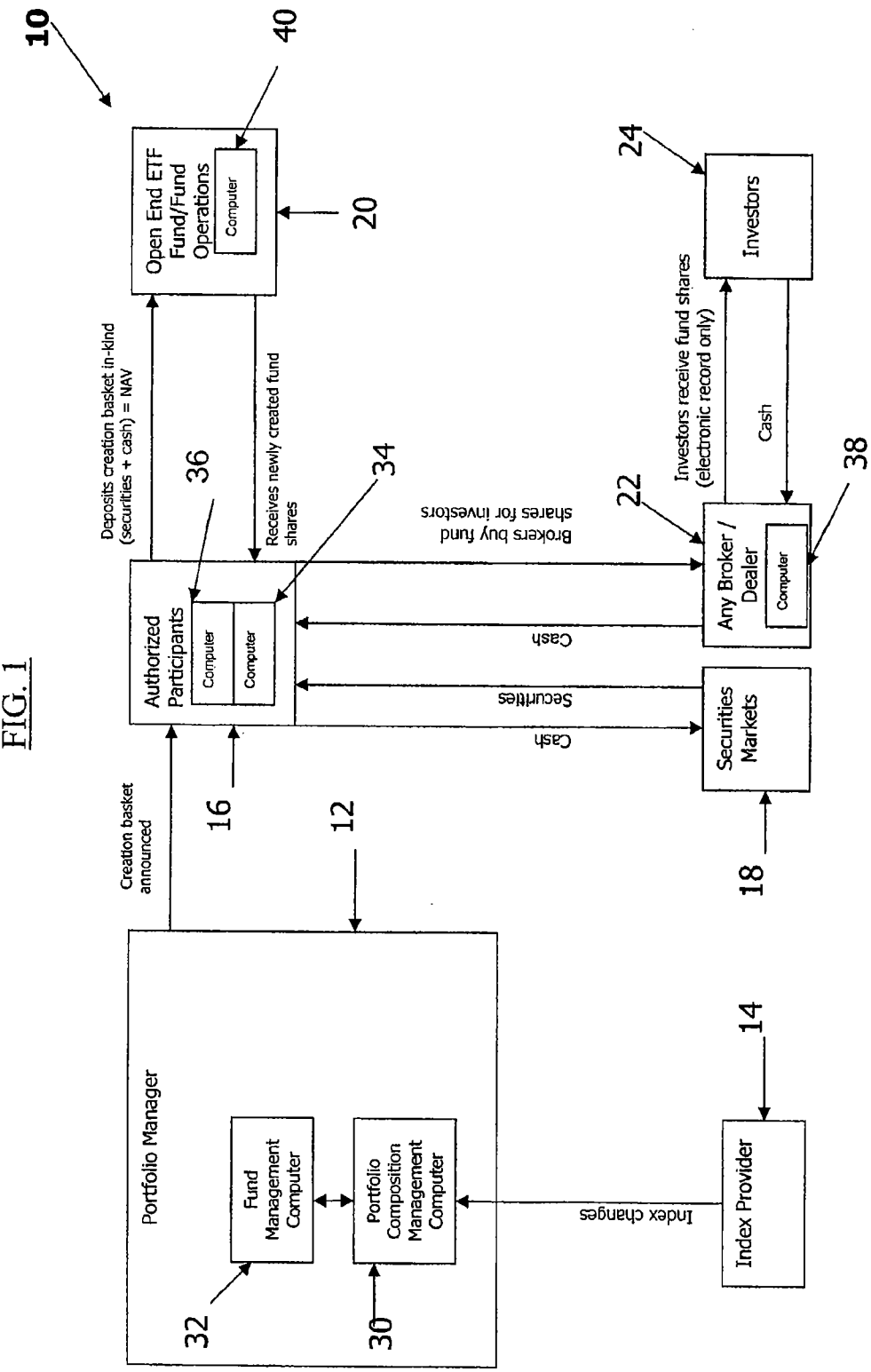
FIG. 1 is a block diagram of the systems used in the creation process for actively-managed exchange-traded funds (AMETFs, and improved indexed ETFs) according to the present invention.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Example 1

Methods and Systems for Improved Fund Investment and Trading Processes

The preferred embodiment consists of major and several subsidiary components implemented through a variety of separate and related computer systems for the fund. These components may be used either individually or in a variety of combinations to achieve the joint objectives of protecting fund investors from the costs of providing liquidity to fund share traders, increasing the effectiveness of the portfolio management process and providing a new and improved way to trade exchange-traded fund shares on a secondary market. A number of the components of the preferred embodiment have more than one effect (e.g., shareholder protection plus improved portfolio management procedures). Each component can be implemented separately and is generally beneficial to fund shareholders even if the other components are not implemented at the same time or to the full extent described herein.

Certain components of the preferred embodiment improve expected performance and offer other advantages for investors in both AMETFs with a full active management investment process and a new kind of indexed ETF. This new kind of indexed ETF uses traditional indexing techniques but the index composition changes are not disseminated to the marketplace until after the fund portfolio manager has had an opportunity to change the fund portfolio to reflect any index changes. For the protection of investors, the portfolios of these new index funds are less transparent than the portfolios of existing benchmark index ETFs, but these funds are otherwise similar to other indexed ETFs. These funds can benefit from the same components of the present invention as the fully active AMETFs principally described herein. Consequently, these new index funds are covered by the description and claims as an AMETF variant. The Securities and Exchange Commission has indicated that these new index funds will be considered actively-managed funds for regulatory purposes. The secondary market trading system that is a component of the preferred embodiment is a useful method for secondary market trading of any securities basket product including existing index ETFs, HOLDRs (trust-issued receipts that represent beneficial ownership of a specified group of stocks), BLDRs (unit investment trust portfolios of publicly traded Depositary Receipts) and structured notes linked to a multi-security index or basket as well as the AMETFs described herein.

In this Application, the ETF Share Class is sometimes referred to as the General Class of Fund Shares or Redeemable Shares to emphasize specific characteristics. The terms are interchangeable. A Business Day is any day the securities markets are open. Ordinarily a Business Day ends at 4:00 p.m. Eastern Time in United States securities markets, but some or all markets may close earlier on occasion, usually on the day before a holiday.

Features of the Preferred Embodiment that Primarily Protect Investors from Costs of Fund Share Trading 1. Early cut-off times for orders to purchase and redeem AMETF and ETF shares.

2. Entry and exit of investors through an ETF Share Class or an equivalent process to protect ongoing shareholders from the cost of providing liquidity to fund share traders.

Features of the Preferred Embodiment that Primarily Improve the Effectiveness of the Portfolio Management Process 3. Conversion of the ETF Share Class to and from Specialized Share Classes which, among other features, provide low-cost investment management services to institutional investors and convenience to individual investors who want to pay their advisors in a tax efficient way.

4. Less frequent intra-day dissemination of a precise AMETF portfolio valuation proxy.

5. Improving AMETF investor returns by concentrating portfolio manager effort on controlled-size funds; capping the assets the manager will accept for specific fund strategies and providing for a higher management fee on capped funds that perform well.

6. Organization of the AMETF investment manager to concentrate portfolio management efforts on the management of fund portfolios to reduce leakage of investment information by restricting the investment manager's activities. Voluntary lagged portfolio disclosure may be made more frequently than required.

The Secondary Market Fund Share Trading System Feature of the Preferred Embodiment 7. A trading system for AMETFs and other exchange-traded fund shares and basket instruments that parallels the traditional method for purchase and sale of conventional mutual funds at Net Asset Value (NAV) without compromising the investor protection provided by the exchange-traded fund creation and redemption structure.

FIG. 1 shows a generalized fund share creation system 10 which allows for the creation of an actively managed exchange traded fund (AMETF) and a new type of indexed exchange traded fund (ETF). The overall system 10 includes the actions of a portfolio manager 12 that manages the fund. The currently available indexed exchange-traded funds are benchmarked to an index such as standard published benchmark indexes including the Standard & Poors 500, the Russell 2000 and a variety of other domestic and international equity and fixed income indexes calculated and maintained by an index provider 14. Changes are made to such indexes from time to time and the changes are published widely. Changes in the indexes used for the improved indexed ETFs covered by the present invention will be communicated to the portfolio manager 12 confidentially by the index provider 14 or developed internally by the portfolio manager 12. If the fund is actively managed, or if the index is developed internally, the portfolio manager will determine any portfolio changes inside the portfolio manager 12. The system 10 also includes authorized participants 16, securities markets 18, a fund 20, broker/dealers 22 and investors 24.

The portfolio composition changes initiated by either the portfolio manager 12 or the index provider 14 are entered into a portfolio composition management computer 30 which is coupled to a fund management computer 32. The index changes for the improved index fund are not published to the world until after the fund has had an opportunity to implement the index changes in the portfolio. The portfolio composition changes to any AMETF including the new indexed ETFs need not be revealed except as required by regulators. The fund portfolio composition management computer 30 manages the relative weighting of positions in the portfolio and the fund management computer 32 translates the desired composition into creation and redemption baskets and orders to buy and sell securities for the portfolio. The fund management computer system 32 is also designed to ensure compliance with the cut-off times for fund trading and to provide an audit trail for the creation and redemption of fund shares as explained below. Links to and from the systems for monitoring and implementing creation and redemption orders are not shown in FIG. 1. It should be noted that the computer systems 30 and 32 and other computer systems described herein may be different groups of networked computers spread out over different locations.

The portfolio manager 12 supervises the daily process of determining Portfolio Composition Files (PCFs) reflected in the fund's published creation and redemption baskets. These creation and redemption baskets are published each day in advance of the start of trading of shares in the fund. The authorized participants 16 have a series of trading and trading management computers 34 that allow the exchange of securities, fund shares, and cash between the authorized participants 16 and the securities markets 18, broker/dealers 22 and the fund and fund operations 20. The authorized participants 16 each have a back office computer system 36 that performs functions such as confirming trades, accounting and risk management. The broker/dealers 22 each have a trading computer system 38 that facilitates trading and record-keeping in a variety of ways such as performing position management, billing and ensuring compliance with market rules. All of the transactions described herein are completed electronically via network connections including proprietary networks and the Internet.

The authorized participants 16 may create shares in the fund by depositing a creation basket of securities (plus or minus a cash amount) in exchange for shares of the General Class of Fund Shares or redeem shares by depositing some of the General Class of Fund Shares in exchange for a redemption basket of securities (plus or minus a cash amount). The authorized participants 16 are broker-dealers and can include market makers and arbitrageurs. The market makers create and redeem shares to manage their inventories of fund shares whereas arbitrageurs hope to profit from small pricing differences between the price of the General Class of Fund Shares and the cost of creating or disposing of a creation or redemption basket. The authorized participants 16 have entered into agreements with industry transaction clearing organizations and agents of the fund whereby they agree to certain conditions in the creation or redemption of fund shares. The authorized participants 16 transact in the securities markets 18 to acquire the securities that typically make up part of the creation basket.

New shares of the General Class of Fund Shares of the fund 20 are created when an authorized participant 16 deposits one or more creation baskets which consist of securities designated by the portfolio manager 12 as a Portfolio Composition File (PCF) and a cash balancing amount which may be a payment to or a payment received from the fund. In return for a creation deposit, an authorized participant 16 receives newly created fund shares from the fund 20. A variety of internal and external computer systems allow the authorized participants 16 to deal in the secondary market for securities with other broker-dealers 22 or directly or indirectly with investors 24. The portfolio manager 12 uses the fund portfolio composition management computer 30 and the fund management computer system 32 to make appropriate changes to the creation basket reflecting desired changes in the basket of securities to be received in a creation. The portfolio manager 12 also distributes the creation and redemption baskets to the authorized participants 16, and a variety of market data vendors (not shown). This information is typically distributed through the National Securities Clearing Corporation (NSCC), an industry utility which is a subsidiary of the Depository Trust and Clearing Corporation (DTCC). This industry utility also distributes an intra-day net asset value proxy to market participants through market data vendors. The fund management computer system 32 also handles a variety of accounting and operating functions including the generation of buy and sell orders for the fund's portfolio and generation of instructions for the fund's custodian and transfer agent functions, as subsystems linked to the computer 40 in operations of the fund 20. A similar process (not shown) is used to develop and disseminate the redemption basket and facilitate the fund share redemption process.

The trading and trade management computers 34 facilitate the exchange of securities (including securities represented in the creation and redemption baskets), fund shares and cash between the authorized participants 16 and the securities markets 18, other broker-dealers 22 and the fund 20. The fund management computer system 32, among other functions, initiates and confirms a variety of transactions, and maintains records and appropriate information for an audit trail of all orders entered with and by the fund. The various features of the preferred embodiment of the improved fund will now be described.

Early Cut-Off Times for Orders to Purchase and Redeem AMETF and ETF Shares

While the established ETF in-kind creation and redemption structure provides inherent protection from the grosser forms of mispricing and shareholder abuse uncovered in the mutual fund trading scandals, an active fund manager and an astute index fund manager need greater flexibility in managing the portfolio than is inherent in the exchange-traded index fund creation and redemption process as it is used today. Specifically, the necessary and appropriate publication of fully transparent creation and redemption baskets discourages effective implementation of portfolio composition changes by these index funds' managers if the notice of intent to create or redeem does not come early enough to permit the portfolio manager to adjust the portfolio for the effect of creation and redemption trades on the portfolio composition. In addition, the creation and redemption baskets for actively-managed ETFs may not reflect the manager's target fund portfolio as accurately as they typically reflect the composition of a benchmark index ETF. The manager of any exchange-traded fund needs the ability to trade between the time the fund receives notice of an incoming fund share creation deposit or an outgoing redemption basket and the time the net asset value is next calculated.

Thus the provisions of the preferred embodiment of the AMETF and ETF require early notice of orders to purchase or redeem shares in the funds. Early notice permits the portfolio manager to adjust the portfolio composition and incorporate the market impact of the entry or exit of shareholders on the prices used to calculate the fund's net asset value (NAV). The entering or leaving shareholders demand liquidity and—with early notice to permit portfolio composition changes—they pay for it indirectly. The portfolio manager's ability to adjust the composition of the fund portfolio after receiving notice of a creation or redemption of shares using previously posted creation and redemption baskets is essential to transferring the costs of entering and leaving the portfolio to the entering and leaving shareholders and relieving the ongoing shareholders of this burden.

In the preferred embodiment, a time between 2:30 p.m. and 3:30 p.m. is listed as the cutoff for purchase or redemption of baskets on Business Days when the market closing is 4:00 p.m. Eastern Time. This time is only an example of what might be an appropriate cutoff time for domestic equity portfolios. The cutoff time range is selected to be an early enough cut-off notice to permit the portfolio manager to adjust the portfolio to an appropriate portfolio composition by the time the market closes. In specific cases, as governed by the prospectus or subject to approval by the fund's board, the fund might set an earlier or a later cut-off time to provide the best possible service to entering and leaving shareholders without compromising the protection of ongoing shareholders. For funds other than domestic equity funds, different cut-off times will be required. In the case of international equity funds, for example, the appropriate early cut-off time for funds holding more than 3% of their assets in stocks traded on one or more primary markets outside the United States, could be 4:00 p.m. on any U.S. Business Day for pricing at the net asset value next determined for the fund after a full trading day in the primary markets for stocks accounting for 97% of the fund's equity portfolio. The 2:30 p.m. creation/redemption cut-off time for domestic equity funds and comparable rules for other types of portfolios solves one of the fund industry's greatest investor protection problems.

Figure 2A:
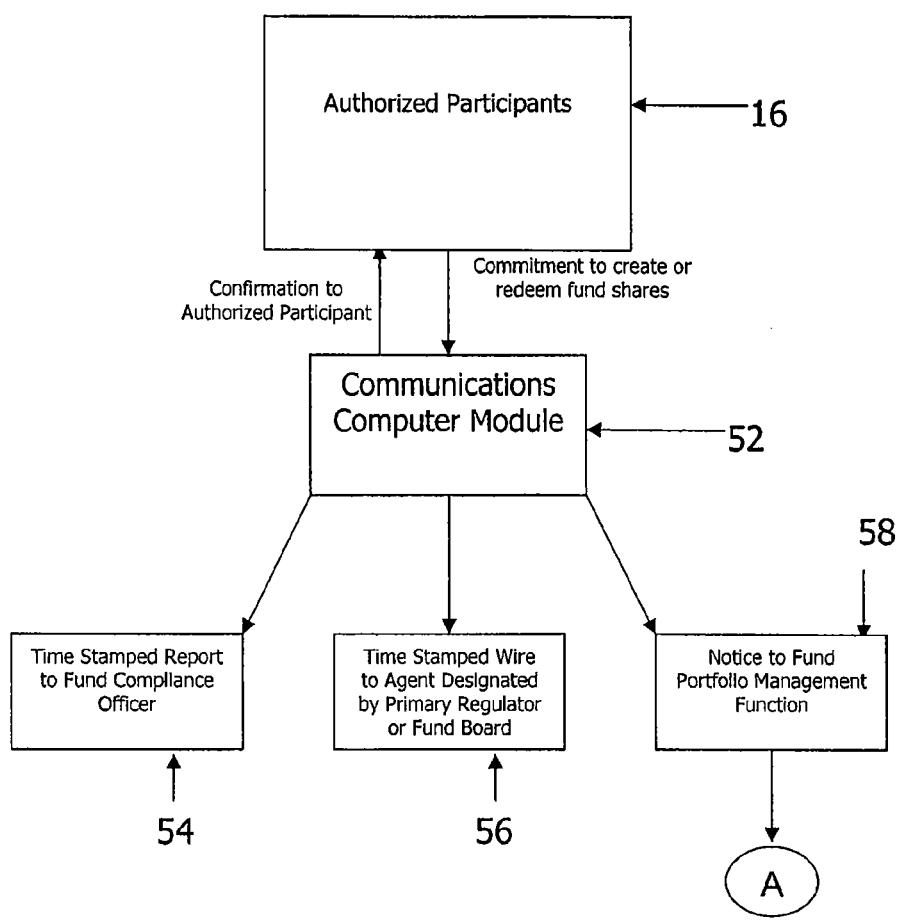
FIG. 2A is a flow diagram of the communications and control system used to implement and ensure compliance with early creation-redemption cut-off time notification requirements.

The early order cut-off system is illustrated in a flow diagram in FIG. 2A. In the preferred embodiment, the fund shares are exchanged for baskets of securities and cash. The notice by an authorized participant 16 of its commitment to create or redeem fund shares before the posted cut-off time is communicated to the communications computer module 52, which in turn confirms the receipt of a notification to the authorized participant 16 and simultaneously transmits a time-stamped report to a fund compliance officer 54, an agent 56 designated by the primary regulator or by the fund board and the portfolio manager 58. The portfolio manager 58 initiates any necessary portfolio modification transactions. The reports to the fund compliance officer 54 and to the agent 56 designated by the regulator or the fund board insure a record in a form which fund personnel will not be able to tamper with to conceal late entry of creation or redemption orders, thus providing protection from the late-arriving orders that have been a problem for conventional mutual fund shareholders.

Figure 2B:
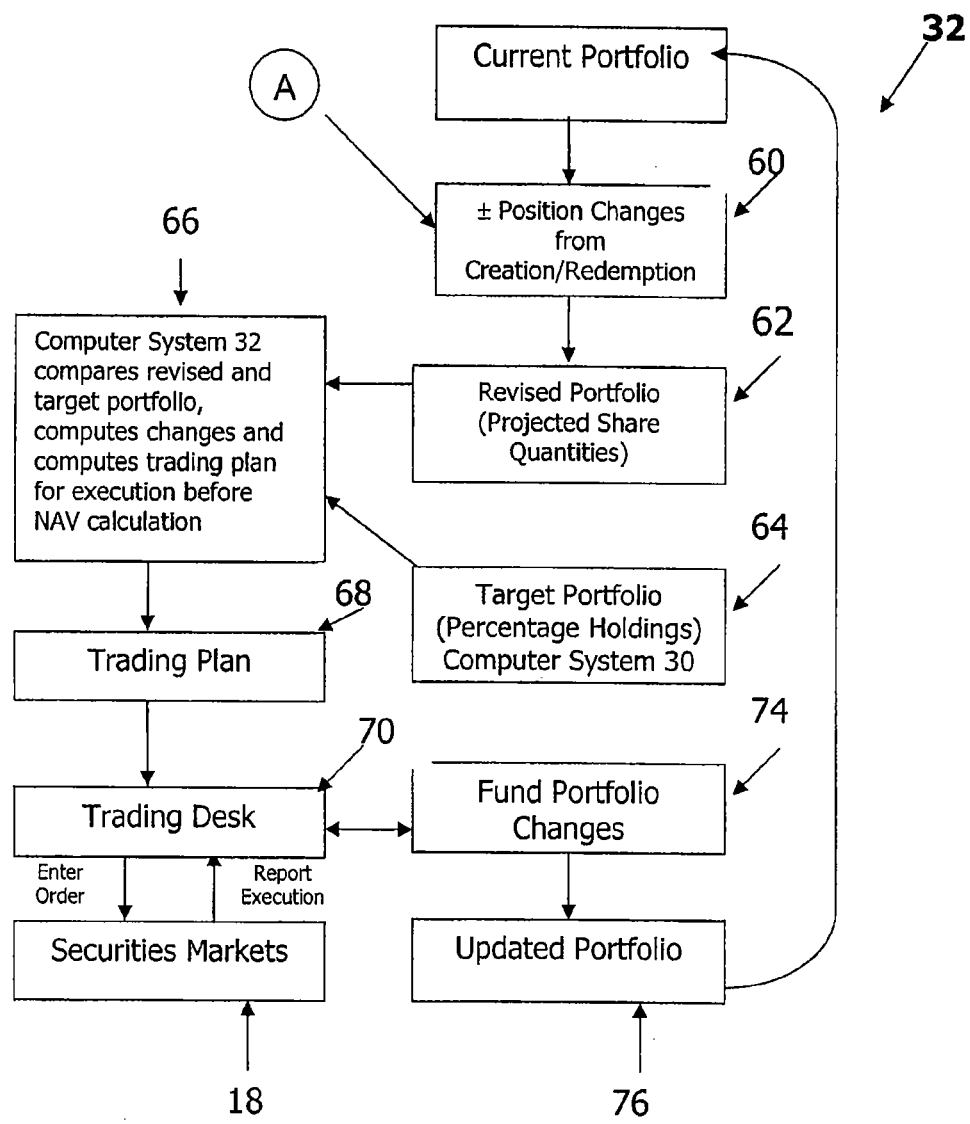
FIG. 2B is a flow diagram reflecting the portfolio and fund management process the portfolio manager uses to respond to early notice of a creation or redemption.

The portfolio management response to a creation or redemption order is shown in FIG. 2B. The notice of creation or redemption carries with it information about absolute and relative position changes that result from a creation or redemption. The portfolio position changes that result from the creation or redemption transaction(s) are broken out by the fund management computer 32 and appear in block 60 of FIG. 2B. The revised portfolio 62 is determined by the fund management computer 32 and a target portfolio 64 is created and maintained by the fund portfolio composition management computer 30. The target portfolio 64 reflects the percentage of holdings in each portfolio position developed by the fund portfolio composition management computer 30 and represents what the fund management computer 32 has determined is the appropriate portfolio the fund should hold at the end of the day. The fund management computer 32 compares the revised portfolio 62 to the target portfolio 64 and generates appropriate orders to buy and sell portfolio securities, developing a trading plan 68 for execution by the trading desk 70, preferably by the time of the NAV calculation. The trading plans are entered by a trading desk 70 (which is controlled by the fund management computer 32) into the transaction process in appropriate securities markets 18. Executions are reported as fund portfolio changes 74 and the updated portfolio 76, determined as of the close of the day's trading, becomes the then-current portfolio that is represented at the beginning of the process for the next trading day. Under this component of the preferred embodiment, an active portfolio manager and the manager of an improved index fund are given necessary and appropriate flexibility in managing the portfolio. The publication of totally transparent creation and redemption baskets which reflect the full fund portfolio composition discourages effective confidential implementation of portfolio composition changes by index fund managers. In AMETFs, including the improved ETF index funds, the creation and redemption baskets may not accurately reflect the portfolio manager's target fund portfolio. To protect ongoing shareholders, the manager of any exchange-traded fund, whether actively managed or based on an index, needs the ability to trade between the time the fund receives notice of an incoming fund share creation deposit or an outgoing fund share redemption basket and the time the net asset value is next calculated so that any transaction costs will be reflected in the prices used in the net asset value (NAV) calculations for the fund shares and the creation and redemption baskets.

Early notice permits the portfolio manager to adjust the portfolio composition and incorporate the market impact of the entry or exit of shareholders on the prices used to calculate the fund's NAV. The entering or leaving shareholders are demanding liquidity and they are indirectly paying for it. The portfolio manager's ability to change the composition of the fund portfolio after receiving notice of creation or redemption of fund shares using previously posted creation and redemption baskets is essential to transferring the costs of entering and leaving the portfolio to the entering and leaving shareholders and relieving the ongoing shareholders of this burden.
Entry and Exit of Investors Through an ETF Share Class or an Equivalent Process to Protect Ongoing Shareholders from the Cost of Providing Liquidity to Fund Share Traders.

Fully effective implementation of the improved fund requires that all entry of assets to and removal of assets from the fund is made through the generalized exchange-traded fund share creation and redemption process described above or a procedure providing equivalent protection for ongoing shareholders. This process protects ongoing fund shareholders from the costs of providing liquidity to entering and leaving shareholders. The late trading and market timing abuses uncovered at many mutual funds since September 2003 would not have been possible if the in-kind creation and redemption process, standard in exchange-traded funds, had been in effect for conventional mutual funds. The general requirement for in-kind creation and redemption not only protects fund shareholders from the cost of providing liquidity to traders by creating a clear audit trail for the order entry process, redemption in-kind (or partly in cash at the option of the fund) offers substantial advantages for taxable shareholders through deferral of capital gains realizations until a shareholder decides to sell fund shares.
Conversion of the ETF Share Class, Upon Shareholder Demand, to Specialized Share Classes A variety of Specialized Share Classes will be available for conversion from and back to the ETF Share Class used for fund shareholder entry and exit. These Specialized Share Classes provide custom management fee and marketing fee arrangements to accommodate different types of shareholders with investment objectives that coincide with the objective pursued by the fund. Among other features, these Specialized Share Classes are structured so that investors pay marketing and management fees in a tax-efficient manner and receive appropriate management fee discounts if they are large investors.

Under the U.S. tax code, separately billed fees paid by individuals for investment management services and various other services provided by financial intermediaries are not fully deductible against ordinary income taxes. For individuals subject to the Alternative Minimum Tax, separately billed fees may not be deductible at all. To preserve as much deductibility as possible, the most tax-efficient way for individuals to pay marketing and management fees is to pay them as management or service fees deducted from the investment income produced by funds in which they own shares. Separately billed marketing fees would similarly not be fully, or perhaps even partly, deductible and thus are often paid more tax efficiently when they are embedded in the cost of the fund and deducted from the income distributed by the fund.

Large institutional investors have more negotiating power than individual investors and traditionally pay lower investment management fees. However, in order to manage portfolios effectively and economically, it is best to bring all types of investors into a single pool rather than manage institutional portfolios separately from individual mutual fund portfolios. Such portfolio consolidation is another part of the purpose behind the use of Specialized Share Classes as explained below. Certain share classes would be available only to investors who were able to invest several million dollars or more in a particular fund. The structure of the share class relationships is shown in FIG. 3 and the computer system for share class conversion is illustrated in FIG. 4.

Figure 3:
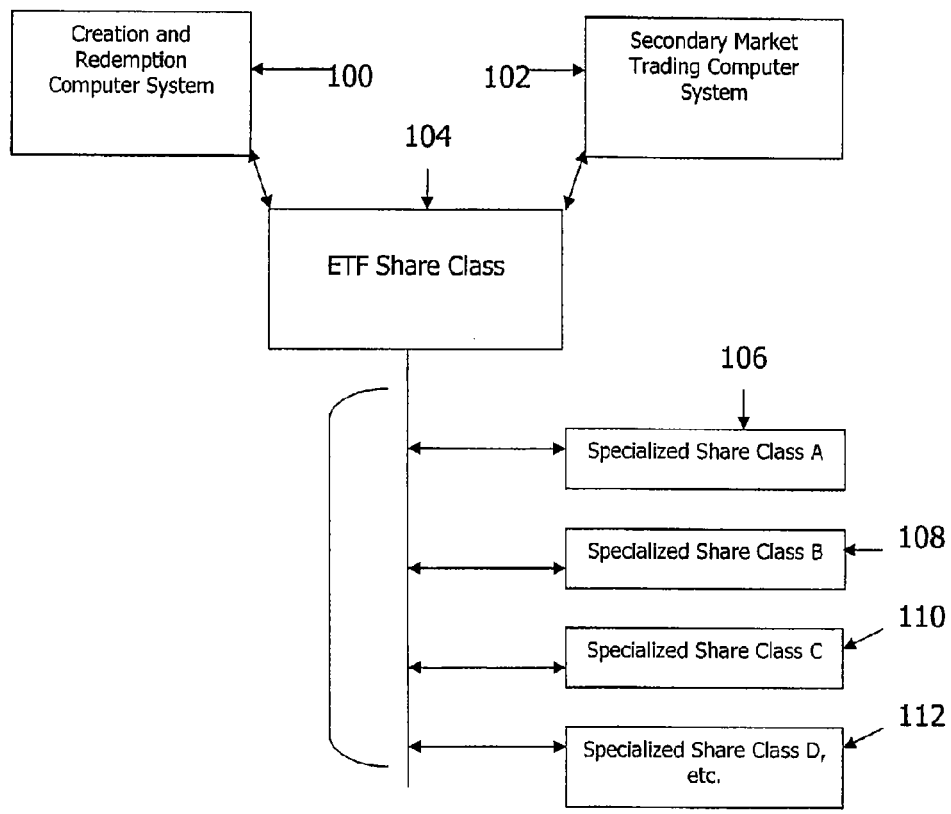
FIG. 3 is a block diagram of the relationship of all share classes.

The share class relationships illustrated in FIG. 3 show an ETF Share Class creation and redemption system 100 similar to the creation side of the system illustrated in FIG. 1, and a secondary market trading computer system 102 which includes functions reflected in the securities markets 18, the trading system 34 of the authorized participants 16 and the trading computer systems 38 of the broker/dealers 22 in FIG. 1. Creation and redemption (entry and exit of assets to and from the fund) involves an ETF Share Class 104. Although the Specialized Share Classes might be traded in a secondary market under some circumstances, the only share class that is ordinarily directly creatable or redeemable in a transaction with the fund is the ETF Share Class. Other share classes might include, as examples, Specialized Share Class A, a front end load share class 106; Specialized Share Class B, a back end load share class 108; Specialized Share Class C, a level load share class 110; and Specialized Share Class D, an institutional share class with a reduced expense ratio 112, for the convenience of various shareholders. Some users of these shares might want to facilitate the payment of a marketing fee to an individual or organization that provides sales and marketing services or advice. Other Specialized Share Classes would provide a variety of embedded marketing and management fees. The share classes A-D are intended to be illustrative, not exhaustive.

Figure 4:
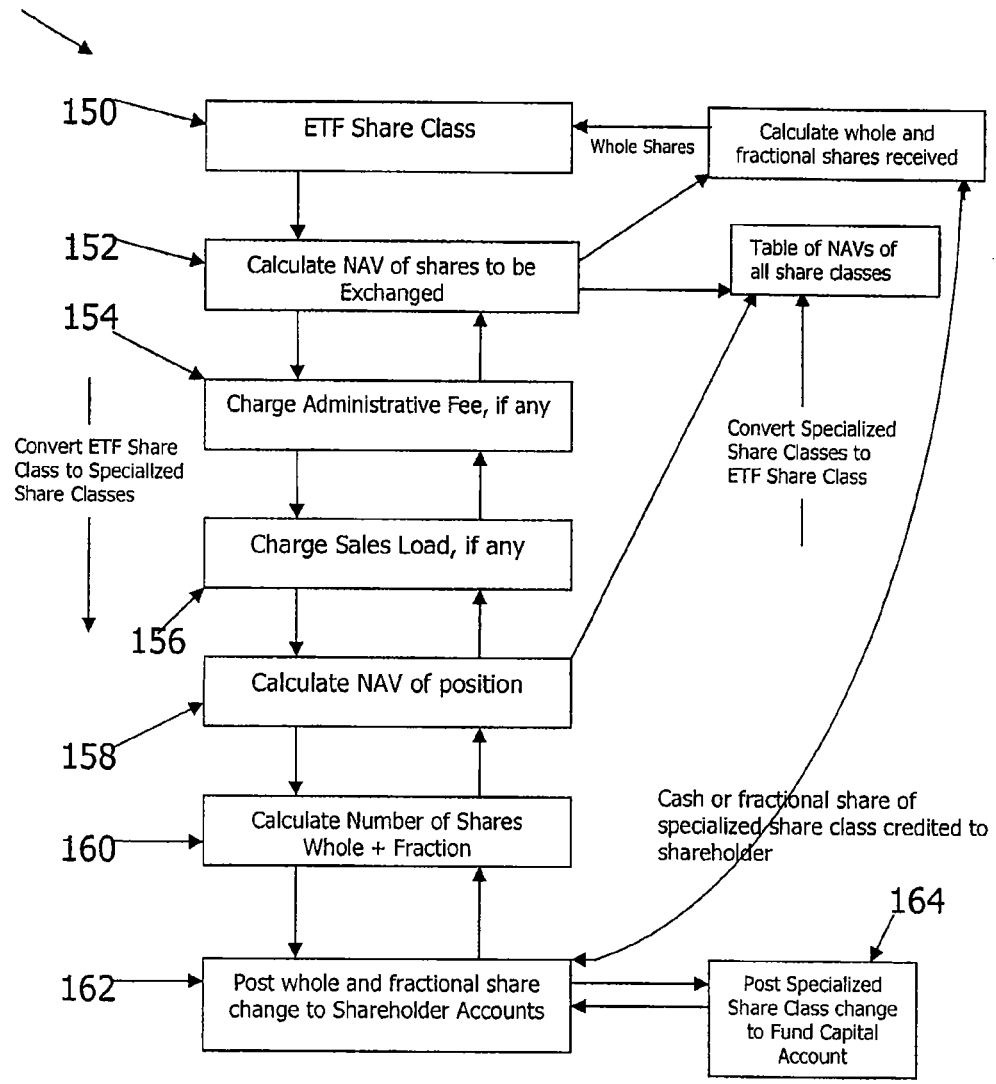
FIG. 4 is a flow diagram of the computerized system for conversion of the General Class of Fund Shares or ETF Share Class to and from Specialized Share Classes.
Figure 5:
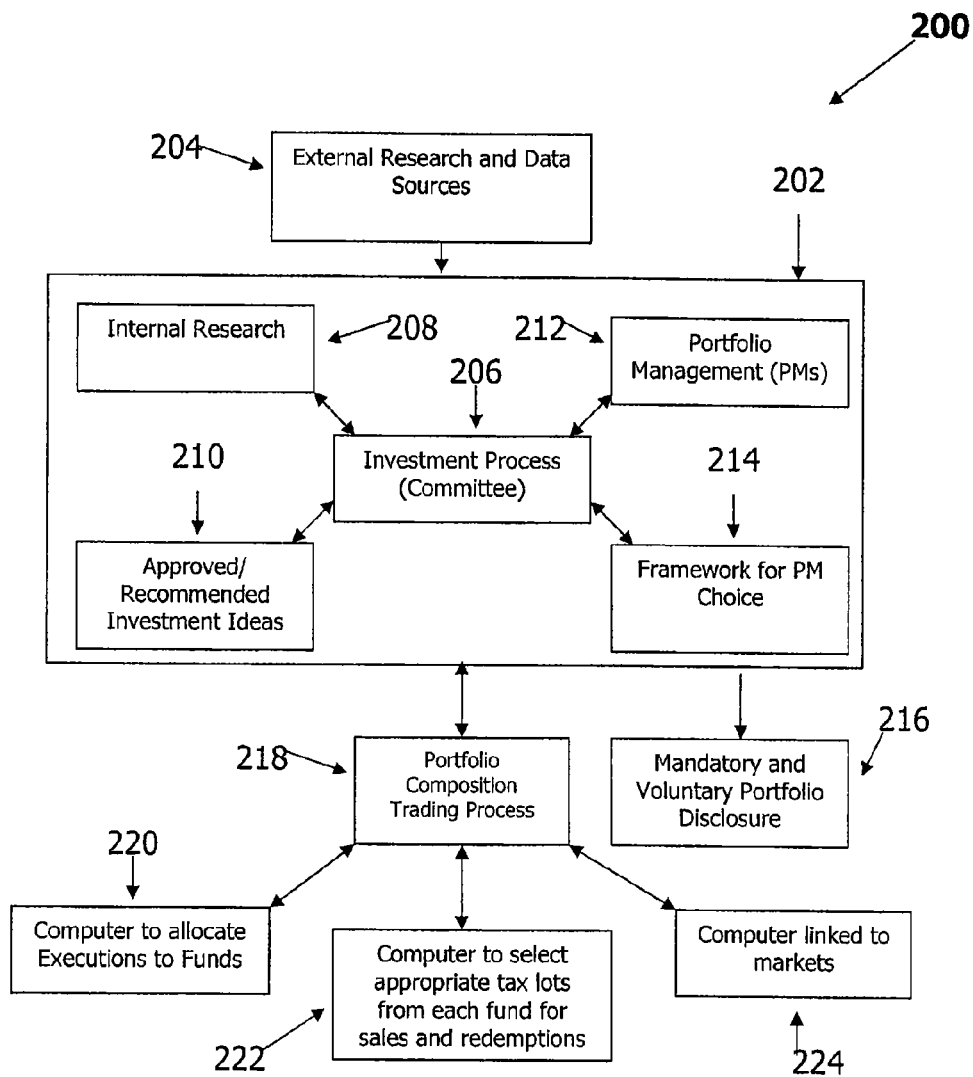
FIG. 5 is a block diagram of the portfolio management and trading system dedicated to the management of a family of AMETFs and other funds.

The share class conversions and exchanges in FIG. 4 are effected through the fund operation computer system 40 in FIG. 1. In FIG. 4, the process first identifies the ETF Share Class in step 150. The net asset value (NAV) of the shares to be exchanged is calculated in step 152. An administrative fee, if any is charged, is charged in step 154. A sales load, if any, associated with the particular Specialized Share Class is charged in step 156. For example, if the share is a share of Specialized Share Class A (with a front end load), the percentage charged for the front end load reduces the total value of the ETF Share Class shares entering into the calculation. The remaining value will determine the NAV available to be converted into Specialized Share Class A shares in step 158. The number of whole and fractional shares for the designated share class is then calculated in step 160. The whole and fractional share amount in the particular share class is posted to the fund's shareholder accounts in step 162. Changes in the Specialized Share Class are posted to the fund's capital account in step 164. Fractional shares will be available for all Specialized Share Classes. A Specialized Share Class may be created as the equivalent of the General Class of Fund Shares or ETF Share Class for fractional share positions under certain circumstances. When and if industry trading, clearing, transfer and custody systems are modified to accommodate fractional shares of fully DTCC-eligible securities, fractional shares of the ETF Share Class may be available. The process in steps 152 to 164 may be reversed to convert Specialized Share Classes back to the ETF Share Class. A table of NAVs of each share class is compiled daily by taking information from step 152 and step 158 and updating these NAVs for changes in the value of the underlying portfolio each day. These calculations are necessary because when a sales load or a different management fee is charged to a particular share class, the NAV of that share class will change in different ways than the ETF Share Class NAV changes, and subsequent transfers to and from that share class must be at values consistent with charges to investors using that class. ETF share equivalents (which may be needed in conjunction with the implementation of a cap on the issuance of new fund shares) are calculated using the ratios of the Specialized Share Class NAVs to the ETF Share Class NAV and adding all the ETF share equivalents of the outstanding shares.

Table 1 below shows the relationship of various alternative share classes to the ETF Share Class based on the ratio of their respective share classes' NAVs to the ETF Share Class NAV.

TABLE 1

| | Number of Shares Outstanding in Class | ETF Share-Equivalents Outstanding |
|---|---|---|
| ETF Share Class | $X_{ETF}$ | $X_{ETF}$ |
| Specialized Share Class A | $X_A$ | $_aX_A$ |
| Specialized Share Class B | $X_B$ | $_bX_B$ |
| Specialized Share Class C | $X_C$ | $_cX_C$ |
| Specialized Share Class D, etc. | $X_D$ | $_dX_D$ |
| Sum of ETF Share Equivalents = | | Y |

In Table 1, a, b, c and d are equal to the ratio of their respective share class's NAV to the ETF Share Class NAV. The sum of the various share class ETF Share Class equivalent net asset values in total (Y) is compared to the fund share cap stated in a fund's prospectus or adopted by the fund board. If Y plus the ETF Share Class equivalents in a standard Creation Unit exceeds the designated cap, no creations will be permitted until a redemption occurs or the cap is increased under the terms of the fund prospectus.

Less Frequent Intra-Day Dissemination of a Precise AMETF Portfolio Valuation Proxy Another feature of the improved fund is an increase in the interval between "precise" intra-day fund share net asset value (NAV) proxies calculated and distributed by NSCC, an industry utility, through electronic quotation vendors during the trading day. The net asset value proxy is based on the contemporaneous bids and offers for each security in the portfolio translated into a per-ETF Share Class share value expressed as a bid and offer or as the midpoint between the bid and the offer. The time interval between publication of these precise net asset value proxies would be greater than the 15-second interval common with today's index ETFs, say, between 5 minutes and 60 minutes in the preferred implementation, and may vary within that range at the discretion of the fund's board of directors, subject to regulatory approval.

The reason for reducing the frequency of net asset value proxy dissemination is that dissemination every 15 seconds provides a total of more than 1500 fund share values during the standard trading day. Given that AMETFs will usually have fewer positions than a broad market index exchange-traded fund, every 15-second dissemination provides a great deal of information and would permit an astute analyst to back calculate the composition of the portfolio and learn inappropriate details about the fund's ongoing trading activities. The appropriate interval for precise NAV proxy dissemination will vary for different funds depending in part upon the number and nature of the securities in the portfolio. However, the appropriate time interval for publication of precise indicative values does not bear a rigid relationship to the number of securities in the portfolio or any measure of portfolio turnover. The fund directors would determine the interval between precise portfolio valuation proxies subject to regulatory approval. Reducing the amount of information on the content of the portfolio provided to the marketplace will protect the fund shareholders from front-running of transactions the fund portfolio manager is making to modify the fund portfolio.

The fund management computer system 32 in FIG. 1 supplies data to a secure market data server (not shown) that continuously updates the net asset value proxy of the fund shares as bids and offers for the portfolio securities change throughout the day. Net asset value proxies are published at an interval approved for each fund by the fund board. The current standard interval for indexed ETFs is every 15 seconds. If an approximate indicative value is required at 15-second intervals for the use of investors and market makers, a randomized process will meet this need while reducing the portfolio information content of net asset value proxy calculations disseminated between precise calculations. Specifically, the values between periodic releases of precise values based on the actual portfolio could be based on the 15-second interval precise portfolio values incremented or decremented by a number drawn at random from a disclosed probability distribution. The random increments and decrements in these values will eliminate the opportunity to use the net asset value proxy publication to determine portfolio composition, yet avoid an indicative price too far away from the actual portfolio value to be useful to market participants.

Improving AMETF Investor Returns by Concentrating Portfolio Manager Effort on Controlled-Size Funds; Capping the Assets the Manager Will Accept for Specific Fund Strategies and Providing for a Higher Fee on Capped Funds that Perform Well In the preferred embodiment, after the AMETF complex reaches a size specified in its fund prospectuses, the investment process used by the management company would be used almost exclusively for products using the fund structure and process. A common set of directors will typically be directors of every fund managed using the fund family's common investment process and the directors will be responsible for ensuring that the investment process has adequate capacity to serve additional funds with different objectives without a detrimental effect on existing funds before the addition of funds not listed in the original documentation. In the preferred embodiment, the funds' prospectuses do not permit the fund manager to manage separate accounts or institutional pooled accounts except as share classes converted from ETF Share Classes. Rather than manage investment products that present a conflict of interest for the ETF Share Classes and the Specialized Share Classes converted from them, the investment manager might sell any excess research or idea capacity along a particular dimension to another investment manger on terms to be approved by the fund's directors. The manager could also have the opportunity to earn a higher fee on a capped portfolio.

Figure 6:
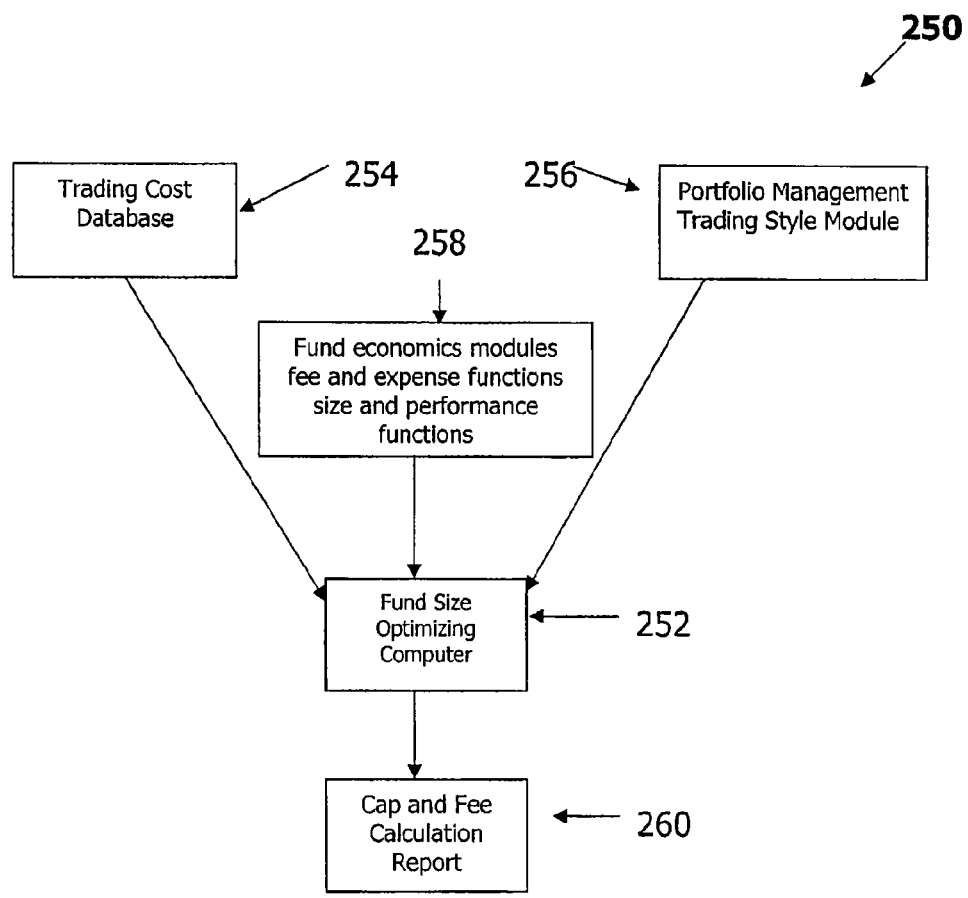
FIG. 6 is a block diagram which illustrates a computer system and databases used to estimate the optimum size of a fund for a cap calculation which may be used instead of embedding a fixed cap on the number of shares outstanding in a fund prospectus.

FIG. 6 illustrates the structure of such an AMETF dedicated portfolio management and trading system 200 which is part of the systems maintained by the portfolio manager 12 in FIG. 1. The portfolio management and trading system 200 is based on an investment process 206 incorporated in an investment management process 202 that also includes input from external research and data sources 204, internal research 208 and portfolio managers (PMs) 212 who are the essential and principal members of the investment process committee. The investment process committee 206 produces approved and recommended investment ideas 210 and a framework for portfolio management choices 214 to be used in the management of the organization's AMETF products. The investment management process 202 prepares the periodic mandatory and any voluntary fund portfolio disclosures 216. Voluntary disclosures could be made available with greater frequency than regulators require with the approval of the fund board. The investment management process 202 delivers instructions for changes to each fund through a portfolio composition trading process 218 that manages portfolio composition trading using the fund portfolio composition management computer system 30. The portfolio composition trading process 218 is indirectly involved in the allocation of executions to the various funds 220 using the fund management computer system 32 in FIG. 1. A tax management computer 222 stores tax data and selects appropriate tax lots of securities from each fund portfolio for delivery against sales and redemptions. A trading desk computer 224 links to various markets where trades are executed to complete the portfolio composition trading framework.

In the preferred implementation, the size of certain funds will be capped by provisions in the fund's prospectus or by a fund board resolution. The principal purpose of capping the size of some funds is to improve the probability that the funds will enjoy superior long-term performance for the benefit of their shareholders. In addition to or as a substitute for a fixed cap set by the prospectus, the fund could rely on fund board resolutions or use a computer system and database to compute the optimal size of a fund to determine the fund asset level at which a cap should be imposed by the fund board.

Figure 7:
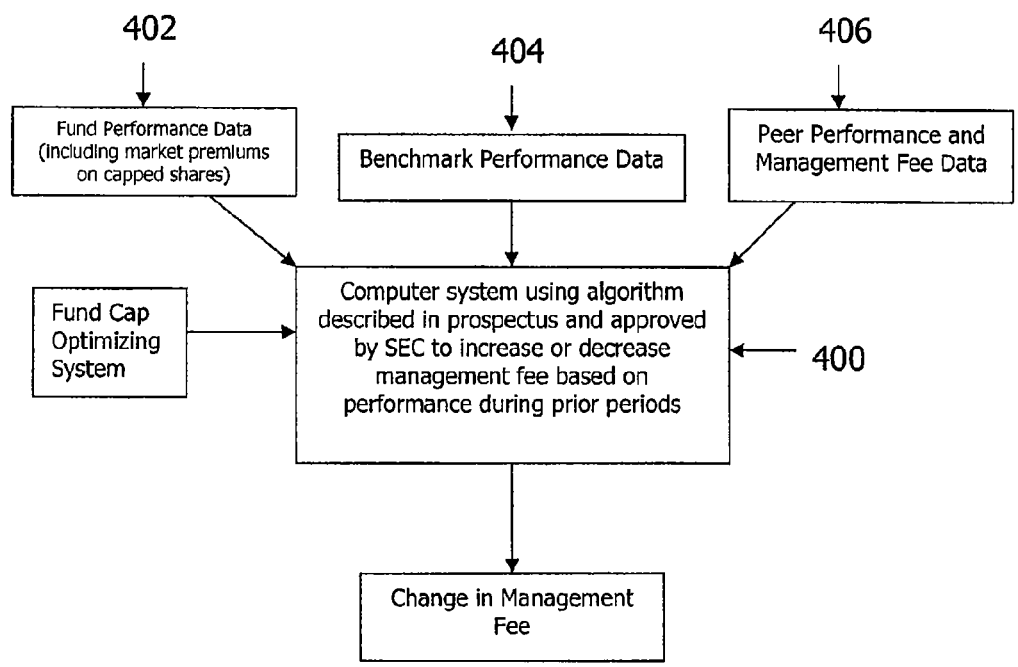
FIG. 7 is a block diagram illustrating a system for calculating changes in a fund management fee in response to changes in fund performance and other variables.

FIG. 7 is a block diagram of a computer system 250 designed to cap the size of a fund. It includes a fund size optimizing computer 252 coupled to a trading cost database 254 which includes, among other features, databases that link trading costs to the size of the positions which the family of funds as a group hold in individual securities with varying capitalizations and levels of trading activity. A separate trading style module 256 will contain information on the various fund trading styles and the trading cost experiences of the fund's portfolio managers and traders under different market conditions. A cost module 258 contains fee and expense functions for different fund sizes and performance functions based on industry experience and the experience of the managers employed by the funds. In addition, the cost module 258 has functions relating to the interaction between the fee structure and methods the funds are permitted to use to require re-conversion of low management fee Specialized Share Classes to the ETF Share Class and an algorithm for changing the management fee on the exchange-traded share class in response to performance achieved by the fund's portfolio management process. The fund size optimizing computer 252 produces an appropriate cap and fee calculation report 260 for recommendation to the fund board.

The purpose of capping some funds is to create an environment which eliminates the traditional conflict between the interests of investors and the interests of investment managers which usually leads managers to accumulate large pools of assets that make superior investment performance difficult or impossible.

With the exception of some funds holding predominantly large capitalization stocks, the investment manager will state in the fund prospectus or the fund board will determine the maximum number of ETF equivalent shares that each fund in a family will issue. The manager may also use a controlled share-growth formula to prevent growth that will swamp the manager's ability to achieve superior performance for the fund. The cap could be increased or the formula modified at a future date if the manager was comfortable with its ability to manage a larger portfolio and if the fund board or shareholders approved a change.

One purpose of the computer system 250 in FIG. 7 is to provide fee incentives for the fund manager to manage a smaller pool of assets more intensely and more effectively, providing better performance for investors and equal or better compensation for the fund managers without increasing the size of the fund portfolios to the extent that superior performance is no longer possible.

The prospectus of a capped fund will state the maximum number of ETF equivalent shares that the fund will issue or will otherwise describe the process for limiting the size of the fund. The Specialized Share Classes may have share prices different from the per share price of the ETF Share Class. The ETF share equivalent of a share in a Specialized Share Class will be equal to its net asset value (NAV) divided by the NAV of the ETF shares. If the maximum total ETF share equivalent issuance for a fund is reached, no more shares will be issued unless shares are first redeemed or the maximum issuance is increased. In the preferred embodiment, an authorized participant that redeems shares to reduce its inventory of shares in a fund that has reached its maximum size will have the exclusive right to re-create those shares at net asset value (NAV) plus a standard creation fee for a period stated in the fund prospectus. If the redeeming authorized participant does not re-create within the stated period, the fund board could shrink the fund by lowering the cap.

Capping fund size in some portfolios can solve the problem of finding a superior active manager and having assets managed by that manager over a long period of time. Capping should permit portfolio managers to post better performance records and, subject to the operation of a process to increase the management fee as a reward for good performance, earn more income. With fund management fee increases linked to multi-year performance and capped fund shares trading at a premium to net asset value (NAV), both investors and managers can earn as much or more than they might earn from larger portfolios using traditional fund and fee structures. The new fee structure will provide an incentive for performance more in line with the fund shareholders' interests than current fee structures.

Figure 8:
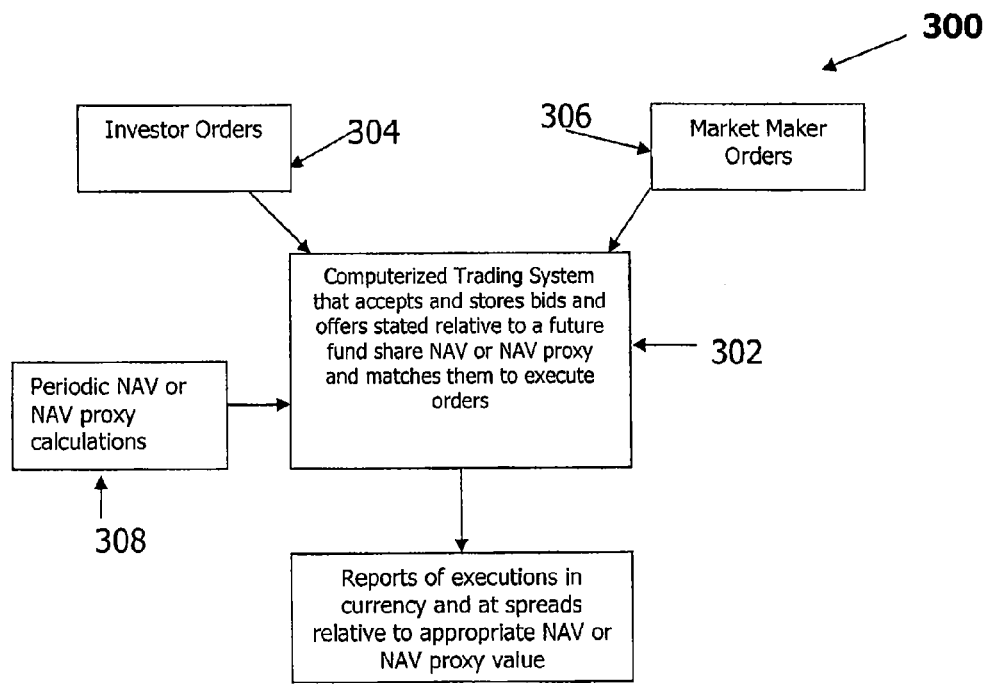
FIG. 8 is a block diagram of a computerized market for trading fund and other basket shares at prices linked to the future net asset value of the share classes.

FIG. 8 shows a computer system 400 and associated data sources used to determine the management fee for a capped fund according to one aspect of the present invention. The computer system 400 includes a program based on an algorithm described in the fund prospectus and approved by the SEC that permits the fund board to increase or decrease the management fee based on fund performance during prior periods. The computer system 400 uses a fund performance data source 402, a benchmark performance data source 404 and a peer performance and management fee data source 406. The performance data will include traditional performance comparisons plus measures of average premiums over NAV that the ETF Share Class achieves. Such premiums may lead to an increased management fee in at least two ways. First, if the ETF Share Class trades at an average premium over NAV that exceeds a level stated in the prospectus for a specified time, the holders of Specialized Share Classes with discounted management fees can be required to convert their shares to the full fee ETF Share Class. Second, if the premium persists at a designated level, the management fee can be increased to a multiple of the base rate. Appropriate terms to reduce fees if performance drops below a specified standard are part of the algorithm. The algorithm reflects the fact that the manager is giving up the ability to increase assets beyond the cap on the strength of a superior performance record. Thus, the potential for fee reduction is more limited than the potential for a fee increase in some circumstances. The computer system 400 outputs appropriate changes in the management fee for consideration by the fund board or automatic implementation under terms stated in the fund prospectus.

The creation and redemption rules are designed to encourage occasional redemptions after a fund reaches its cap in terms of number of ETF share equivalents. The existence of a cap without modest variability in the number of shares outstanding forecloses redemptions and leads to much greater share price volatility in the secondary market trading of the capped funds' shares than is necessary or desirable. The absence of redemptions could also reduce the tax efficiency of the fund. It is appropriate that a market maker with a temporary excess inventory of shares in a fund is able to redeem fund shares from time to time, bringing the size of the fund below the stated ceiling on the number of shares the fund would issue. This redemption permits the fund share market price to more closely reflect changes in the fund's net asset value and avoid significant fluctuations in any premium which the market price of the shares may carry over the fund's net asset value. Subsequent to such a redemption and for a period designated in the fund's prospectus, the redeeming authorized participant has the exclusive right to re-create the shares it had redeemed under terms established by the fund prior to its closing to new creations. These terms are essentially a re-creation of the shares redeemed with an in-kind deposit priced at net asset value plus a normal creation fee. If the redeemer does not re-create within the designated period, the fund has the option of either shrinking the cap on the number of shares it would issue (to shrink the fund because management has determined that the capped size was too large) or permitting any authorized participant to create shares up to the share ceiling under standard (NAV) terms for fund share creations.

This redemption and re-creation provision helps market makers with fund share inventory management. It moderates fluctuations in any premium on the fund shares' price in the secondary market once the ceiling on share issuance is reached. It also provides a mechanism whereby an occasional in-kind redemption can enhance the fund's tax efficiency. The expiration of the right to re-create also permits the fund board to reduce the fund's maximum capitalization if the fund's market space becomes less liquid or if the original ceiling on share issuance was not set low enough to protect the fund from being overwhelmed with assets. Any decision to shrink the market capitalization originates with the manager, with the fund board or with shareholders by petition.

Organization of the AMETF Investment Manager to Concentrate Portfolio Management Efforts on the Management of Funds to Reduce Leakage of Investment Information by Restricting the Investment Manager's Activities.

Another feature of the preferred implementation of the present invention preserves the value of the output of the investment process more directly. With a unified portfolio management and trading operation and limitations on product offerings, shareholders are well-protected from inappropriate dissemination of investment information. Specifically, the value of an investment idea is preserved until the funds managed by the organization have time to buy or sell as much as they want of a particular security.

One of the weaknesses of the typical active manager's investment management process—in which different types of accounts are buying or selling the same security—is information leakage. With a single pool for each fund and funds as the manager's only product, there are no conflicts associated with the order in which transactions are made, and there is no leakage to outside organizations from trade confirmations sent to owners of separate accounts and individuals associated with institutional and non-public pooled portfolios. Of all possible structures for the collective management of investment portfolios, pooling is accomplished most efficiently and most confidentially with multiple-share-class funds that control publication of their portfolios.

With the concurrence of a fund's directors, the investment manager may disclose a recent fund portfolio to the public at appropriate intervals by any means the appropriate regulatory authorities approve. These may include posting on a website or other electronic dissemination. The disclosure process permits free and equal access to the information by any investor with Internet access. When implied portfolio disclosure is made through changes in creation and redemption basket composition, these changes are appropriately disseminated through public postings. Formal portfolio disclosure can be no less frequent than the quarterly disclosure with a 60-day lag now required of conventional mutual funds. However, in many cases, fund managers will be encouraged by market forces to make more frequent portfolio disclosures to increase the efficiency of secondary market trading in the fund shares without harm to ongoing fund shareholders from such disclosures. The computer model disclosed in FIG. 6 monitors both portfolio construction and transaction plans and governs and implements any portfolio disclosures that take place at shorter intervals than the interval imposed by regulators.

Figure 9:
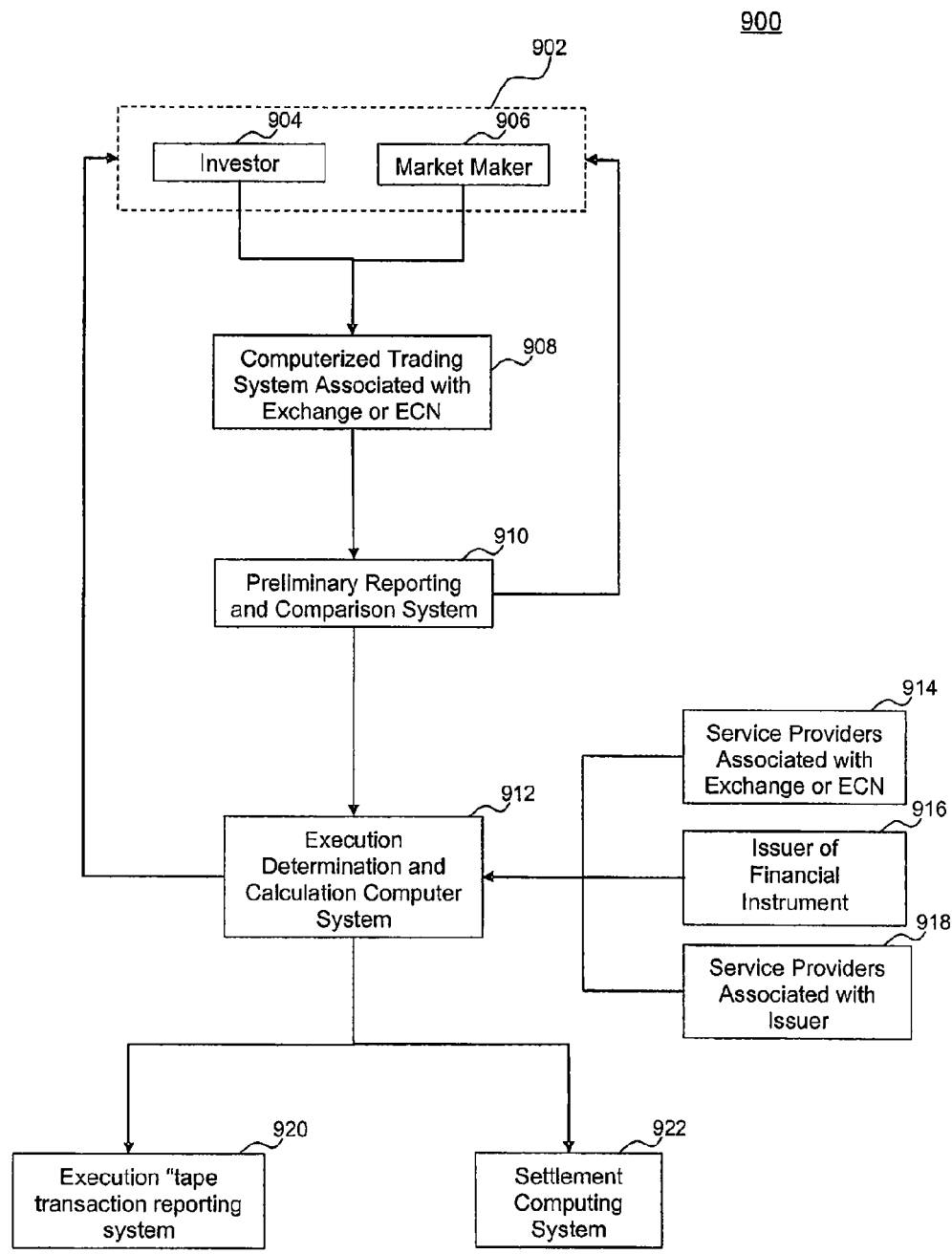
FIG. 9 is an exemplary system for trading financial instruments on an exchange or on an electronic communications network (ECN) in accordance with an embodiment of the present invention.

A Trading System for ETFs and Other Basket Instruments that Parallels the Traditional Method for Purchase and Sale of Conventional Mutual Funds at Net Asset Value (NAV) without Compromising the Investor Protection Provided by the exchange-Traded Fund Creation and Redemption Structure Licenses may be offered to appropriate trading venues to use computer systems designed to permit special intra-day auctions linked to periodic disclosure of the intra-day valuation proxy and the closing net asset value (NAV). These auctions will provide a trading mechanism intermediate in some respects between those of mutual funds and today's benchmark index ETFs. FIG. 9 shows a computerized market 300 allowing trading of ETF shares at prices linked to future NAV calculations which may be used as a pricing basis. The market 300 is centered on a computerized trading system 302. The computerized trading system 302 matches orders in terms of their statement of a bid or offer below, at or above the NAV or NAV proxy to be calculated on prevailing bids and offers for portfolio holdings and disclosed at a specified future time. The computerized trading system 302 accepts orders from investors 304 and market makers 306. The computerized trading system 302 receives periodic NAV calculations and NAV proxy calculations 308. The computerized trading system 302 produces reports of executions in currency and at spreads relative to the daily closing NAV or NAV proxy values posted at specified times. The trading system accommodates trading in any fund, trust or structured product for which a net asset value based on the prices of its holdings of securities or other financial instruments is periodically calculated.

The NAV-linked executions at stated times permit investors to place orders with market makers through traditional financial intermediaries for purchase and sale of shares at a price linked to an hourly posting of the intra-day net asset value proxy or at the official end-of-day net asset value. In some cases, these trades may be done at a spread and in others the market maker may provide a guarantee of a fill at net asset value with no spread or commission—the effective execution cost depending in part upon the time interval between the entry of the order by the investor or the investor's agent and the price calculation. Instead of making a market at a specific price, the market maker bids and offers at a spread below, at and above the next reported hourly intra-day proxy value or the closing NAV. The spread away from the designated NAV determination will generally widen as the time of price determination draws closer because the market maker has less time before the price determination to hedge or offset risk with another trade.

Using the closing NAV as the target in such a trading structure makes the pricing and trading of ETFs much like the conventional mutual fund trading process. Market makers may be willing to guarantee execution with no commission at the closing net asset value on orders received far enough in advance. Obviously, an order for execution at today's NAV with no commission is not acceptable to a market maker after a certain time. The cut-off time for such an order may vary among funds and among market makers.

While mutual fund transaction systems are designed to accommodate trades denominated in dollars with share positions expressed as whole and fractional shares, stock and ETF trading systems and, most significantly, clearing systems do not accommodate fractional shares. Some firms show fractional stock or ETF shares in a customer's account but such fractional share positions cannot be transferred electronically to other firms. The trading mechanism of the preferred embodiment converts part or all of a dollar-based transaction into a Specialized Share Class with the same per share NAV as the General Class of Fund Shares and the appropriate share position will appear in the customer's account as a conventional fund share class position. This feature adds to the similarity of this trading process to the traditional mutual fund transaction process.

Cost Savings to Investors and Investment Managers

The following table, Table 2, compares estimates of the costs experienced by a typical long-term investor in an actively-managed domestic equity mutual fund to the costs of an actively-managed domestic equity version of the new fund according to the present invention. The potential cost/performance difference is as much as 4.10% per year. The new structure offers substantial advantages to investors, largely from eliminating unnecessary or inappropriate costs and fund size-related performance penalties.

TABLE 2

| | Equity Mutual Fund | New Equity Fund |
|---|---|---|
| Expense Ratio | 1.0% | 1.0% |
| Portfolio Composition Trades Inside the Fund | 1.5% | 1.5% |
| Fund Share Trading Liquidity Costs | 1.4% | |
| Leakage of Investment Info/Index Publication | 0.35% | |
| Fund Supermarket vs. Multi-Share Class ETF | 0.35% | |
| Performance Penalty from Oversized Funds, Net of Higher Performance Fee | Up to 2.00% | |
| Annual Total | 6.60% | 2.50% |

In Table 2, there are no recurring fund share trading liquidity costs for the new fund structure because any costs to enter and leave the ETF Share Class are paid by the trading shareholder only when entering or leaving the fund. The estimate of the cost of information leakage is based on an estimate of half the typical annual cost of the publication effect of S&P 500 composition changes. The fund supermarket costs are usually annual costs to all of a fund's shareholders in no transaction fee (NTF) shares, whether they use the fund supermarket or not. Some annual supermarket fees paid by funds are higher than 0.35%. There are no annual marketing fees in the new structure without a specific agreement by the investor to pay them in connection with ownership of a Specialized Share Class. The performance penalty associated with fund size is an estimate based on limited data from active fund managers and trading cost analysts.

It will be apparent to those skilled in the art that various modifications and variations can be made in the method and system of the present invention without departing from the spirit or scope of the present invention. Thus, the present invention is not limited by the foregoing descriptions but is intended to cover all modifications and variations that come within the scope of the spirit of the present invention and the claims that follow.

Example 2

Systems, Methods, and Computer Program Products for Trading Financial Instruments on an Exchange Additional embodiments of the invention shall now be described in terms of exemplary systems, methods, and computer program products for trading financial instruments on an exchange or an electronic communications network (ECN). Within such embodiments, financial instruments may include, but are not limited to securities, mutual funds, exchange-traded funds, open-end funds, closed-end fund, stocks, swaps, futures, and derivatives, either alone or in combination. Further, the embodiments described herein may accommodate any additional financial instrument that would be apparent to one skilled in the art and that may be traded on an exchange of ECN.

According to embodiments of the invention, a wide range of financial instruments, trading techniques, and trading processes may be accommodated with changes in exchange order formats, structures, and processes with the common element being a settlement price, a trade volume, or any combination of a settlement price and a trade volume to be determined in the future. Embodiments of price- and volume-contingent trading processes include, but are not limited to:

a. Volume-Weighted Average Price (VWAP), which represents a total price of instruments traded during a period divided by the total number of instruments traded;

b. Time-Weighted Average Price (TWAP), which is a variant of VWAP that weights the price using the time the price spends at each level rather than the volume traded at each level;

c. Target Volume (TVOL), which is a strategy used to trade a specified percent or fraction of the actual market volume, usually at a specified relationship to the average price at which that volume trades; and d. Net Asset Value (NAV)-based trading, which permits settlement of fund share transactions and transactions in other instruments for which net asset values are periodically calculated at prices linked to a specified posting of a net asset value calculation to be made after the time of the trade.

According to embodiments of the invention, each of the above-described execution formats and processes may be characterized by settlement terms that are determined by future trading prices, future trading volumes, future NAV calculations, or some other variable or combination of variables that sets the trade's specifications and settlement provisions once the determining variables have been calculated. Such other variables will be apparent to persons skilled in the relevant arts based on the teachings contained herein. Also, other execution formats and processes applicable to the present invention will be apparent to persons skilled in the relevant arts based on the teachings contained herein.

In some embodiments, exchange transactions may utilize an arbitrary base number or proxy value, such as 100, as a centering point for either a price measured in currency or in percent. Further, additional embodiments may incorporate a root symbol with an extension or a special symbol to designate both the financial instrument and the order type.

Further, in contrast to certain informal trading instructions or trading algorithms whereby a broker attempts to provide an execution as close as possible to a specified net asset value or as close as possible to a specified average value and/or fraction of total volume, trades and transactions described herein may be anonymously executed firm contracts for settlement at a specific relationship to a specified net asset value calculation, or to specified realized average prices and/or volumes.

Trades based upon volume-weighted average pricing are the most commonly used over-the-counter transactions contingent upon future prices. However, in spite of their popularity, VWAP trades have often been criticized for their effect on markets. By coupling traditional volume-weighted average pricing with exchange trading, the present invention provides an end-of-day transparency in VWAP trading that is absent from existing trading processes.

A volume-weighted average price (VWAP) is a ratio of a total value of an item traded to total volume traded over a particular time horizon (usually one trading session or the remainder of a trading session after an order is entered), and as such, VWAP is the average price for a financial instrument over the specified time horizon with proportionately more weight given to periods of heaviest trading. In equity markets, VWAP is a common measure of the average price a stock traded at over the measurement period, and VWAP is often used as a trading cost benchmark by investors who aim to be as passive as possible in their trade executions. Many institutional investors fall into this category. The aim of using a VWAP trading target is to ensure that the broker or market maker executes the order in line with the volume and prices available in the market.

VWAP orders (and related orders described herein) may be based on the VWAP calculation for an entire trading session or for only a portion of the trading session. A common contract in the over-the-counter market may use the VWAP calculation for the portion of the trading session that remains after an agreement to buy or sell at VWAP is made. Weaknesses of currently available over-the-counter trading in these agreements include an oversimplification of remainder of session VWAP calculations, a lack of competition in pricing remainder-of-session trades, a need to renegotiate any change in an order with a specific broker or market maker, and an absence of a price or volume calculation subject to regulatory oversight.

Even if the exchange does not introduce a remainder-of-session contract, the availability of competitive quotations throughout the session for full-session contracts on the exchange will enable an investor who wants to cancel or offset the effect of the remaining transactions in a full session contract to enter into a counter-trade that largely or entirely offsets the impact of remainder of the session trades that might be executed by the counterparty to a full session trade. The full-session contract will be competitively priced throughout the session. In less formal arrangements in the over-the-counter market, an investor is dependent on the goodwill of a market maker when negotiating his way out of the remainder of a full session VWAP trade.

Order entry systems and quotation standards in financial markets typically reflect a price at which securities, commodities or other financial instruments are exchanged and the size of the position to be purchased or sold. If an item is trading for around $20.00, a bid to purchase the item might be $19.95 and an offer to sell the item might be $20.05. The quotation structure also reflects the respective quantities bid for and offered. This traditional exchange quotation and order entry structure has impeded the development of transaction mechanisms to deal with prices and quantities to be determined in the future because there is no simple correlation between current prices and volumes, and prices and volumes which may be determined by future trading or in some other manner.

Through the embodiments described herein, the needs of investors using these contingent orders are accommodated by stating transaction prices at or relative to a price or volume or price and volume that is currently unknown, but that will be determined in the future. Bids and offers (and, in some cases, trading volumes) to be determined will be stated relative to an exemplary anchor point, or proxy value. The anchor point or proxy value can be any agreed upon value, such as but not limited to 100. The present invention is not limited to this specific numerical anchor point or proxy value, but its use provides a simple mechanism by which market participants relate the present market to a price or volume to be determined in the future. One skilled in the art would recognize that a number of numerical anchor points would be suitable for use within the embodiments of the present invention.

Using the example of the above-mentioned item trading at $20.00, a price that would be close to the future price might be transacted in terms of bids at 99.95 (5 cents less than the proxy) and offers at 100.05 (5 cents greater than the proxy), representing the essence of the bid at $19.95 ($20.00 minus $0.05) and the offer at $20.05 ($20.00 plus $0.05) that was cited above. If there is a great deal of uncertainty as to the appropriate future price or an absence of active liquidity providers, the appropriate bid might be stated at 99.50 versus an offer of 100.50. These quotations would suggest a bid at $19.50 and an offer at $20.50 in an instrument trading at $20.00. In this example, a benchmark settlement price of $21.00 would call for settlement of a trade at the bid side of 99.95 at a price of $20.95. The above examples represent currency applications. Percentage applications where 99.95 and 100.05 translate into $19.99 (0.9995×$20.00) and $20.01 (1.0005×$20.00) with a benchmark settlement at $20.00 are also possible and fall within the scope of the invention, but seem less intuitive in most trading applications.

In the foregoing examples, the use of an exemplary anchor point or proxy value, such as 100, should be understood as a way to transact around the price to be determined in the future rather than absolute dollar amounts. Percentage applications may be more appropriate for transactions based on trading volume to be determined in the future. However, the present invention may employ percentage applications to describe transactions based on any combination of price and trading volume that would be apparent to one skilled in the art.

Further, while either a price reference standard or a percentage reference standard can be adopted for a given trading market, there is no necessary reason for all markets to adopt the same standard. For example, one market may use a currency-based difference and another market can use percentages of the determining price or volume. As described within the embodiments below, TVOL trades may be entered to buy or sell a specific percentage of the instruments traded on an exchange during the specified period, and VWAP trades may likewise be entered to buy or sell shares at a specific future price on the same exchange.

Symbols and Extensions for Contingent Trading of Financial Instruments

One feature of many U.S. markets is a limitation on the number and type of characters that can be accommodated in various data fields of a quotation or order entry system. In some cases, these symbology constraints are inherent in the core system; in others, they might be accommodated in the core system over time and at a manageable cost, but legacy feeder systems at customer locations would also have to be modified. It can, therefore, be useful to use a root symbol which might have, in a typical case, three or four characters and an extension consisting of additional characters which describe the nature of the instrument being traded in more detail and the basis for trading, i.e., trading at a future price or a percentage of volume during a designated period.

The root symbol of a financial instrument, such as the Standard & Poor's Depositary Receipts (SPDRs, pronounced spiders, trading symbol SPY), might be followed by a decimal point and the letters VW for VWAP trading during a full day's trading session. For time-weighted average price (TWAP) trading, the letters following the decimal for a full session average might be TW. For target volume (TVOL) trading, a future volume determined trading strategy that calls for execution of transactions based on a targeted percentage of total market volume, the extension might be TV. For net asset value (NAV) based pricing, a type of future price or value determined trading appropriate for exchange-traded funds, closed-end funds and other instruments for which a net asset value is periodically calculated, the end-of-session NAV extension might be NV. In additional embodiments, these extensions may be further modified by changing letters to distinguish between trades to be settled at the average price during the entire daily trading session, during the remainder of the trading session beginning with the next transaction after the VWAP, TWAP or TVOL contract is executed or at an NAV determined at a time other than the market close. Such conventions may accommodate a range of innovative order variations with a readily understood symbology useful to market participants.

Table 3 outlines a number of exemplary extensions that may be applied to a root symbol of a financial instrument in accordance with embodiments of the present invention. It is noted that the extensions shown in Table 3 as well as others described herein are provided solely for purposes of illustration, and not limitation. Other means for denoting contingent trading as described herein, whether involving symbols, extensions or some other approach, will be apparent to persons skilled in the art based on the teachings contained herein.

In the example of Table 3, Standard & Poor's Depository Receipts (SPDRs), rather than a common stock, are used to illustrate the application of the present invention to both NAV-based trading and order types that may be used in conjunction with any financial instrument.

TABLE 3

| Trade Type | Full Session or End of Day | Rest of Session | Hourly NAV | Cap or Floor on Price Permitted |
|---|---|---|---|---|
| VWAP | SPY.VW | SPY.WR | — | Yes |
| TWAP | SPY.TW | SPY.TR | — | Yes |
| TVOL | SPY.TV | SPY.VR | — | Yes |
| NAV | SPY.NV | N/A | SPY.NA, SPY.NB, etc. | Yes |

Table 3 outlines exemplary symbology and trading variations for various types of transactions. In a TVOL trade, for example, a VWAP price relationship or a price cap or floor can be a condition of most orders. The cap or floor can be included or optional in the other order types. Investors may expect that some orders entered with a cap or floor are both less likely to be executed and less likely to attract aggressive traders.

In the hourly NAV column, extensions .NA and .NB are used to suggest NAV calculations that might be made hourly at, say, 10:00 a.m. and 11:00 a.m., respectively, if most U.S. financial markets continue to open at 9:30 a.m. Eastern Time. Although not outlined within Table 3, additional embodiments may incorporate VWAP, TWAP and TVOL executions based on hourly or other specified periods.

In an embodiment described above with respect to Table 3, a basic, or root symbol of a security or other financial instrument has been combined with an extension to describe the nature of the execution process. In an additional embodiment, a newly specified symbol designates both the instrument and the execution type. Further, a full session VWAP trade in the SPDR may be described by a symbol such as SPY.VW, where the extension is used not only to designate the execution process, but also the settlement process. In such an embodiment, the settlement process may be described in terms of at least one of: (i) transaction size; (ii) routing codes; (iii) instructions; (iv) price; (v) order price; (vi) time-in-force; (vii) settlement type; and (viii) limit price, as outlined below.

The specifics of an exchange market order entry process are constrained by the systems in place at the exchange and on the computers of its customers. One preferred embodiment of this invention modifies some order entry conventions in use at the New York Stock Exchange (NYSE), and the embodiments described herein describe functions that might be performed with data in certain fields using NYSE terminology. The terminology and conventions will be different to varying degrees on other securities exchanges and significantly different on futures exchanges. While some unaffected fields will be described for clarity even if their use is not modified to accommodate the price- and volume-contingent orders described herein, the above description illustrates how the existing structure of exchange order entry might accommodate the types of price and volume contingent trades described herein.

(i) Size

The size field carries the number of shares or other units to be bought or sold. For most orders of financial instruments, including the transaction variations described herein, the size represents simply the number of shares covered by the order. With the exception of the NAV-based trades, these price- and volume-contingent orders are designed primarily for use by institutional or other large investors. Consequently, trade entry may be restricted to round lots for some order types. For example, an order for 100 shares is designated as 100, but the last two digits are always zeros for order types limited to round lots.

For TVOL trades, the order is not expressed in terms of a number of shares because the number of shares is contingent on the number of shares traded during an interval. In one embodiment, an appropriate convention would fix the size field for TVOL trades at 100, representing one percent of the day's or other relevant time period's trading volume. Traders would execute six separate orders for "100" to cover 6% of the session's volume. Alternately, the size of the field may be capped at 1,000 so that no more than 10% of the transaction volume during a designated period or session can be contracted for with a single trade. With this convention, an order for "600" in the size field covers 6% of the volume in the specified time period. Further, one skilled in the art would recognize that a number of additional techniques may be employed to accommodate the volume percentage term in a TVOL order.

(ii) Routing Codes

While routing codes are used principally to direct an order to a particular execution facility at the exchange, they might be used in contingent orders for trade designation or settlement control, either as a supplement to a special symbol or symbol extension or as a separate designator.

(iii) Instructions

In the embodiments described above, three types of instructions may be appropriate: BUY (Buy), SL (Sell) or SSHRT^EXEMPT (sell short exempt from the uptick rule). The sell short exempt instruction is used primarily for trades in exchange traded funds which are exempt from the uptick rule, but which still need to be designated as a short sale for other regulatory purposes. In trades contingent on a future price or volume, the instruction set for a securities trade cannot reasonably incorporate a traditional non-exempt short sale because the initial transaction merely engages the buy-side party to receive shares at a price or in a size (or both) to be determined. Similarly, the sell-side party contracts to deliver shares now owned or to be purchased on a timely basis to fulfill the contract. Permitting a short sale in a non-exempt security or financial instrument in this manner would provide a potential regulatory end run around the uptick rule. At such time as short sale regulations change, what are now non-exempt short sales may be permitted to use the non-exempt short sale order type.

(iv) Price

For price-contingent trades, the core basis price may be a standard set by the exchange, which, as suggested above, might be 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL. To the extent that a market participant desires to put a limit on the actual share price, the limit may be specified in the limit price field as described below.

(v) Order Type

Ordinarily, market, market-on-close, limit or other qualifications or extensions are used in stating an order. An order type not currently in use might be used alone or as a supplementary field to designate this order as a VWAP, TVOL, NAV or other trade type.

(vi) Time-in-Force

Time-in-force variations from day orders are within the scope of the present invention.

(vii) Settlement Type

The settlement default in most trades of securities in the United States is "regular way," i.e., settlement on the third day after execution. The settlement terms on the trades described herein are set when all price or volume contingencies are determined, usually shortly after the market close on the trade date, making third day settlement a reasonable choice. However, VWAP-based and NAV-based orders for "cash settlement" are expected to be common and cash settlement can be the default or an available option in some of these trades To meet processing requirements, one embodiment of the invention uses a new settlement type or types specifically for these executions or to trigger a special transaction restatement and settlement process after capture of the necessary contingent variables by the symbol, the symbol extension or a routing code. The contingent trades would be reported to the counterparties for comparison shortly after the execution, but the trades would have to be restated to incorporate contingencies. The restated trades would then settle. The contingent trades would not settle but a record of them would be retained for regulatory purposes.

(viii) Limit Price

New York Stock Exchange orders and orders on many other exchanges can have two price fields. The second price field usually states a limit such as a cap or floor. A limit is usually based on the dollar price of a share. In the case of a buy order, the limit price would be a cap by default. In the case of a sell order, the limit price would be a floor by default and the price would be the dollar price of the underlying share, not the "100" or other basis price used in the primary price field.

Systems and Methods for Trading Financial Instruments on an Exchange

FIG. 9 is an exemplary system 900 for trading financial instruments on an exchange or an electronic communications network (ECN) in accordance with an embodiment of the present invention. The exemplary system 900 comprises a number of parties 902 that enter orders to trade financial instruments, such as but not limited to, common stocks, mutual funds and exchange-traded funds (ETFs) on an exchange or an electronic communications network (ECN). In the embodiment of FIG. 9, the parties 902 may include an investor 904 and a market maker 906, although in additional embodiments, the parties 902 may be comprised of any number of investors, acting individually or through brokers, and market makers, depending on the nature of the market and the requirements of market participants at any given time.

The investor 904 and market maker 906 may enter orders to trade the financial instrument by electronically transmitting bids to purchase the financial instrument and offers to sell the financial instrument to a computerized trading system 908 that is associated with the exchange or ECN. The bids and offers for the financial instrument may be stated relative to a contingency based on a future price or net asset value and/or future trading volume of the financial instrument. The range of possible contingencies may include, but is not limited to, a volume-weighted average price of the financial instrument (VWAP), time-weighed average price of the financial instrument (TWAP), a target trading volume of the financial instrument as a percentage of total volume in the market during a specified period (TVOL), and net asset value (NAV) calculations of the financial instrument typically provided by fund issuers or service providers associated with the issuer of the financial instrument.

As described above in Table 3, the respective VWAP-based, TWAP-based, and TVOL-based contingencies may be calculated over a full trading session or, alternatively, over a portion of the trading session remaining after a trade is executed. NAV-based contingencies may be calculated more frequently than once per day. In additional embodiments, the VWAP-based, TWAP-based, TVOL-based, and NAV-based contingencies may be computed over any of a number of time periods that would be apparent to one skilled in the art. Further, as outlined above with respect to Table 3, an extension may be applied to a root symbol of the financial instrument to indicate any combination of a particular contingency, execution process, and settlement process.

The computerized trading system 908 then matches a bid to purchase the financial instrument with an offer to sell the financial instrument in order to execute the trade according to contractual terms set forth in the respective bid and offer. Once the trade has been executed, details of the executed trade (or transaction) may be transmitted from the computerized trading system 908 to the preliminary reporting and comparison system 910 as a report stating the terms of the transaction and any price, volume, or price and volume contingencies to which the execution is subject. The transaction is not submitted to settlement until the contingent prices, volumes and/or other terms have been determined, and depending upon the rules of the exchange, the first stage of the transaction may or may not be published on a trade reporting system.

The preliminary reporting and comparison system 910 prepares initial reports that may be sent to trading parties 902 for comparison purposes and to an execution determination and calculation computer system 912 that accepts contingency price and volume calculations (as well as other contingent calculations, depending on the embodiment) from service providers 914 that may be operated by or associated with the exchange or ECN or other regulatory authority. In the case of executed orders contingent upon NAV calculations, the execution determination and calculation computer system 912 may accept NAV calculations from issuers 916 of financial instruments for which a net asset value is periodically calculated, and their service providers 918, including calculation agents. Once all contingent terms have been received, the execution determination and calculation system 912 computes the contractual terms of the trade and reports the executed trade and the contractual terms to an exchange transaction reporting system 920, to a trade settlement system 922, and to the parties 902 to the trade, including investors 904 and market makers 906.

Figure 10:
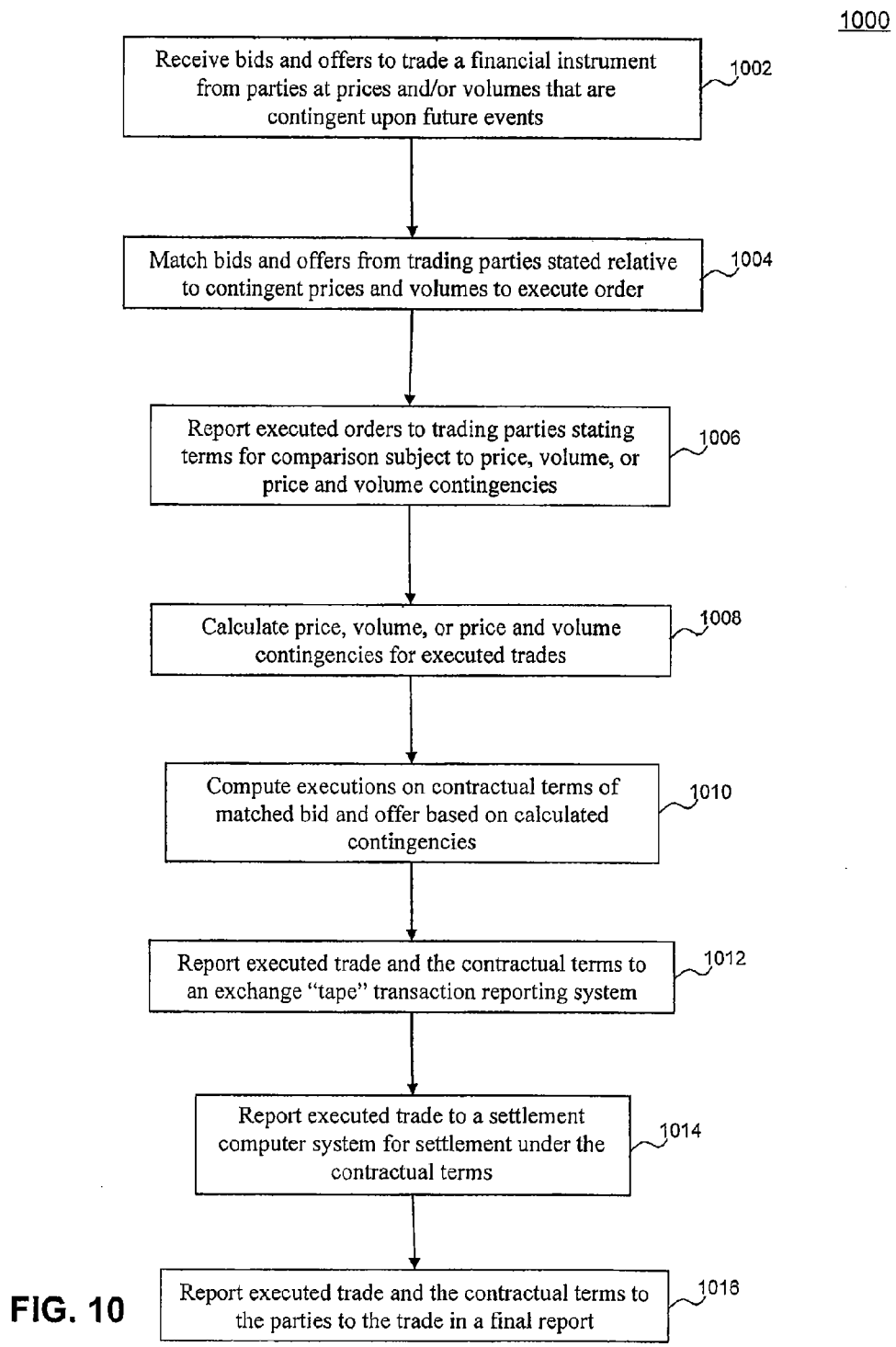
FIG. 10 is a detailed overview of an exemplary method for trading financial instruments on an exchange or ECN according to an embodiment of the present invention.

FIG. 10 is a detailed overview of an exemplary method 1000 for trading financial instruments according to an embodiment of the present invention. In step 1002, a computer trading system associated with an exchange or ECN receives at least one order to trade a financial instrument, such as but not limited to a mutual fund and an exchange-traded fund (ETF), from a potential party to the trade. Within step 1002, the parties to the trade may be investors or market makers, depending on the nature of the market and the requirements of market participants at any given time, and each party may enter an order on the exchange by transmitting the order electronically to the computerized trading system.

The order to trade the financial instrument may represent a bid to purchase the financial instrument or an offer to sell the financial instrument, and the received orders may be stated in terms of prices, trading volume, and net asset values of the financial instrument that are contingent upon future events. In one embodiment, the contingency may be based on a net asset value (NAV) of the financial instrument calculated periodically at specified time intervals throughout a trading day. For example, the NAV may be computed at 10:00 am and at 11:00 if an exchange were to open for trading at 9:30 am. In additional embodiments, the contingency may be based on a volume-weighted average price (VWAP) or a time-weighted average price (TWAP) of a financial instrument or other financial instrument calculated over a specified time interval. The contingency may also be based on trading volumes (TVOL) expressed as a percentage of the total volume of a financial instrument or other financial instrument traded during a specified time interval. The contingency may be stated in the order in terms of a proxy, as described herein.

In step 1004, once orders from the various parties to the trade have been received, the received bids and offers are stored, and the bids and offers for financial instruments from the various parties are then matched to execute an order between parties. The executed order matches a bid to purchase a particular financial instrument with an offer to sell the particular financial instrument, where both the bid and offer have been stated in terms of a compatible contingency such as but not limited to a future price, future trading volume, future net asset value of the financial instrument, etc. In some embodiments, the executed order may be reported over the exchange tape at the time of execution (i.e., during step 1004) as well as after contingency determination.

In step 1006, terms of the executed order, including any future price, future volume, or future price and future volume contingencies to which the order is subject, are reported to the trading parties. The reporting process may include transmitting a report of the transaction to the individual trading parties for review and comparison with their bid or offer. By reviewing the report, trading parties may identify errors and may initiate actions to correct any errors. In additional embodiments, the terms of the executed order may be transmitted to an external system, such as the preliminary reporting and comparison system 910 within FIG. 9, and the external system may report the terms of the executed transaction to the trading parties.

In step 1008, the contingencies upon which the order has been executed are computed. In one embodiment, the computed values of the price-based, volume-based, or NAV-based contingencies are provided to an external computer system, such as the execution determination and calculation computer system 912 within FIG. 9.

For executed orders contingent upon net asset value (NAV), contingent terms may be periodically calculated by at least one of an issuer of the financial instrument, a service provider associated with the issuer, the market, or a regulatory authority. Contingent terms based on price and trading volume, such as VWAP-based, TWAP-based, and TVOL-based contingencies, may be computed directly by the computerized trading system associated with the exchange or ECN or by service providers under the supervision of the exchange or ECN. As the contingent terms are calculated by parties independent of the trade, conflicts of interest may be substantially reduced or eliminated.

In step 1010, the contractual terms of the executed trade are computed, and the contractual terms of the executed trade are reported to the parties to the trade in a final report. In one embodiment, the contractual terms may be computed by an external computer system, such as the execution determination and calculation computer system 912 within FIG. 9.

In step 1012, the executed trade and the contractual terms associated with the executed trade will be reported to an exchange transaction reporting system, and the exchange transaction reporting system 920 will publish the executed trade. The exchange transaction reports will be supplied to one or more financial reporting services.

Further, in step 1014, the executed trade will be reported to a settlement computer system for settlement under the computed, contractual terms. In an embodiment, the settlement computer system is associated with the National Securities Clearing Corporation (NSCC), a wholly owned subsidiary of The Depository Trust & Clearing Corporation (DTCC). The NSCC provides centralized clearance, settlement and information services for virtually all broker-to-broker equity, corporate bond and municipal bond, and exchange-traded funds trades in the United States.

In step 1016, the executed trade and the contractual terms associated with the executed trade may then be confirmed to the parties to the trade.

Figure 11:
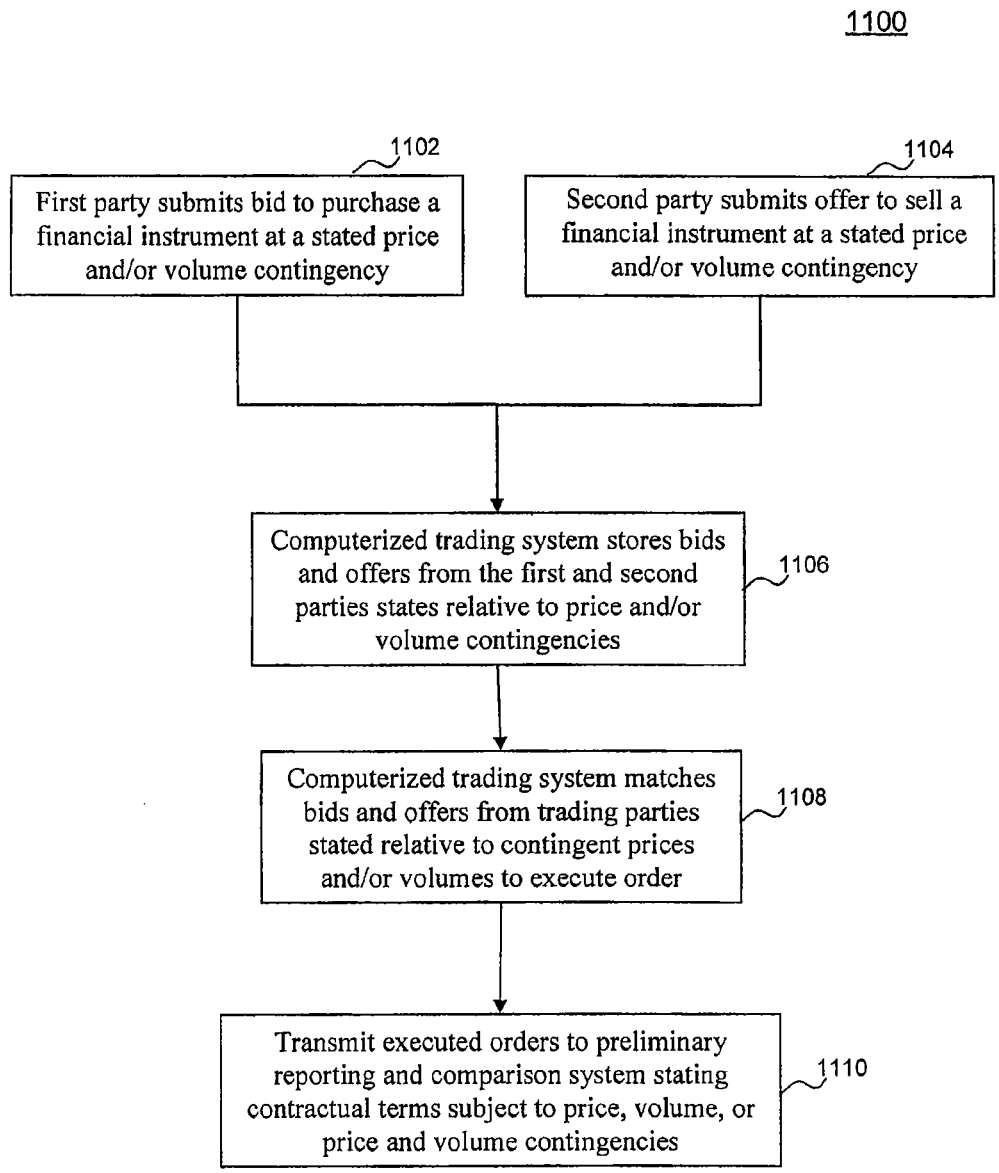
FIG. 11 is a detailed illustration of a method for executing an order for a financial instrument that may be used with the exemplary method of FIG. 10.

FIG. 11 is a detailed illustration of a method for executing an order for a financial instrument that may be incorporated into step 1002 of the exemplary method of FIG. 10. In step 1102, a first party enters an order to buy (or sell) at least one share of a financial instrument, such as but not limited to a mutual fund and an exchange-traded fund (ETF), on an exchange or ECN that trades the financial instrument. The bid (or offer) entered by the first party within step 1102 may be stated relative to a future value of a first contingency using a proxy value.

In step 1104, a second party enters an order to sell (or buy) at least one share of the financial instrument, such as an exchange-traded fund (ETF), on the exchange or ECN. As described in reference to step 1102, the offer (or bid) entered by the second party within step 1102 may be stated relative to a future value of the same contingency using a proxy value.

In one embodiment, the first party of step 1102 may be an investor acting through a broker and the second party of step 1104 may be a market maker. However, in additional embodiments, the first and second parties may be any combination of investors or market makers or other market participants, depending on the nature of the market and the requirements of market participants at any given time. Further, during steps 1102 and 1104, the first and second parties enter orders by transmitting the orders electronically to a computerized trading system.

The contingency of interest to the parties 1102 and 1104 may be a net asset value (NAV), a time-weighted average price (TWAP) or a volume-weighted average price (VWAP) calculated over a specified time interval. The contingency may be also based on a target volume expressed a percentage of total trading volume of the financial instrument on the market during a specified time period (TVOL).

Once the orders from the first and second parties have been entered into the computerized trading system in steps 1102 and 1104, respectively, the computerized trading system then accepts and stores the orders in step 1106. The computerized trading system stores not only the order for the financial instrument, but also any contingency upon which the order is stated. In additional embodiments, steps 1102, 1104, and 1106 may be repeated for additional parties that enter orders for the financial instrument stated in terms of price-based, volume-based, and/or NAV-based contingencies.

In step 1108, the computerized trading system matches the order for the financial instrument from the first party to a corresponding order for the financial instrument from the second or some other party. In addition to matching bids and offers for the financial instruments entered by the first and second parties, the processes within step 1108 also determine whether the contingent terms of the orders are compatible. If the computerized trading system successfully matches the bids and offers from two parties, then the order is executed in step 1110 subject to the stated contingencies on price (including NAV), trading volume, or price and trading volume of the financial instrument. The executed orders will be reported to the applicable parties as described above with reference to FIG. 10.

Figure 12:
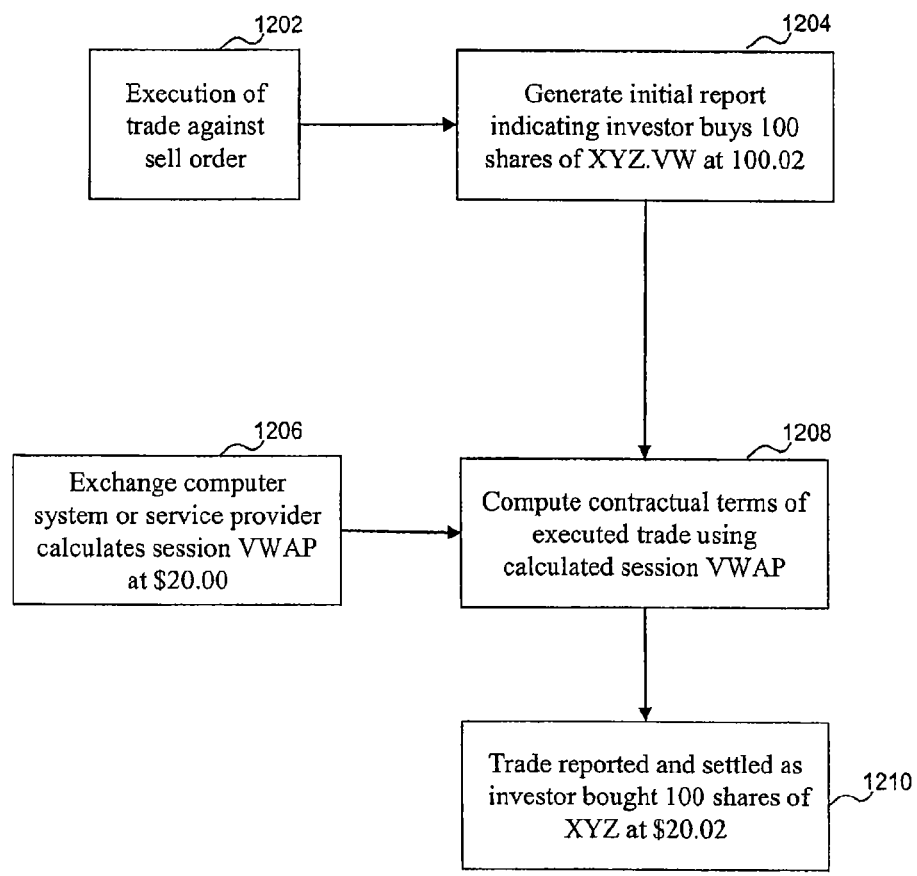
FIG. 12 illustrates an exemplary transaction in which an investor purchases a financial instrument subject to a price-based contingency in accordance with an embodiment of the present invention.

FIG. 12 illustrates an exemplary transaction 1200 in which an investor purchases a financial instrument that is subject to a price contingency in accordance with embodiments of the present invention. In step 1202, an investor enters a bid to purchase 100 shares of financial instrument XYZ.VW at 100.02 (or better) into a computerized trading system associated with an exchange or ECN on which XYZ.VW is traded. Purchasing shares of XYZ.VW at 100.02 or better indicates that the investor will purchase the shares for no more than two cents ($0.02) above a VWAP calculated for the trading session. The computerized trading system matches the investor's bid with a corresponding sell order that has been stored by the computerized trading system, and the trade for 100 shares of XYZ.VW is executed subject to the stated VWAP contingency during step 1202.

An initial report is generated in step 1204 indicating that the investor has purchased 100 shares of XYZ.VW at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1206, the exchange computer system or a service provider engaged by the exchange calculates a VWAP for the financial instrument XYZ.VW at the completion of the trading session (a session VWAP). In the example of FIG. 12, the session VWAP of XYZ.VW may be calculated as $20.00. The session VWAP is then used in step 1208 to compute the contractual terms of the executed trade, and using the example of FIG. 12, an execution of a trade at 100.02 on a $20.00 VWAP results in a buy price of $20.02. The investor has purchased 100 shares of XYZ.VW at a share price of $20.02. This information is then reported on the exchange "tape" reporting mechanism and sent to settlement during step 1210. Using the symbology outlined above, the executed trade may be confirmed as "Bot 100 shares of XYZ @ $20.02."

Figure 13:
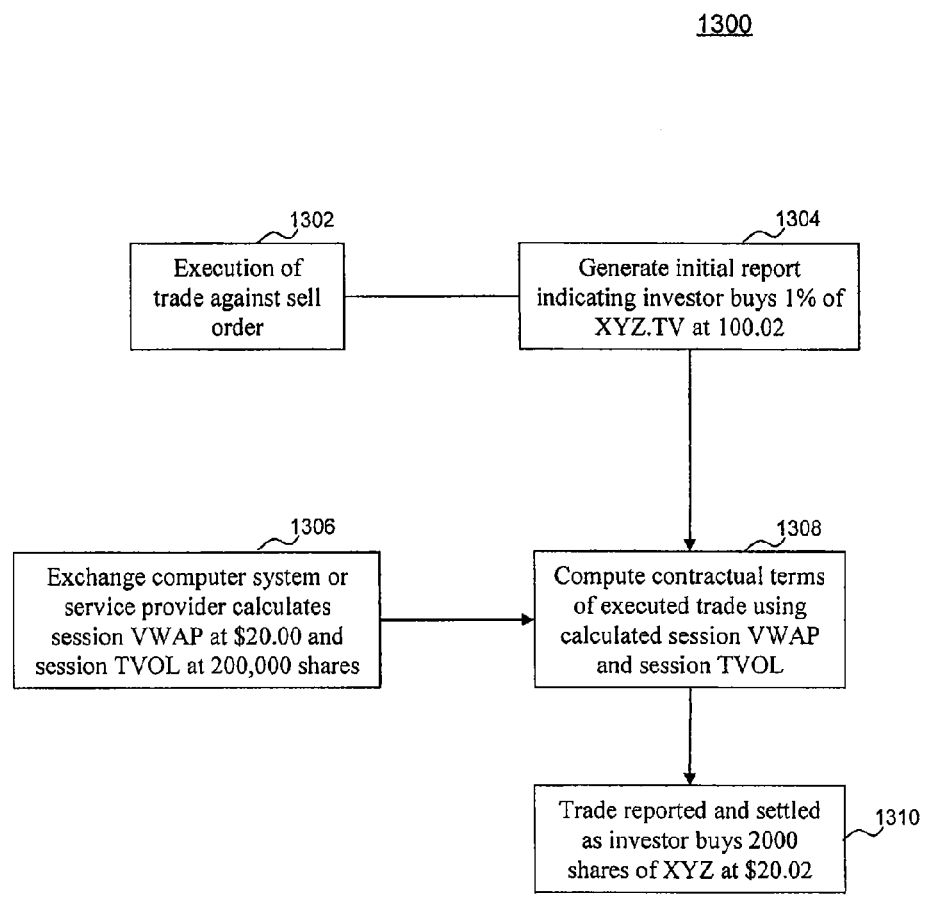
FIG. 13 illustrates an exemplary transaction in which an investor purchases a financial instrument subject to a volume-based contingency in accordance with an embodiment of the present invention.

FIG. 13 illustrates an exemplary transaction 1300 in which an investor purchases a financial instrument that is subject to a volume-based (TVOL) contingency in accordance with embodiments of the present invention. In step 1302, an investor enters a bid to purchase 1% of the session trading volume in XYZ at 100.02 or better (at no more than $0.02 over the volume-weighted average price (VWAP) for that session) into a computerized trading system. The computerized trading system matches the investor's bid with a corresponding sell order that has been stored by the computerized trading system, and the trade for 100 shares of XYZ.VW is executed subject to the stated price and volume contingency.

An initial report is generated in step 1304 indicating that the investor has purchased 1% of the session trading volume in XYZ at 100.02 (i.e., "Bot 1% of XYZ.TV at 100.02") and, after it is inspected by the investor as part of the comparison process, information on the trade is transmitted to the execution determination and calculation computer system 912 within FIG. 9. The executed trade is stored by the execution reporting mechanism pending arrival of information on the contingent price and volume on which settlement is based.

In step 1306, the exchange computer system or a service provider engaged by the exchange computes a session VWAP at $20.00 and a session TVOL at 200,000 shares. In the example of FIG. 13, 1% of 200,000 shares is equivalent to 2,000 shares and an execution at 100.02 on a $20.00 VWAP is a price of $20.02. The session VWAP and TVOL are used in step 1308 to compute the contractual terms of the executed trade, and using the example of FIG. 13, the investor has purchased 2,000 shares of XYZ.TV at a share price of $20.02. This information is then reported on the exchange "tape" reporting mechanism and sent to settlement during step 1310, and using the symbology outlined above, the investor's report may read "Bot 2000 shares of XYZ at $20.02."

In contrast to informal volume-linked orders placed with brokers today, the executed trade described within FIG. 13 requires a locked-in commitment to purchase the financial instruments based on the specified volume-based contingency, and this commitment occurs when the trade is executed in step 1302. Both parties are bound to the settlement price and, in this case, volume of the order that will be determined as soon as the contingent price and volume are known.

Figure 14:
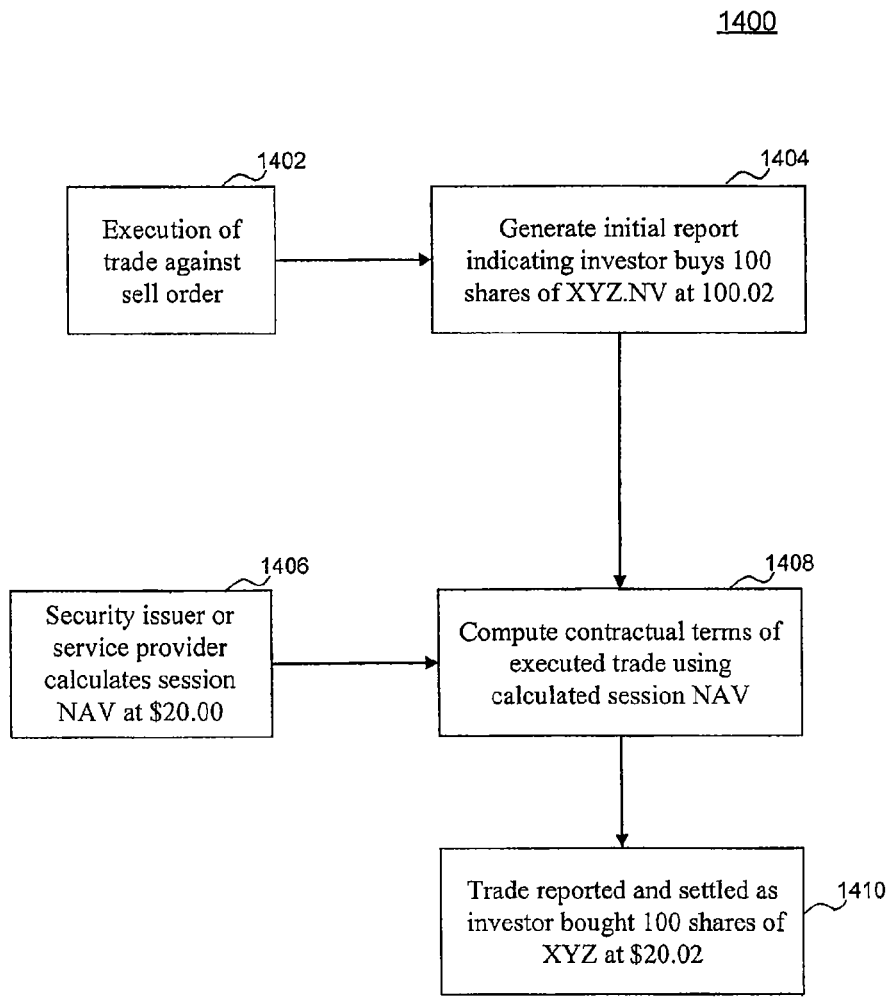
FIG. 14 illustrates an exemplary transaction in which an investor purchases a financial instrument subject to a net asset value-based contingency in accordance with an embodiment of the present invention.

FIG. 14 illustrates an exemplary transaction 1400 in which an investor purchases a financial instrument that is subject to a net asset value-based contingency in accordance with embodiments of the present invention. In step 1402, an investor enters a bid to purchase 100 shares of XYZ.NV at 100.02 (or better) into a computerized trading system on which XYZ.NV is traded. The order indicates that the investor will purchase the shares for no more than two cents ($0.02) above the net asset value (NAV) calculated at the end of the trading session. The computerized trading system matches the investor's bid with a corresponding sell order that has been stored by the computerized trading system, and the trade for 100 shares of XYZ.NV is executed subject to the stated NAV-based contingency within step 1402.

An initial report is generated in step 1404 indicating that the investor has purchased 100 shares of XYZ.NV at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1406, the issuer of the financial instrument or a calculation agent engaged by the issuer calculates an NAV for the financial instrument XYZ.NV at the completion of the trading session. In the example of FIG. 14, the end of day NAV for XYZ.NV may be calculated as $20.00. This value is used in step 1408 to compute the contractual terms of the executed trade, and using the example of FIG. 14, an execution of a trade at 100.02 on a $20.00 NAV results in a share price of $20.02. The investor has purchased 100 shares of XYZ.NV at a share price of $20.02. This information is then reported on the exchange "tape" reporting mechanism and sent to settlement in step 1410. The trade is reported to the investor as "Bot 100 shares of XYZ @ $20.02."

The example of FIG. 14 describes a transaction for XYZ.NV that involves a contingency based on an end of day NAV. As described above in reference to Table 3, the NAV-based contingency is not limited to end of day NAVs, but may also incorporate NAVs computed periodically during a trading session. In such a case, the example of FIG. 14 would be modified such that the investor would purchase shares of XYZ.NA or XYZ.NB, orders of which would be contingent upon NAV values computed at various times during the trading session.

The foregoing embodiments describe exemplary systems, methods, and computer program products for trading financial instruments on an exchange or an electronic communications network (ECN). Within such embodiments, the financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

The embodiments described herein preserve the anonymity of trading parties and the confidentiality of their trading plans. Informal or direct party-to-party negotiation of contracts with price or volume contingencies in over-the-counter markets often reveals information that a trading party might prefer to keep confidential. For example, direct negotiations with a market maker are characteristic of most non-exchange future price or future volume-contingent trade entry. Such negotiations generally require the customer to reveal its identity to the broker or market maker at some point in the negotiation process. In contrast, with the present invention, if the parties use standard order formats and procedures characteristic of exchange trading, there is no need for a market maker or any participant in the transaction to know the identity of the ultimate parties to the trade. One advantage of concealing a trader's identity is that an exchange-based transaction need provide no information about the total size of the market participant's trading intention. Confidentiality in a very high degree can be assured by incorporating novel features into exchange systems such as the New York Stock Exchange's (NYSE) Anonymous SuperDOT (ADOT) order entry system.

Further, the trades described herein may be used as part of a block trading program. For example, a seller of a block of stock might find a buyer using any of the trading techniques and order types described herein. By executing an order with that buyer early in the block sale process, the seller might reduce the market impact of the sale by finding a natural buyer who might not be easy to find directly in the typical block trading process. This interaction may reduce transaction risks and costs for either or both parties to the trade.

Exemplary Computer Interfaces for Trading Financial Instruments on an Exchange

FIGS. 15A and 15B illustrate an exemplary computer graphical user interface (GUI) 1500 through which an order for a financial instrument may be entered on an exchange according to embodiments of the present invention. The example of FIGS. 15A and 15B is provided solely for purposes of illustration, and not limitation. Other means for entering an order for a financial instrument will be apparent to persons skilled in the relevant arts, and such other means are within the scope and spirit of the present invention.

In FIGS. 15A and 15B, the exemplary computer interface 1500 may directly communicate with a computerized trading system associated with the exchange or ECN, and computer interface 1500 allows a party to a trade, such as an investor, to enter information regarding a specific bid to purchase a financial instrument or a specific offer to sell a financial instrument on the exchange or ECN. The financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

In the example of FIGS. 15A and 15B, the investor first specifies a particular financial instrument that will be subject to the bid or offer entered through the computer interface. In FIG. 15A, the investor enters the root symbol of the particular financial instrument in field 1502, and the entered root symbol should correspond to the ticker symbol of the financial instrument. For example, to trade the Standard & Poor's Depositary Receipts (SPDR), the investor would enter SPY in field 1502. In many embodiments, an extension would be entered in the same field as the root symbol, but some additional embodiments might require the investor to enter an extension in field 1504 to indicate a specific price-based, volume-based, or NAV-based contingency (or some other contingency or combination of contingencies) under which the order will be executed by the computerized trading system. For example, the investor may specify VW in field 1504 to enter an order for the financial instrument that is contingent upon a volume-weighted average price (VWAP) of the financial instrument computed at the end of a trading session. In a similar fashion, the investor may enter TW to enter an order for the financial instrument that is contingent upon a time-weighted average price (TWAP) of the financial instrument computed for the trading session. Further, TV may be entered into field 1504 to indicate an order for a specific percentage of the trading volume (TVOL) of the financial instrument over a specific time period. For a NAV-based contingency, the investor may enter NV within field 1504 to indicate that an order for the financial instrument that is contingent upon a session NAV, or alternatively, the investor may enter NA or NB to indicate that the order is contingent upon a specific hourly NAV.

The investor or the investor's agent will then specify an instruction in field 1506 to indicate the nature of the particular trade. For example, the investor enters "BUY" in field 1506 to enter a bid to purchase the financial instrument. In a similar fashion, the investor could enter "SL" in field 1506 to enter an offer to sell the financial instrument. Further, the investor may also enter "SSHRT^EXEMPT" within field 1506 to indicate that the order is exempt from the uptick rule, but must be designated as a short sale for other regulatory purposes.

The investor or the investor's agent will also specify a size of the order to be entered onto the computerized trading system in field 1508. In the case of a VWAP-contingent, TWAP-contingent, or NAV-contingent order for the financial instrument, the investor will enter the number of shares to be transacted within field 1508. In the case of a TVOL-contingent order, field 1508 may be filled with a percentage of the trading volume that will be subject to the entered order.

A share price associated with the order for the financial instrument may then be specified within field 1510. For price-contingent trades, the core basis price may be a standard set by the exchange that, as suggested above, might be a proxy value of 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL.

Once the share price has been specified within the exemplary computer interface, the investor may specify a limit price for the order in field 1512. The limit may be based on the dollar price of a share. In the case of a buy order, the limit price would be a cap by default. In the case of a sell order, the limit price would be a floor by default and the price would be the dollar price of the underlying share, not the "100" or other basis price used in the primary price field.

Once the information related to the order for the financial instrument has been entered in fields 1502 through 1512, the investor may submit the order to the computerized trading system by selecting the "SUBMIT" button 1514. Once submitted, the order is transmitted to the computerized trading system, which attempts to match and to execute the order according to the exemplary methods described herein.

FIG. 15B illustrates an exemplary set of entries into data fields of a computerized interface 1500 that would enable an investor to enter an order to purchase 1000 shares of SPY.VW at 100.05 on an exchange that trades SPY. VW. In FIG. 15B, the SPY.VW financial instrument is used for exemplary purposes only, and the computer interface 1500 supports any number of financial instruments that may be traded upon the exchange or ECN associated with the computerized trading system. Assuming that a session VWAP for SPY.VW is computed at $130.00, the entered order enables the investor to purchase 1000 shares of SPY.VW at a price of $130.05 per share, as the share price is below the specified limit price of $131.00.

In one embodiment, the computer interface 1500 within FIGS. 15A and 15B may be executed on a remote computer system that communicates with the computerized trading system through a communications path, such as a wired or wireless internet connection. In an additional embodiment, the computer interface is executed locally by the computerized trading system, and an investor on a remote computer system must access the computerized trading system to utilize the computer interface. Further, in the embodiments described above, the data within fields 1502 through 1512 may be entered directly by the investor, selected from a menu, or entered through any means that would be apparent to persons skilled in the art.

Example 3

Methods, Systems, and Computer Program Products for Automated Incorporation of Traded Funds in Qualified Retirement Plans Introduction The familiarity of retirement plan administrators, custodians and other retirement plan record keepers (collectively, "Record Keeper(s)") with the net asset value-based sales and redemption model of mutual funds and the existence of comprehensive Record Keeper and fund industry systems to implement mutual fund transactions at net asset value in retirement plans suggests interest in accommodating a trading and accounting mechanism for ETFs based on a new trading and settlement system to facilitate net asset value (NAV)-based secondary market ETF trading. The fund share purchase and sale practices of employer-sponsored retirement savings plans and the computer systems used by these plans are consistent with a net asset value-based trading process for exchange-traded funds that will meet the needs of retirement plans better than ETF trading at intra-day prices. There is, therefore, a need for net asset value-based trading in ETFs and modifications of some ETF features, such as accommodating fractional share positions (as mutual funds do) to conform with existing Record Keeper mutual fund data processing and position keeping standards.

Net asset value-based trading in exchange-traded funds has been described in U.S. patent application Ser. No. 11/141, 243, filed May 31, 2005; U.S. patent application Ser. No. 11/714,921, filed Mar. 7, 2007; and U.S. patent application Ser. No. 11/714,923, filed Mar. 7, 2007, the disclosures of which are hereby incorporated by reference in their entireties. This trading process, to be introduced soon, will permit fund investors and Record Keepers accustomed to the net asset value trading practices of mutual funds to buy and sell exchange-traded fund shares at or relative to the net asset values of ETFs each day. ETF NAVs are determined in the same manner as the net asset value calculations made by mutual funds.

In an embodiment, accommodating ETF transactions will require few, if any, systems modifications by Record Keepers. However, significant system enhancements by some ETFs and/or their service providers will be necessary to implement the invention. The ability to use existing systems for some purposes while requiring significant changes in other systems is analogous to changes currently under way in equity securities trading in the United States.

The changes in equity securities trading have received a great deal of publicity. Some of the effects are described in Dallmer (2006), De La Merced (2006), and Lucchetti (2006). The changes in equity securities trading generally parallel the way the present invention will change the use of ETF investments in retirement plans. In the securities markets, the basic interfaces between most investors and the trading markets have not changed materially in a number of years and are unlikely to change in revolutionary ways for most investors in the near future. The widespread use of the Financial Information Exchange (FIX) communications protocol has not completely replaced the Common Message Switch (CMS) in handling exchange-listed securities transactions. The stasis in some legacy trading communications systems is comparable to continued use of the legacy mutual fund trading and position keeping systems operated by Record Keepers to implement retirement plan ETF applications. However, like the dramatic changes and cost reductions under way in trade execution, order routing and algorithmic trading in equity securities markets, retirement plan transactions in ETFs will be handled in new ways using the current invention. Retirement plan ETF trading costs will decline over the next few years and costs will become more predictable. Like the sharp reductions in labor-intensive operations on exchange floors and at dealers' trading desks in the transition to "electronic markets," the present invention will automate most aspects of the purchase and sale processing and position keeping of exchange-traded funds in retirement accounts. In addition to transactions, features automated will include updating positions to reinvest ETF income and (infrequently) capital gains distributions. Partial liquidations to cover fees at the plan or account level will also be accommodated. The unique features of ETFs will be accommodated for Record Keepers by other service providers' investments in new systems. The existing retirement plan mutual fund order entry process will accommodate ETFs with nominal changes and at low cost to retirement plans and their Record Keepers.

When they enter orders earlier than the daily market close, investors in retirement accounts may be able to receive value for a trade timing option that has no value when they use mutual funds. An order placed with a mutual fund for execution at net asset value will not trade at a better price if it is entered early in the day. In contrast, an ETF order entered early in the day might be executed at a price slightly better than net asset value and, in any event, can be assured of execution at a fixed relationship to the day's net asset value. Net asset value-based secondary market trading and integration of ETF record keeping into existing Record Keeper systems for mutual fund transactions and position maintenance will make it easy for accounts in employer-sponsored defined contribution plans to use exchange-traded funds at low cost.

In an embodiment, methods, systems, and computer program products trade exchange-traded funds for retirement accounts at lower cost using the existing systems of retirement plan account Record Keepers with only modest changes and using new systems and procedures provided by one or more financial intermediaries working with one or more ETF issuers or as industry utilities (hereinafter these financial intermediaries are referred to as an "Administrator" or "Administrators").

In an embodiment, the needs of investors and retirement plan Record Keepers are met using by using several novel processes, including a new net asset value-based secondary market trading system for ETF shares, combining orders to reduce costs, crossing exchange-traded fund trades to reduce market impact, and using existing Record Keeper systems to process and hold a retirement account's ETF positions in the same format used for mutual fund shares. In such an embodiment, Record Keepers are provided with simple access to an automated process to aggregate ETF buy and sell orders and to effect transactions in whole and/or fractional ETF shares at or relative to the fund's net asset value calculated on the day of the transaction or on a subsequent trading day.

Record Keeper Communications and Position Keeping Systems

From an economic perspective, an essential feature of this invention is to make as few changes as possible in systems operated by the retirement plan Record Keepers that effect transactions and provide position keeping for mutual fund positions in defined contribution retirement accounts to permit them to handle ETF transactions and positions in the same manner that they handle transactions and positions in mutual funds.

The characteristics and functions of Record Keeper systems do not vary greatly from one Record Keeper to another. Defined contribution retirement plan systems in the United States operate within the relatively rigid framework created by the Employee Retirement Income Security Act of 1974 (ERISA), are subject to regulation by the Department of Labor (DOL), must be compatible with employer payroll accounting systems, use the National Securities Clearing Corporation's (NSCC) Fund/SERV communications system to effect mutual fund transactions and almost universally adopt account format standards developed by a trade association, the Society of Professional Administrators and Record Keepers (SPARK). Introducing ETFs to these retirement accounts is largely a matter of adapting ETFs to the mutual fund model now in use.

This adaptation is most readily illustrated by looking at some record format similarities and differences. The table below characterizes some key accounting features typical of mutual funds and ETFs as they exist today.

|  | Mutual Fund | Exchange-Traded Fund |
| --- | --- | --- |
| CUSIP number | yes | yes |
| Trading Symbol | 5 alphabetic characters | 3 or 4 alphabetic characters |
| Available unit of trading | .001 share | Whole share |
| Precision of NAV price | Nearest $.01 | Nearest $.01 |
| Trading price | Nearest $.01 | Nearest $.01 |

Modifying a few features of an ETF—as it appears to Record Keeper accounting systems—will permit Record Keeper systems to treat ETFs as if they were mutual funds. Mutual fund communications systems, the most important of which is Fund/SERV, use a security's Committee on Uniform Security Identification Procedures (CUSIP) number as the basis for instrument designation. The CUSIP number or, simply, CUSIP is far more important than trading symbols in mutual fund transactions. Trading symbols are provided for humans who need the mnemonic aid of alphabetic characters to recognize the fund by its short-hand representation. They are not used as identifiers in most data processing.

The five-character trading symbols used to designate mutual funds for identification by humans in the United States always end in X. The symbols are assigned by NASDAQ, and NASDAQ requires that any fund assigned a symbol have 1,000 investors or a minimum of $25 million in assets. If five-character trading symbols are needed, a minor rule change by NASDAQ might be necessary to authorize the issuance of a supplementary five-character mutual fund symbol in addition to the exchange-traded fund's three- or four-character trading symbol. The resulting five-character symbol could be used by retirement plan Record Keepers and by other financial intermediaries in the same way they use mutual fund symbols. A table or algorithmic symbol conversion method could convert the five-character symbol used by Record Keepers in their reports to investors to the three- or four-character ETF symbol used on exchange markets and vice versa. Such conversions will probably be unnecessary. Most Record Keeper systems can accommodate three or four character ETF symbols without modification if the symbols and other information linked to the ETF's CUSIP is made available in a system master (data) file. Regardless of the structure of a given system, tables relating 3- or 4-character symbols, 5-character symbols and CUSIPS are easy to construct and use. Administrator(s) will support Record Keepers in implementation of ETF transactions using established mutual fund trading and accounting processes. The resulting process will permit integration of ETF positions into retirement accounts at operating costs comparable to the Record Keepers' costs of acquiring, holding and selling conventional mutual fund shares. Systems modifications by Record Keepers will be trivial. Any significant systems work will be done by or on behalf of the Administrator(s).

Figure 16:
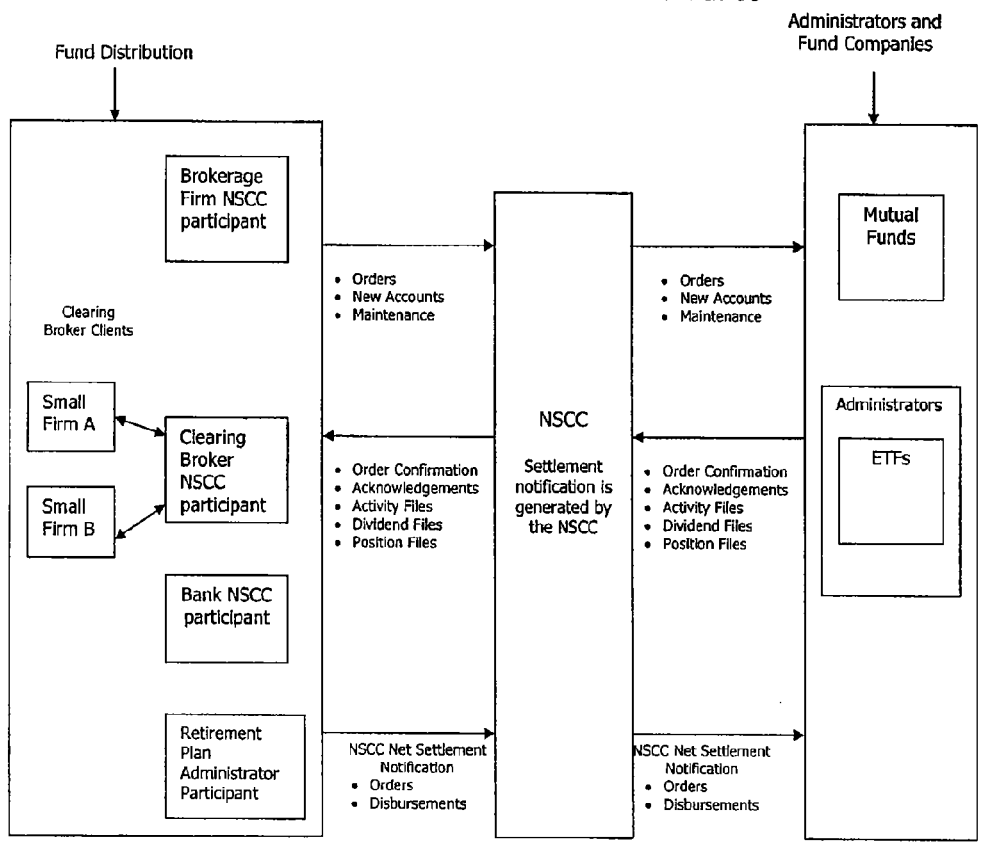
FIG. 16 is a flow diagram that illustrates an adaptation of a Fund/SERV communications system, which supports mutual fund transactions, to provide similar communication services to Record Keepers, ETF issuers, and various service providers to transmit orders, confirmations, account maintenance, and other information between and among the parties involved in ETF transactions and ETF position keeping for retirement accounts, according to an embodiment of the present invention.

FIG. 16 describes how the NSCC Fund/SERV communications system will transmit messages, including ETF purchase and sale orders for execution at or relative to net asset value, to service providers for exchange-traded funds. These messages will be handled in the same manner mutual fund purchase and sale orders are handled. No significant modifications to the Fund/SERV communications system are necessary. In such an embodiment, the only material requirement for using ETFs will be to list their CUSIP numbers in the Fund/SERV master file to maintain consistency in the delivery of fund-related communications over the Fund/SERV network and to accommodate ETF records in retirement plan accounting systems. FIG. 16 is based on FIG. 8.7 of Gremillion (2005), page 179, which is based, in turn, on diagrams developed by the National Securities Clearing Corporation (NSCC), which operates Fund/SERV.

The NSCC Fund/SERV communications structure and process for mutual funds is identical to FIG. 16 with respect to the elements of the fund distribution system relevant to the use of ETFs by retirement plans. Fund/SERV can handle retirement plan transaction messages for ETFs in the same way it accommodates mutual fund transaction messages. If the ETF interfaces to the order entry and execution process are identical to the mutual fund interfaces and the order entry and execution reports are consistent with the mutual fund model, the Record Keepers will readily accommodate ETF transactions using their current systems.

The conventional mutual fund order entry and execution process is simplified by the executions at net asset value which mutual funds typically offer to shareholders. In an embodiment, the version of NAV-based secondary market trading delivered by the Administrator(s) will serve Record Keeper systems in the same manner.

The Key Role of the Administrator(s)

To make accommodation of exchange-traded funds as simple as possible for Record Keepers, one or more issuers of exchange-traded funds will work with one or more financial intermediaries serving as Administrator(s). The Administrator(s) will be responsible for processing the ETF orders communicated to them over Fund/SERV or any other communication system used by the Record Keeper. Administrators will provide the necessary support to the Record Keeper to execute orders and provide appropriate confirmation messages, safe keeping (custody) of securities positions and other services necessary to accommodate the use of whole and fractional ETF share positions in retirement accounts administered by the Record Keeper(s).

Many of the functions performed by the Administrator(s) will correspond to functions performed by a mutual fund issuer or a service provider employed by the fund manager to process mutual fund orders entered by or on behalf of retirement plan accounts. Some functions of Administrators in handling ETF transactions and positions will be similar to activities of broker-dealers and custodians: to execute transactions in ETFs in the securities markets; to hold securities for safe keeping; to accommodate fund distributions; and to provide necessary transaction processing and reporting. The Administrator(s) may be broker-dealers or work closely with broker-dealers to effect necessary ETF transactions. The Administrator(s) will also provide, either directly or through another party, custody services which will hold the standard DTC-eligible whole ETF shares and provide reports to the Record Keepers allocating whole and fractional share interests either to individual retirement accounts administered by the Record Keeper or to omnibus accounts combining the whole and fractional shares held by all or groups of accounts serviced by a Record Keeper.

Administrators will consolidate orders to buy and sell ETF shares (a function they may share with one or more Record Keepers). Administrators (and Record Keepers that now offset mutual fund buy and sell orders) will also cross offsetting buy and sell orders to reduce the market impact of any net purchase or sale, as described more fully below. Record Keeper(s), Administrator(s), investment advisors and employers or other sponsors of retirement plans ("Plan Sponsor" or "Plan Sponsors") may encourage retirement plan participants to enter orders on a specific day of the week or month to maximize the offsetting effect of transactions. For example, if there is a large concentration of buy orders on a particular day as a result of payroll deductions being posted to 401(k) accounts, Record Keeper(s) and Administrator(s) may encourage plan participants who are taking periodic distributions from their accounts in retirement to enter sell orders on these same dates both to benefit from and to minimize the market impact of the buy orders. It is in a seller's interest to have transactions occur at the highest price possible. If orders to sell are entered on a day when there are few buy orders in the net asset valued-based transaction market, the transaction price for ETF sales will likely be below net asset value. On balance, all parties will be best served by a maximum match. Record Keeper(s) and Administrator(s) may offer fee schedules designed to maximize matches; or they may accept orders from other investors or ETF share traders over an electronic communications network (ECN) if they believe that accepting such orders will improve the overall quality of executions for the retirement accounts they serve.

In an embodiment, the executions reported by Administrator(s) to Record Keeper(s) for their accounts will reflect the balance of buy and sell orders at a price above or below NAV and will be at a net price comparable in format to the net prices generated in mutual fund transactions at net asset value. The net price will reflect any administrative fees, commissions and other trading costs due to the Administrator for its services. Although net pricing will probably dominate (given the predominance of net transactions in mutual fund share purchases and sales) fees and commissions levied separately to cover the costs of an Administrator are within the scope of the invention.

An Administrator may have a contract with a single ETF issuer to provide the transaction services described herein, but there is no reason why competing Administrators or an industry utility could not serve as Administrator(s) for groups of ETF issuers or even for all ETFs. There is no necessary organizational connection between an Administrator and an ETF issuer. Likewise, a Record Keeper may deal with multiple Administrator(s) much as it deals with multiple mutual fund issuers and their service providers. While fund issuers may want to stimulate the interest of one or more Administrator(s) in providing their ETF shares for use by retirement accounts, a contractual relationship between a fund issuer and an Administrator is not required for implementation of the invention.

Market-On-Close Transactions

Some Record Keepers have introduced exchange-traded funds purchased and sold in intra-day transactions or market-on-close transactions into 401(k) and other defined contribution plans. Intra-day ETF trades at prices determined by supply and demand have little relationship to the NAV mutual fund transactions for whole and fractional shares that the retirement plan community is accustomed to. At least one organization that trades intraday for retirement accounts uses only whole ETF shares, keeping small cash balances in each account that uses ETFs.

The closing price of an exchange-traded fund will only accidentally match the fund's net asset value. In a study of the extent to which the existing index exchange-traded funds traded close to their net asset value at the close, Engle and Sarkar (2006) found that for funds holding domestic stocks, the end-of-day average premium of the closing price over the reported net asset value was only +1.1 basis points (a discount would be reported as a premium with a negative sign). However, this average premium is misleading. The average standard deviation of the last trade premium was 42.1 basis points with a range of 17.6 basis points to 142 basis points for various funds. A 42-basis point standard deviation is more than four-tenths of a percent of the value of the fund share. Using this standard deviation as a rough indicator of the cost of a market-on-close execution neglects the effect of some "last" transactions that occurred some time before the market close and would, consequently, tend to have increased the standard deviation. Nonetheless, the average bid-asked spread for these domestic stock ETFs at the close was 37.7 basis points. This spread and closing bids and offers do not provide a useful measure of the terms on which a market-on-close order in an ETF might have been accommodated. A trade arriving for execution at the close not only demands significant immediate liquidity from market makers, it also arrives at a time when the precise fund net asset value is not yet known. The actual premium (or discount) realized in a market-on-close order will also depend on the "side" of the trade—whether it was initiated by a buyer or seller. If defined contribution plans use this market extensively, the standard deviation of a market-on-close execution from NAV is likely to increase. Market-on-close orders are best used by market makers when they can profit by providing liquidity to investors using this market. The availability of NAV-based secondary market trading will assure that an investor (or a Record Keeper or Administrator) can know in advance the extent of any deviation from net asset value and can access trading liquidity available during the entire period that the NAV-based secondary market is open—the daily trading session, at minimum. In an embodiment, NAV-based transactions are accommodated in a manner consistent with existing Record Keeper systems and practices, including, but not limited to, dollar-denominated executions and whole and fractional shares.

There is every reason to anticipate that NAV-based trading will provide executions much closer to each day's fund net asset value than market-on-close orders.

Transactions and Transaction Processes

Figure 17:
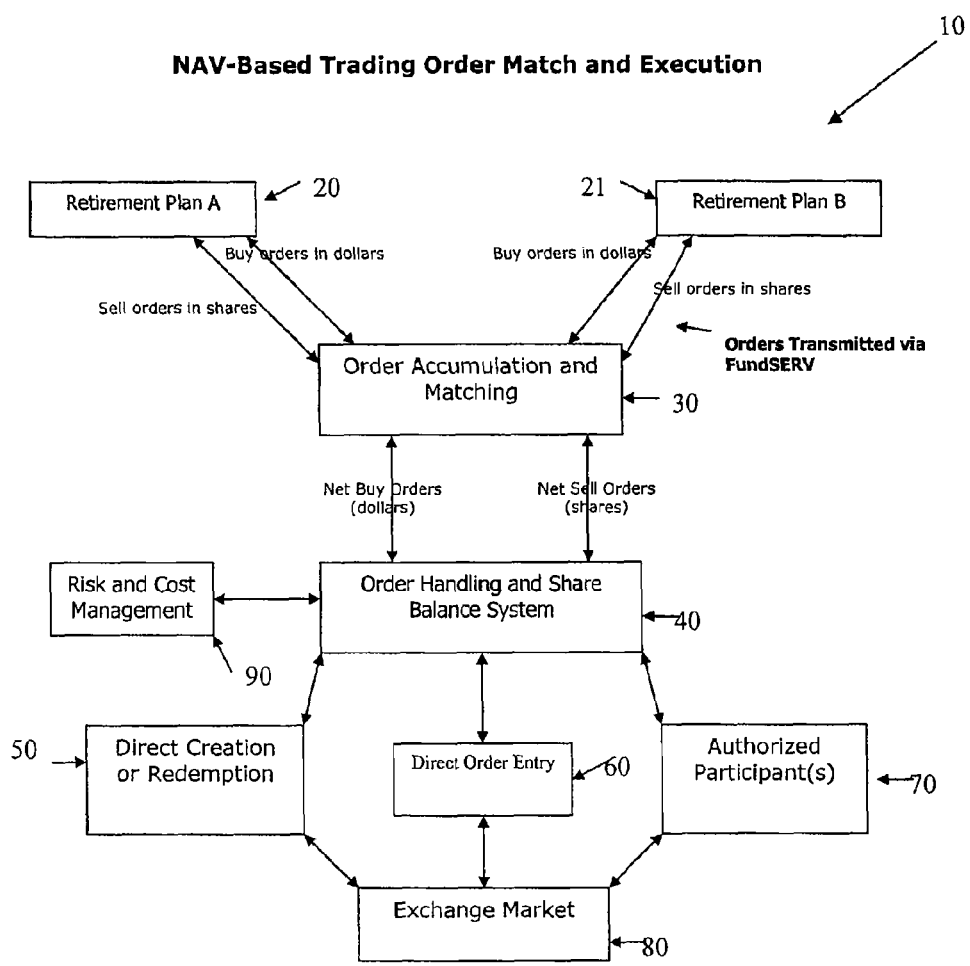
FIG. 17 depicts an exemplary order accumulation, matching and trading process that uses NAV-based secondary market trading of ETF shares to accommodate defined contribution retirement plans' use of ETFs, according to an embodiment of the present invention.

FIG. 17 depicts major elements and systems of an exemplary ETF NAV-based order match and execution system for retirement accounts, according to an embodiment of the present invention. At the top of FIG. 17, orders from retirement plans 20 and 21 to purchase and sell positions in ETFs are submitted to an order accumulation and matching system, 30. These orders are denominated either in shares or in dollars. The nature of the orders moving through the system illustrated in FIG. 17 has implications for the way ETF trades are managed and the way ETF positions are accommodated in retirement plan accounting systems.

The simple table which follows describes the characteristics of the types of fund share purchase and sale orders that are entered on behalf of retirement accounts.

| Characteristics of Orders Entered By and For Retirement Accounts |
| --- |
| Buy Orders in shares or units |
|    Common stock and other units in securities with a minimum trading unit or "indivisible" share |
| Buy Orders in dollars |
|    All others |
| Sell Orders in dollars |
|    Orders to raise cash to cover a specified dollar distribution to a beneficiary |
|    Sell orders to cover a fee are not significant in most plans because fees can be covered out of the next contribution in an accumulating plan or by increasing the size of the next sale in a plan that is making regular distributions to its beneficial owner. |
| Sell Orders in Shares or Units |
|    All others |

As this table suggests, buy orders in retirement accounts are normally denominated in dollars because cash is ordinarily available from a cash contribution or the sale of another position to cover a purchase. Most purchase transactions, particularly of mutual funds, which are available in whole and fractional shares, are entered as a dollar amount rather than as a number of shares. In contrast, sell orders are more often entered in shares (or other trading units for other assets). Occasionally, orders to raise cash to cover a specified distribution to a beneficiary or a fee will be entered as a dollar amount, particularly in the case of a mutual fund. However, the predominance of buy orders as orders entered in dollars and sell orders as orders entered in shares means that offsets and order handling are more complicated than if all orders were designated either in dollars or in shares.

In an embodiment, the system of FIG. 17 deals with this difference and attempts to capture any value associated with a timing option features commitment to the purchase or sale of ETF positions early in the day. To illustrate such a process, we assume an order cutoff time of approximately 10:00 a.m. for orders to be accommodated at or relative to the current day's NAV. Many Record Keepers use a 12:00 p.m. cutoff time for mutual fund orders today. Any cutoff time before 4:00 p.m. is feasible, but an earlier time will usually afford better executions.

At 10:00 a.m., an actively managed exchange-traded fund, such that described above, would provide the first of a number of precise hourly net asset value proxy calculations based on the contents of the fund portfolio. (Index ETFs provide precise net asset value proxies more frequently.) Using the 10:00 a.m. NAV proxy as a benchmark, dollar and share-denominated orders in an ETF can be matched and a net dollar amount or a net share amount or, in some cases, both (on opposite sides of the market) can be estimated and offset, leaving a residual number of shares to be purchased or sold. An order covering expected residual shares can be entered in the secondary market for pricing relative to the net asset value to be calculated on that day's closing prices as illustrated:

| 10:00 a.m. Order Matching Offsets and Transactions in an ETF for Retirement Accounts (All figures before any fees or commissions) | | |
| --- | --- | --- |
| Gross Buy Orders | Net Orders | Gross Sell Orders |
| (1) 1115 Shares | (3) Sell 19,408.15 Shares | (5) 20,523.15 Shares |
| (2) $2,000,500 Dollars | (4) Buy $1,600,250 Dollars | (6) $400,250 Dollars |
| Share NAV proxy @ 10:00 a.m. | (7) $52 | Calculations |
| Value of shares to be sold | (8) $1,009,223.80 | (8) = (3) times (7) |
| Value of net purchase | (9) $591,026.20 | (9) = (4) minus (8) |
| Net share purchase | (10) 11,366 shares | (10) = (9) divided by (7) (to nearest whole share) |

While the process will be computerized, the calculations column entries illustrate the trade management algorithm.

The 10:00 a.m. value will be close to the closing NAV for most funds in normal market environments, but the transaction is not priced definitively until the closing net asset value is calculated and the Administrator would consider rebalancing the buy and sell positions to reflect price changes at various times through the 3:00 p.m. posting of the intra-day net asset value proxy for the fund. Except under unusual market conditions, positions taken as of 3:00 p.m. would be held through the market close for settlement at or relative to the end-of-day net asset value calculation of the funds:

| 3:00 p.m. ETF Order Matching Offsets and Rebalancing Transactions | | |
| --- | --- | --- |
| | | Calculations |
| Share NAV proxy @ 3:00 p.m. | (11) $54 | |
| Value of shares to be sold | (12) $1,048,040.10 | (12) = (3) times (11) |
| Dollar value of net purchases | (13) $552,209.90 | (13) = (4) minus (12) |
| Net number of shares to be purchased @ $54 | (14) 10,226 Shares | (14) = (13) divided by (11) (to nearest whole share) |

-continued

| 3:00 p.m. ETF Order Matching Offsets and Rebalancing Transactions | | |
|---|---|---|
| | | Calculations |
| Number of shares to be sold between 3:00 p.m. and the close | (15) 1140 shares | (15) = (10) minus (14) (to the nearest whole share) |

While the process will be computerized, the calculations column entries illustrate the trade management algorithm.

Throughout the actual calculation and trading process, expected fees and costs will be added or subtracted as appropriate in the calculation of the value to be realized from a sale or to be committed to a purchase.

As they process ETF orders, Record Keepers for retirement plans, 20 and 21 in FIG. 17, will combine orders, and an order accumulation system 30 will combine and offset purchase and sale orders for each ETF which may be reflected either in dollars or shares on either side of the market and calculate the net buy order (typically in dollars) or the net sell order (typically in whole and fractional shares). All transactions will be accommodated and handled in the netting process, as mutual fund orders are handled today by retirement plan Record Keepers and the mutual fund companies with funds on the Record Keepers' platforms. However, the handling and execution of the orders generated by the Record Keepers will change when the orders are communicated to the Administrator over Fund/SERV if the funds are ETFs rather than mutual funds.

The order accumulation and matching process 30 accumulates ETF orders from a number of retirement plans and other accounts where whole and fractional share transactions priced relative to net asset value are accommodated by this system. All orders to buy as many ETF shares as can be purchased with an available amount of cash are matched with orders to sell as few shares of the ETF as possible to raise a designated amount of cash—with appropriate adjustments for any costs levied on these transactions that are not reflected in the calculations above. Ordinarily, the cash-denominated balance will be a net share purchase. Any orders to buy or sell a specific number of whole or fractional shares in the ETF will be matched. Ordinarily, a net share imbalance will be a net share sale as illustrated in the tabular example above. A tentative price will reflect the net asset value proxy at 10:00 a.m. and will assume that the price will be unchanged between 10:00 a.m. and the close. The Administrator will calculate a net number of shares to purchase or sell in the NAV-based secondary market. The transactions are tentatively priced and orders entered based on the NAV proxy calculation available at 10:00 a.m.—or whenever the process begins in a specific case. Price assumptions and share quantities are revised as prices change over the course of the day. There will be a net number of shares to be purchased or sold and that number of shares typically will be traded as either a purchase or sale in the NAV-based secondary market. A net purchase or sale order may be executed by a direct creation or redemption 50, if that is believed by the Administrator to provide the lowest cost execution; by direct order entry 60 in the NAV-based trading market, 80; or in negotiation with one or more Authorized Participants or other market makers 70 for an NAV-based transaction, if that approach appears to offer the most favorable terms. (In an embodiment, the order management process and the risk management issues associated with direct creation or redemption suggest that such transactions will be uncommon unless the Administrator is, itself, regularly engaged in the creation or redemption of shares in ETFs.) NAV-based transactions, including matched purchases and sales, will be reported in a timely fashion as required by the (SEC imposed) rules of the exchange listing the ETF's shares.

Fractional Shares

After the calculation of the fund's official end-of-day NAV—and calculation of the value of all transactions—the Administrator reports transactions in whole and fractional shares to the Record Keepers. In conventional mutual fund transactions, full and fractional shares can be bought and sold for cash at net asset value. ETF creations and redemptions are typically made in kind, i.e., baskets of securities (common stocks in the case of stock funds) are exchanged for ETF shares. Purchase and sale transactions with the ETF as a party to the transaction are made only in creation unit aggregations which should range in size from 10,000 shares to 600,000 shares in various ETFs. No lots smaller than a creation unit are offered by the ETF and only whole shares are traded on exchanges. Furthermore, because exchange-traded funds are fully DTC-eligible securities, ETFs are not transferred between and among DTC participants in fractional shares. However, fractional shares in a wide range of securities, including ETFs, appear in many kinds of investor accounts. It has become a common practice for brokerage firms and other financial intermediaries to carry customer positions that cannot be transferred between intermediaries as fractional shares. FOLIOfn, for example, has made the availability of fractional share positions one of the cornerstones of its business model. Since the introduction of the Monthly Investment Plan (MIP) by the New York Stock Exchange in 1954, many brokerage firms and other financial intermediaries have reflected fractional shares of stocks (and more recently ETFs) in securities accounts to accommodate their customers.

In an embodiment, the availability of fractional share ETF positions is extended to retirement accounts in a more formal way with the participation of ETF industry service providers. It is noted that the ETF shares which appear in retirement accounts are not a different share class of the exchange-traded fund which issues the shares these accounts are purchasing and selling. The fractional shares are simply an accounting convenience.

In such an embodiment, an alternative execution and position designation and carrying model is provided to facilitate low-cost beneficial ownership of whole and fractional shares in a retirement account. These ETFs will have no comparable conventional mutual fund shares such as the Vanguard Exchange-Traded Shares which are a subordinate share class of a conventional mutual fund. The whole and fractional ETF shares to be held in retirement accounts are not dual share-class funds, such as those described in U.S. Pat. No. 6,879,964, or a specialized share class, such as those described above. In such a case, an Administrator that is a service provider for a specific exchange-traded fund, an ETF family, or for all or part of the exchange-traded fund industry, will facilitate trading and account position keeping, including fractional ETF shares for retirement accounts—and any other accounts offered this transaction service. While fractional shares of ETFs cannot be transferred between DTC participants, just as fractional shares of stock cannot be transferred, ETF transfers can be accommodated by arrangements similar to those used in transferring mutual fund positions.

Risk and Cost Management

Figure 18:
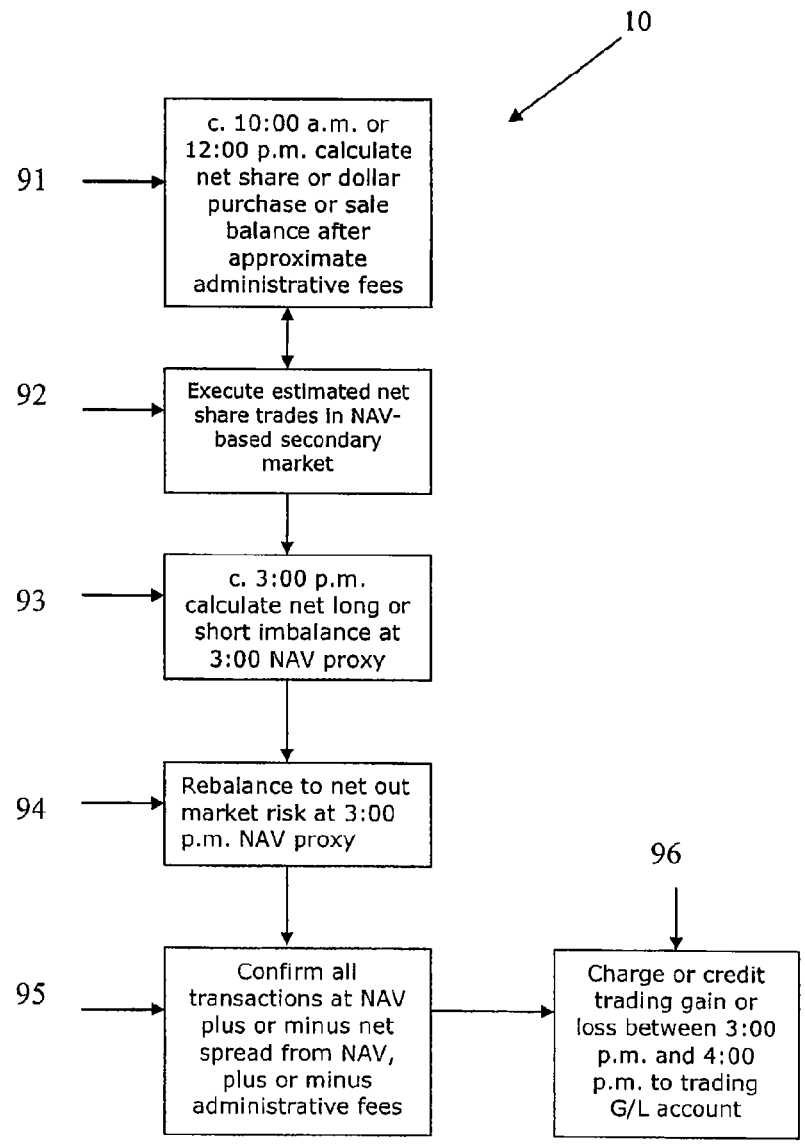
FIG. 18 depicts an exemplary risk and cost management system used by an ETF issuer's service provider or an industry utility to manage the risks and costs of providing whole and fractional share trading in ETFs to retirement accounts, according to an embodiment of the present invention.

FIG. 18 illustrates an exemplary risk and cost management process 90, which is shown as a single box peripheral to the transaction flow in FIG. 17, in accordance with an embodiment of the present invention. In step 91, the early size and value estimates used to plan the net ETF share purchase or sale for the day are shown to occur shortly after the 10:00 a.m. proxy value posting or at 12:00 p.m. The estimated purchase or sale requirement is executed in step 92. If a net cash purchase is made in the NAV-based secondary market, an increase in the value of the shares over the remainder of the trading day will cause the Administrator of the transaction service to sell some shares later in the day to reduce the net cash purchase. At a higher NAV, the cash available to purchase shares will buy fewer shares. Hence, fewer shares will be needed to fill net cash orders if the share price is higher. If the value of the shares falls over the course of the trading day, the risk and cost management system will cause the Administrator to contract for the purchase of additional shares in the NAV-based market because the available cash will buy more shares. As the specific trade management example earlier illustrated, the effect of the crossing mechanism can lead to more than one trade over the course of the day to keep net transaction requirements in balance. Unless the market is unusually turbulent, the net risk exposure will not vary greatly in most market environments. In step 93, the position will be re-evaluated at about 3:00 p.m., and necessary rebalancing trades will be executed in step 94. When the net asset value is determined, the Administrator will confirm trades to all Record Keepers after deducting fees and expenses in step 95. In step 96, the Administrator will then credit or charge any trading gains or losses to a trading account. The trading account will be exposed to little market risk and will be managed to achieve only nominal trading gains or losses over time.

The foregoing examples, in which trading occurs in the NAV-based secondary market at 10:00 a.m. and 3:00 p.m., are for illustration purposes only. In additional embodiments, an Administrator could trade at different times, more or less frequently and using different order types including (for example) market, limit and market-on-close ("MOC") orders in the traditional intra-day market for ETFs in addition to NAV-based transactions.

Integrating ETF and Mutual Fund Transactions and Other Features

The process and system illustrated in FIGS. 17 and 18, as described herein, does not accommodate all possible types of transactions in retirement accounts accommodated by mutual funds. An advanced implementation will accommodate "simultaneous" purchases and sales designated in dollars between two ETFs or between an ETF and a mutual fund. Such implementations and others are within the scope of the invention.

In another embodiment, the NAV-based fund share trading system will accommodate an investor wanting to sell, say, 1,000 shares of a mutual fund and invest the exact dollar proceeds in an ETF, both transactions to be completed at or relative to simultaneously determined net asset values for the two funds. Even if both funds are not in the same fund family, an industry utility Administrator could handle the transaction, assessing a fee (or spread) on the trading party to cover the estimated trading cost. When ETF retirement account transaction volumes reach economically significant levels and ETF retirement plan transaction systems are fully integrated with comparable mutual fund systems, a full range of services will be available to provide NAV-based transactions across both markets. In the initial rollout, an investor who wants to use the proceeds from the sale of one ETF or mutual fund to purchase shares in another fund will not be able to trade simultaneously. In the beginning, the sale transaction will be processed first and the available proceeds used to purchase shares in another fund on the following day.

Purchases and sales of mutual fund shares transmitted via Fund/SERV are generally priced at net asset value on the day the fund order was entered with a financial intermediary that has a selling agreement with the fund, even if the Fund/SERV message does not arrive at the fund prior to the time the NAV calculation is made. Mutual fund performance is penalized by late arrival of transaction messages, erratic changes in fund cash balances and market timing trades that originate in a variety of accounts, including retirement plan accounts. The fund incurs costs in adjusting its portfolio to the cash flows associated with shareholder entry and exit whether fund share traders are engaged in market timing or not. For more information on the effect that providing free liquidity at NAV to fund share traders has on the performance of mutual funds, see Edelen (1999), Green and Hodges (2002) and Gastineau (2004) and additional references in each paper.

The Securities and Exchange Commission has attempted to reduce the cost to fund shareholders of the flow in and out of mutual funds by implementing Proposed Rule 22C-2 (Securities and Exchange Commission, 17 CFR Part 270, [Release No. IC-27255; File No. S7-06-06; File No. 4-512], RIN 3235-AJ51, Mutual Fund Redemption Fees) which would impose a 2% redemption fee on most mutual fund purchases closed out within a week of purchase. This regulation appears to be stalled and, in any event, it would not solve the problem because market timers can hedge most fund share positions at low cost until the period covered by the redemption fee expires. The effects of processing late arriving retirement account orders to trade mutual funds are not consistent with the cost allocation principle that governs ETFs: Investors entering or leaving a fund should pay the transaction costs associated with their entry or exit.

A mutual fund manager typically does not know how many shares the fund will have outstanding at the time its NAV for the day is calculated. The net asset value calculation based on known shares is used to price cash buy and sell orders for fund shares that are received after the market close. The mutual fund industry uses this procedure to minimize pricing corrections that might otherwise result from late order arrival.

The universality of the net asset value pricing convention for mutual funds extends to funds with sales charges as well as no-load funds. The amount invested at net asset value is simply reduced by a front end sales charge. Level load and back end load sales charges are deducted from net asset value when they are imposed. As far as the investor is concerned, the charges to pay level load and back end load marketing fees are simply an increase in the expense ratio of the fund or a charge which reduces the proceeds on a sale, in the case of a back end load. The universality of NAV pricing usually means that an investor selling shares in one mutual fund and buying shares in another mutual fund usually will be accommodated by both funds at net asset value on the day the order is entered—even if neither fund involved in the transaction is aware of the transaction until several days later. Market timers have abused mutual fund shareholders by exploiting the vulnerabilities of mutual funds under this NAV pricing system. The result is a toll on fund performance.

In an embodiment, the present invention modifies the order handling and execution process to meet a new NAV-based trading standard in a way that protects ongoing ETF shareholders from the costs of shareholder transactions. In such embodiments, the present invention can be used to consolidate and process mutual fund share orders as well as ETF orders in a manner consistent with the allocation of the costs of fund share trading to those who trade. Investor ETF purchase and sale transactions are, of necessity, made in the secondary market. Mutual fund trades are primary market trades: investors trade with the fund at NAV, paying no transaction costs. Mutual fund trades could be accommodated within the framework created to accommodate ETFs in retirement accounts if conventional mutual funds required notice of purchases and sales (denominated either in dollars or number of shares) earlier in the day. This would require dramatic operating and regulatory changes by and for mutual funds. While we do not expect such changes, they would make it possible for mutual fund transactions to be accommodated by the systems and processes of the invention. Unless all entries to and exits from a mutual fund are handled in a manner that will give a fund portfolio manager advance notice of fund share purchases and sales, the mutual fund structure will fall short of the full shareholder protection from the transaction costs of accommodating entering and leaving shareholders that is readily available with ETFs.

Further, in an embodiment, the present invention makes effective use of the improving capabilities of data communications and processing systems. It responds to the increased sensitivity of market regulators and investors to the costs of accommodating mutual fund shareholders that surfaced in the market timing scandals of 2003/2004 and makes effective use of the structure of exchange-traded funds to transfer costs of entry to and exit from a fund to the shareholders entering and leaving the fund. The resulting trading system serves retirement plan accounts at low cost while protecting ongoing ETF shareholders from the costs of retirement plan fund transactions.

In one embodiment of the invention, a Record Keeper, Administrator(s) or a service provider engaged for the purpose aggregates orders in one or more stages before transmitting them to the consolidated order match system.

In another embodiment of the invention, an automated trade processing system matches bids and offers against each other as part of the process for determining the net purchase or sale balance and the transaction price for orders in the system.

In another embodiment of the invention, an automated trade processing system provides transaction pricing with crossed and net buy or sell orders executed at the same price, gross of fees and expenses.

In another embodiment of the invention, an automated trade processing system is linked to a market maker or other liquidity provider offering liquidity for all crossed orders with the net order imbalance subject to a contingent price, the contingent price to be based on the net asset value calculated by the fund at the close of trading on the current day. If an order arrives after a specified time it will be executed at a price based on the net asset value calculated on the following day.

In another embodiment of the invention, there will be provision for the Administrator(s) to accept orders after the formal cut-off time if they meet certain conditions. Such conditions may include that they can improve the price for investors on the other side of the market. If the new order was a sale and the balance of orders received to that point were purchases, the sale order would be accepted if it would reduce net market impact.

In another embodiment of the invention, an automated trade processing system compares the number of shares offered and the number of shares bid for in each ETF combined with purchase and sale orders denominated in currency. The total number of estimated shares bid for and offered along with the estimated net buy or net sell difference is transmitted to a market maker or to the exchange market. If the Administrator(s) conclude(s) that a creation or redemption of ETF shares is likely to produce the best execution, an arrangement can be made with a market maker for such a creation or redemption.

In another embodiment of the invention, the total order information is transmitted to a market maker or broker dealer for order management and execution of net share quantities.

In another embodiment of the invention, trade volume and transaction reports are generated for use by the Record Keeper and other market participants.

One feature of several of these embodiments is that they offer the opportunity for price improvement relative to net asset value to at least some market participants. By offsetting purchases against sales, sellers in a matched order file will typically sell above net asset value when there are net buyers and buyers will typically buy below net asset value when there are net sellers, gross of fees and expenses in each case. Aside from modest costs associated with trade risk management and some operating costs that may be slightly greater than those experienced by mutual fund issuers that service retirement accounts, the net administrative costs of using ETF shares in retirement plan accounts will not differ materially from the administrative costs incurred directly or indirectly in connection with mutual fund transactions. The important difference is that such costs are borne directly or indirectly by ongoing mutual fund shareholders when mutual fund shares are traded. The ETF order matching process described herein also offers reduced net market impact and reduced administrative costs to ETF investors relative to handling ETF transactions like common stock trades in the intraday trading market in the ETF shares.

Exemplary Computer Systems

Figure 19:
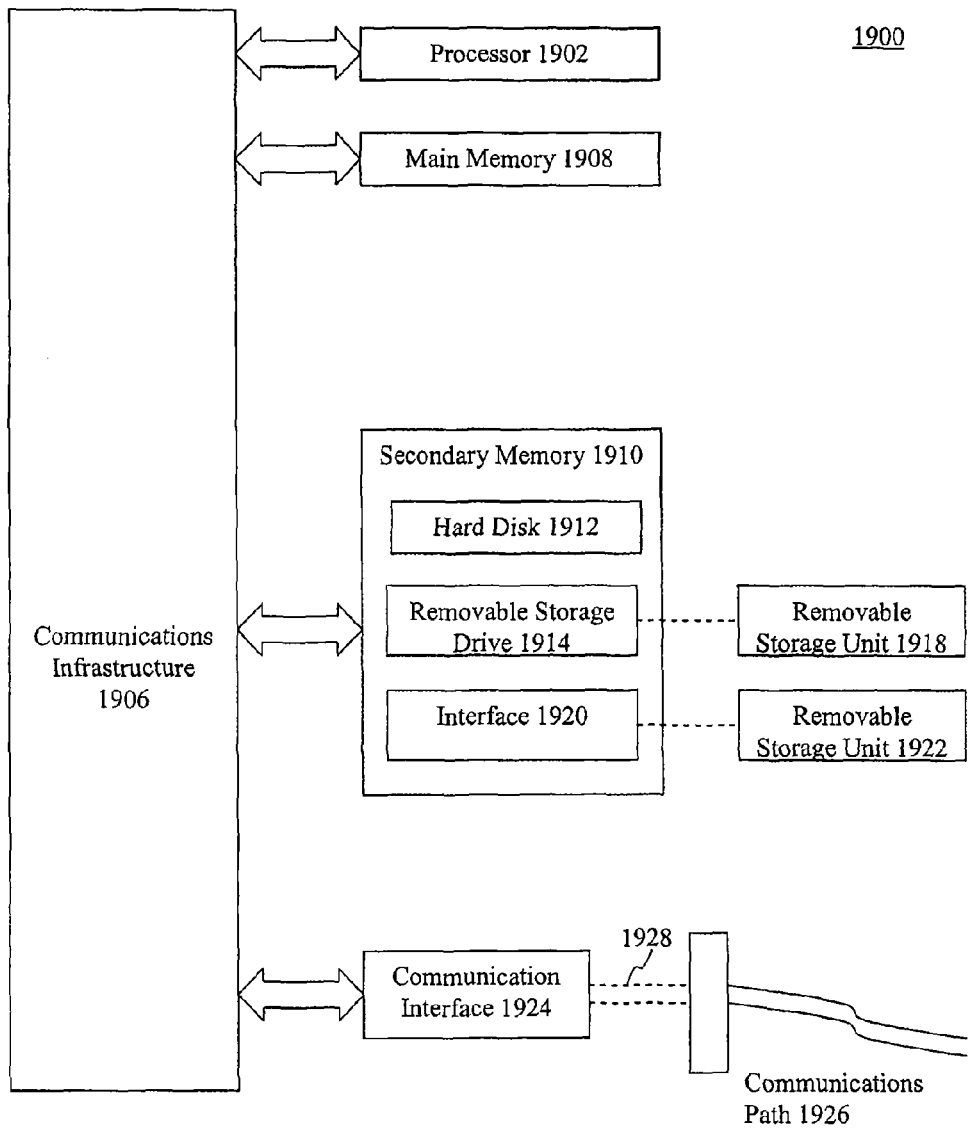
FIG. 19 is a block diagram of an exemplary computer connected to a network upon which the exemplary methods and systems of the present invention may be implemented.

FIG. 19 is a diagram of an exemplary computer system 1900 upon which embodiments of the present invention (or components thereof) may be implemented. The exemplary computer system 1900 includes one or more processors, such as processor 1902. The processor 1902 is connected to a communication infrastructure 1906, such as a bus or network. Various software implementations are described in terms of this exemplary computer system. After reading this description, it will become apparent to a person skilled in the relevant art how to implement the invention using other computer systems and/or computer architectures.

Computer system 1900 also includes a main memory 1908, preferably random access memory (RAM), and may include a secondary memory 1910. The secondary memory 1910 may include, for example, a hard disk drive 1912 and/or a removable storage drive 1914, representing a magnetic tape drive, an optical disk drive, etc. The removable storage drive 1914 reads from and/or writes to a removable storage unit 1918 in a well-known manner. Removable storage unit 1918 represents a magnetic tape, optical disk, or other storage medium that is read by and written to by removable storage drive 1914. As will be appreciated, the removable storage unit 1918 can include a computer usable storage medium having stored therein computer software and/or data.

In alternative implementations, secondary memory 1910 may include other means for allowing computer programs or other instructions to be loaded into computer system 1900. Such means may include, for example, a removable storage unit 1922 and an interface 1920. An example of such means may include a removable memory chip (such as an EPROM, or PROM) and associated socket, or other removable storage units 1922 and interfaces 1920, such as a memory stick or memory card, which allow software and data to be transferred from the removable storage unit 1922 to computer system 1900.

Computer system 1900 may also include one or more communications interfaces, such as communications interface 1924. Communications interface 1924 allows software and data to be transferred between computer system 1900 and external devices. Examples of communications interface 1924 may include a modem, a network interface (such as an Ethernet card), a communications port, a WIFI interface, a Bluetooth interface, a cellular interface, a PCMCIA slot and card, etc. Software and data transferred via communications interface 1924 are in the form of signals 1928, which may be electronic, electromagnetic, optical or other signals capable of being received by communications interface 1924. These signals 1928 are provided to communications interface 1924 via a communications path (i.e., channel) 1926. This channel 1926 carries signals 1928 and may be implemented using wire or cable, fiber optics, a wireless link and other communications channels. In an embodiment of the invention, signals 1928 comprise carrier waves modulated with control logic.

Any apparatus or manufacture comprising a computer useable or readable medium having control logic (software) stored therein is referred to herein as a computer program product or program storage device. This includes, but is not limited to, the computer 1900, the main memory 1908, the hard disk 1912, the removable storage units 1918, 1922 and the carrier waves modulated with control logic 1928. Such computer program products, having control logic stored therein that, when executed by one or more data processing devices, cause such data processing devices to operate as described herein, represent embodiments of the invention.

CONCLUSION

The present invention meets the exchange-traded fund accommodation needs of retirement plan investors and Record Keepers and other market participants with several novel processes, including using a new net asset value-based secondary market trading system for ETF shares, using existing Record Keeper systems to trade, process and hold retirement account ETF positions in the same manner used for mutual fund transactions and positions, accommodating both dollar amount and share-denominated orders, and crossing offsetting exchange-traded fund trades whenever possible. The invention provides Record Keepers with access to an automated process managed by one or more ETF service providers that aggregate ETF buy and sell orders to effect transactions in whole and fractional ETF shares at or relative to the fund's net asset value calculated on the day of the transaction or a later day.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

What is claimed is:

1. A method for trading and holding one or more positions in an exchange-listed financial instrument in the form of an Exchange Traded Fund (ETF), for which a net asset value is calculated at or after a specified time, wherein said trading occurs on or away from an exchange and among parties comprising an administrator that receives orders from a customer to buy or sell said financial instrument priced relative to the net asset value, comprising:

using a computer to handle orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;

wherein said using a computer to handle orders includes at least one of (i) accumulating the orders; (ii) periodically offsetting said buy orders against said sell orders; and (iii) entering at least one of a buy or a sell order for said financial instrument on or away from an exchange for execution at said prices; and using a computer to offer services to said customer comprising at least one of (a) accepting orders and pricing transactions at said prices; (b) denominating orders and executions in said customer's choice of at least one of currency, whole shares or units of said financial instrument, and fractional shares or units of said financial instrument; and (c) position keeping in whole and fractional shares or units of said financial instrument; and using a computer to submit said executed trades for settlement or holding.

2. The method of claim 1, further comprising pricing said periodically offset orders as a function of at least one of (i) an execution price of an order to buy or sell said financial instrument and (ii) price data from a market.

3. The method of claim 1, wherein said customer is at least one of (a) a retirement plan, a retirement plan participant, sponsor, or service provider, (b) a financial intermediary, (c) an investment adviser, and (d) an investor.

4. The method of claim 1, wherein trading, reporting of said trades, and position keeping methods of said administrator are consistent with methods for trading and holding mutual fund positions of said customer.

5. The method of claim 1, further comprising trading one or more shares or units of said financial instrument on a net asset value based secondary market to manage risk associated with trading and holding said positions in said financial instrument.

6. The method of claim 1, further comprising embedding fees and cost allocations of said administrator in net transaction prices.

7. The method of claim 1, further comprising reporting and charging fees and costs of said administrator to said customer separately from transaction prices.

8. The method of claim 1, further comprising retroactively modifying terms of an executed trade upon correction of an error.

9. The method of claim 1, further comprising managing at least one of trading, position keeping, and shareholder distributions using the fund communications facilities of Fund/SERV.

10. The method of claim 1, wherein said administrator is (i) a bank or bank affiliate or (ii) a broker/dealer or broker/dealer affiliate.

11. The method of claim 1, wherein said financial instrument is at least one of (a) an indexed exchange-traded fund, (b) an actively managed exchange-traded fund, (c) a closed-end fund, (d) an exchange-traded note and (e) a structured product.

12. A method for trading and holding one or more positions in an exchange-listed financial instrument in the form of an Exchange Traded Fund (ETF), for which a net asset value is calculated, wherein said trading occurs on or away from an exchange and among parties comprising an administrator that receives orders from a customer to buy or sell said financial instrument, comprising:
using a computer to handle orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;
using a computer to offer services to a customer comprising at least one of (a) accepting orders and pricing transactions at said prices, the net asset value to be calculated at or after a specified time; (b) denominating orders and executions at said prices in said customer's choice of at least one of currency, whole shares or units of said financial instrument, and fractional shares or units of said financial instrument; and (c) position keeping in said financial instruments for which trading occurs at said prices in currency and whole and fractional shares or units of said financial instrument; and
wherein said using a computer to handle orders includes managing at least one of (i) trading, (ii) position keeping, and (iii) shareholder distributions, using the fund communications facilities of Fund/SERV.

13. The method of claim 12, further comprising at least one of (i) accumulating orders to buy and sell said financial instrument at or relative to a net asset value; (ii) periodically offsetting said buy orders against said sell orders; (iii) entering at least one of a buy and a sell order for said financial instrument on or away from an exchange for execution at or relative to a net asset value; and (iv) using at least one of executions of customer orders and market data from said trading market to price customer transactions.

14. The method of claim 13, further comprising pricing said periodically offset orders as a function of at least one of (i) an execution price of an order to buy or sell said financial instrument and (ii) price data from a market.

15. The method of claim 12, wherein said customer is at least one of (a) a retirement plan, a retirement plan participant, sponsor, or service provider, (b) a financial intermediary, (c) an investment adviser, and (d) an investor.

16. The method of claim 12, further comprising at least one of (i) executing customer mutual fund transactions and (ii) accommodating customer mutual fund positions.

17. The method of claim 12, further comprising retroactively modifying terms of an executed trade upon correction of an error.

18. The method of claim 12, wherein said financial instrument is at least one of (a) an indexed exchange-traded fund, (b) an actively managed exchange-traded fund, (c) a closed-end fund, (d) an exchange-traded note and (e) a structured product.

19. A system for trading and holding one or more positions in an exchange-listed financial instrument in the form of an Exchange Traded Fund (ETF), for which a net asset value is calculated at or after a specified time, wherein said trading occurs on or away from an exchange and among parties comprising an administrator that receives orders from a customer to buy or sell said financial instrument priced relative to the net asset value, comprising:
a computer implemented order module configured to handle orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;
the computer implemented order module configured to at least one of (i) accumulate the orders; (ii) periodically offset said buy orders against said sell orders; and (iii) enter at least one of a buy or a sell order for said financial instrument on or away from an exchange for execution at said prices; and
a computer implemented service module configured to offer services to said customer comprising at least one of (a) accepting orders and pricing transactions at said prices; (b) denominating orders and executions in said customer's choice of at least one of currency, whole shares or units of said financial instrument, and fractional shares or units of said financial instrument; and (c) position keeping in whole and fractional shares or units of said financial instrument; and
a processor configured to process the modules.

20. The system of claim 19, further comprising a computer implemented pricing module configured to price said periodically offset orders as a function of at least one of (i) an execution price of an order to buy or sell said financial instrument and (ii) price data from a market.

21. The system of claim 19, wherein said customer is at least one of (a) a retirement plan, a retirement plan participant, sponsor, or service provider, (b) a financial intermediary, (c) an investment adviser, and (d) an investor.

22. The system of claim 19, wherein said means for trading, reporting of said trades, and position keeping of said administrator are consistent with means for trading and holding mutual fund positions of said customer.

23. The system of claim 19, further comprising a computer implemented trading module configured to trade one or more shares or units of said financial instrument on a net asset value based secondary market to manage risk associated with trading and holding said positions in said financial instrument.

24. The system of claim 19, further comprising a computer implemented embedding module configured to embed fees and cost allocations of said administrator in net transaction prices.

25. The system of claim 19, further comprising a computer implemented reporting module configured to report and charge fees and costs of said administrator to said customer separately from transaction prices.

26. The system of claim 19, further comprising a computer implemented modification module configured to retroactively modify terms of an executed trade upon correction of an error.

27. The system of claim 19, further comprising a computer implemented communications module configured to manage at least one of trading, position keeping, and shareholder distributions using the fund communications facilities of Fund/SERV.

28. The system of claim 19, wherein said administrator is (i) a bank or bank affiliate or (ii) a broker/dealer or broker/dealer affiliate.

29. The system of claim 19, wherein said financial instrument is at least one of (a) an indexed exchange-traded fund, (b) an actively managed exchange-traded fund, (c) a closed-end fund, (d) an exchange-traded note and (e) a structured product.

30. A system for trading and holding one or more positions in an exchange-listed financial instrument in the form of an Exchange Traded Fund (ETF), for which a net asset value is calculated at or after a specified time, wherein said trading occurs on or away from an exchange and among parties comprising an administrator that receives orders from a customer to buy or sell said financial instrument, comprising:

a computer implemented management module configured to manage orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;

a computer implemented service module configured to offer services to a customer comprising at least one of (a) accepting orders and pricing transactions at said prices; (b) denominating orders and executions at said prices in said customer's choice of at least one of currency, whole shares or units of said financial instrument, and fractional shares or units of said financial instrument; and (c) position keeping in said financial instruments for which trading occurs at said prices in currency and whole and fractional shares or units of said financial instrument;

said computer implemented management module configured to manage at least one of (i) trading, (ii) position keeping, and (iii) shareholder distributions, using the fund communications facilities of Fund/SERV; and a processor configured to process the modules.

31. The system of claim 30, further comprising at least one of (i) means for accumulating orders to buy and sell said financial instrument at or relative to a net asset value; (ii) means for periodically offsetting said buy orders against said sell orders; (iii) means for entering at least one of a buy and a sell order for said financial instrument on or away from an exchange for execution at or relative to a net asset value; and (iv) means for using at least one of executions of customer orders and market data from said trading market to price customer transactions.

32. The system of claim 31, further comprising means for pricing said periodically offset orders as a function of at least one of (i) an execution price of an order to buy or sell said financial instrument and (ii) price data from a market.

33. The system of claim 30, wherein said customer is at least one of (a) a retirement plan, a retirement plan participant, sponsor, or service provider, (b) a financial intermediary, (c) an investment adviser, and (d) an investor.

34. The system of claim 30, further comprising means for at least one of (i) executing customer mutual fund transactions and (ii) accommodating customer mutual fund positions.

35. The system of claim 30, further comprising means for retroactively modifying terms of an executed trade upon correction of an error.

36. The system of claim 30, wherein said financial instrument is at least one of (a) an indexed exchange-traded fund, (b) an actively managed exchange-traded fund, (c) a closed-end fund, (d) an exchange-traded note and (e) a structured product.

37. A computer program product comprising a computer useable medium having computer program logic recorded thereon for enabling a processor to trade and hold one or more positions in an exchange-listed financial instrument in the form of an Exchange Traded Fund (ETF), for which a net asset value is calculated at or after a specified time, wherein said trading occurs on or away from an exchange and among parties comprising an administrator that receives orders from a customer to buy or sell said financial instrument priced relative to the net asset value, the computer program logic comprising:

means for enabling a processor to handle orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;

wherein said means for enabling a processor to handle orders includes means for enabling a processor to at least one of (i) accumulate the orders; (ii) periodically offset said buy orders against said sell orders; and (iii) enter at least one of a buy or a sell order for said financial instrument on or away from an exchange for execution at said prices; and means for enabling a processor to offer services to said customer comprising at least one of (a) accepting orders and pricing transactions at said prices; (b) denominating orders and executions in said customer's choice of at least one of currency, whole shares or units of said financial instrument, and fractional shares or units of said financial instrument; and (c) position keeping in whole and fractional shares or units of said financial instrument.

38. The computer program product of claim 37, further comprising means for enabling a processor to price said periodically offset orders as a function of at least one of (i) an execution price of an order to buy or sell said financial instrument and (ii) price data from a market.

39. The computer program product of claim 37, wherein said customer is at least one of (a) a retirement plan, a retirement plan participant, sponsor, or service provider, (b) a financial intermediary, (c) an investment adviser, and (d) an investor.

40. The computer program product of claim 37, wherein said means for trading, reporting of said trades, and position keeping of said administrator are consistent with means for trading and holding mutual fund positions of said customer.

41. The computer program product of claim 37, further comprising means for enabling a processor to trade one or more shares or units of said financial instrument on a net asset value based secondary market to manage risk associated with trading and holding said positions in said financial instrument.

42. The computer program product of claim 37, further comprising means for enabling a processor to embed fees and cost allocations of said administrator in net transaction prices.

43. The computer program product of claim 37, further comprising means for enabling a processor to report and charge fees and costs of said administrator to said customer separately from transaction prices.

44. The computer program product of claim 37, further comprising means for enabling a processor to retroactively modify terms of an executed trade upon correction of an error.

45. The computer program product of claim 37, further comprising means for enabling a processor to manage at least one of trading, position keeping, and shareholder distributions using the fund communications facilities of Fund/SERV.

46. The computer program product of claim 37, wherein said administrator is (i) a bank or bank affiliate or (ii) a broker/dealer or broker/dealer affiliate.

47. The computer program product of claim 37, wherein said financial instrument is at least one of (a) an indexed exchange-traded fund, (b) an actively managed exchange-traded fund, (c) a closed-end fund, (d) an exchange-traded note and (e) a structured product.

48. A computer program product comprising a computer useable medium having computer program logic recorded thereon for enabling a processor to trade and hold one or more positions in an exchange-listed financial instrument in the form of an Exchange Traded Fund (ETF), for which a net asset value is calculated at or after a specified time, wherein said trading occurs on or away from an exchange and among parties comprising an administrator that receives orders from a customer to buy or sell said financial instrument, the computer program logic comprising:

means for enabling a processor to manage orders from at least one customer to buy or sell said financial instrument at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value;

means for enabling a processor to offer services to a customer comprising at least one of (a) accepting orders and pricing transactions at said prices; (b) denominating orders and executions at said prices in said customer's choice of at least one of currency, whole shares or units of said financial instrument, and fractional shares or units of said financial instrument; and (c) position keeping in said financial instruments for which trading occurs at said prices in currency and whole and fractional shares or units of said financial instrument; and said means for enabling a processor to manage orders further including means for enabling a processor to manage at least one of (i) trading, (ii) position keeping, and (iii) shareholder distributions using the fund communications facilities of Fund/SERV.

49. The computer program product of claim 48, further comprising means for enabling a processor to at least one of (i) accumulate orders to buy and sell said financial instrument at or relative to a net asset value; (ii) periodically offset said buy orders against said sell orders; (iii) enter at least one of a buy and a sell order for said financial instrument on or away from an exchange for execution at or relative to a net asset value; and (iv) use at least one of executions of customer orders and market data from said trading market to price customer transactions.

50. The computer program product of claim 49, further comprising means for enabling a processor to price said periodically offset orders as a function of at least one of (i) an execution price of an order to buy or sell said financial instrument and (ii) price data from a market.

51. The computer program product of claim 48, wherein said customer is at least one of (a) a retirement plan, a retirement plan participant, sponsor, or service provider, (b) a financial intermediary, (c) an investment adviser, and (d) an investor.

52. The computer program product of claim 48, further comprising means for enabling a processor to at least one of (i) execute customer mutual fund transactions and (ii) accommodate customer mutual fund positions.

53. The computer program product of claim 48, further comprising means for enabling a processor to retroactively modify terms of an executed trade upon correction of an error.

54. The computer program product of claim 48, wherein said financial instrument is at least one of (a) an indexed exchange-traded fund, (b) an actively managed exchange-traded fund, (c) a closed-end fund, (d) an exchange-traded note and (e) a structured product.

\* \* \* \* \*